US012746816B2

(12) United States Patent
Von Koenigsegg

(10) Patent No.: US 12,746,816 B2
(45) Date of Patent: Sep. 29, 2026

(54) POWERTRAIN FOR AN ELECTRIC VEHICLE

(71) Applicant: ALPRAAZ AB, Ängelholm (SE)

(72) Inventor: Christian Von Koenigsegg, Vejbystrand (SE)

(73) Assignee: ALPRAAZ AB

( * ) Notice: Subject to any disclaimer, the term of this patent is extended or adjusted under 35 U.S.C. 154(b) by 525 days.

(21) Appl. No.: 18/277,466

(22) PCT Filed: Feb. 17, 2022

(86) PCT No.: PCT/EP2022/053999

§ 371 (c)(1),
(2) Date: Aug. 16, 2023

(87) PCT Pub. No.: WO2022/175409

PCT Pub. Date: Aug. 25, 2022

(65) Prior Publication Data

US 2025/0269719 A1 Aug. 28, 2025

(30) Foreign Application Priority Data

Feb. 18, 2021 (EP) .................................... 21157937
Jul. 13, 2021 (EP) .................................... 21185457

(51) Int. Cl.
*B60K 17/356* (2006.01)
*B60K 17/02* (2006.01)
(Continued)

(52) U.S. Cl.
CPC ............ *B60K 17/356* (2013.01); *B60K 17/02* (2013.01); *B60K 17/12* (2013.01); *B60K 17/22* (2013.01);
(Continued)

(58) Field of Classification Search
CPC ........... B60K 1/00; B60K 23/04; F16H 45/02; F16H 48/19; B60L 15/2054; B60L 50/60
See application file for complete search history.

(56) References Cited

U.S. PATENT DOCUMENTS 6,905,438 B2 * 6/2005 Suzuki .................. B60W 20/30 903/917
7,810,592 B2 10/2010 Klemen et al.
(Continued)

FOREIGN PATENT DOCUMENTS

DE 102019103711 A1 8/2020
DE 102019135657 A1 1/2021
(Continued)

OTHER PUBLICATIONS

International Search Report dated May 20, 2022 issued in corresponding PCT Application No. PCT/EP2022/053999.

*Primary Examiner* — Said Bouziane
(74) *Attorney, Agent, or Firm* — Shore IP Group, PLLC; Howard J. Klein

(57) ABSTRACT

An electric powertrain for an automotive road vehicle includes a drive assembly including an electric motor and a torque converter. The torque converter has an output shaft, and it is configured to receive torque from the electric motor, and to deliver torque via the output shaft. The drive assembly has a first side and an opposite second side. The electric motor and the torque converter are centered on the output shaft, and the output shaft extends through the drive assembly and is accessible for delivering torque on both the first side and the second side of the drive assembly.

28 Claims, 23 Drawing Sheets

(51) Int. Cl.

| | |
|---|---|
| ***B60K 17/12*** | (2006.01) |
| ***B60K 17/22*** | (2006.01) |
| ***B60K 17/35*** | (2006.01) |
| ***B60K 23/04*** | (2006.01) |

(52) U.S. Cl.
CPC ........ *B60K 17/35* (2013.01); *B60K 2023/043* (2013.01); *B60Y 2200/91* (2013.01); *B60Y 2400/426* (2013.01)

(56) References Cited

U.S. PATENT DOCUMENTS

| | | | | |
|---|---|---|---|---|
| 10,625,591 | B2 * | 4/2020 | Nishikawa ............. | B60K 6/405 |
| 2011/0259657 | A1 | 10/2011 | Fuechtner | |
| 2013/0086897 | A1 | 4/2013 | Frait et al. | |
| 2013/0281249 | A1 * | 10/2013 | Mimura ................. | B62K 5/027 475/150 |
| 2014/0235402 | A1 | 8/2014 | Matsubara et al. | |
| 2017/0320388 | A1 | 11/2017 | Monfette et al. | |
| 2019/0118640 | A1 | 4/2019 | Nilsson | |
| 2019/0301581 | A1 | 10/2019 | Matsuoka et al. | |
| 2020/0139801 | A1 | 5/2020 | Amers et al. | |

FOREIGN PATENT DOCUMENTS

| | | | |
|---|---|---|---|
| EP | 3415353 | A1 | 12/2018 |
| EP | 3608155 | A1 | 2/2020 |
| EP | 3699457 | A1 | 8/2020 |
| JP | 2008092708 | A | 4/2008 |

* cited by examiner

POWERTRAIN FOR AN ELECTRIC VEHICLE

CROSS-REFERENCE TO RELATED APPLICATIONS

This application is a national phase entry, under 35 U.S.C. 371, of International Application No. PCT/EP2022/053999, filed Feb. 17, 2022, the disclosure of which is incorporated herein by reference in its entirety. International Application No. PCT/EP2022/053999 claims priority from European Application No. 21157937.0, filed Feb. 18, 2021, and European Application No. 21185457.5, filed Jul. 13, 2021.

TECHNICAL FIELD

The proposed technologies relate to electric powertrains for automotive road vehicles. In particular, the present invention relates to fully electric powertrains without any combustion engine as a prime mover supplying torque to the powertrain. The proposed technologies further relate to automotive road vehicles employing the electric powertrains, and to torque converters enabling the electric powertrains. They also relate to the combinations of different types of electric powertrains in an automotive road vehicle.

BACKGROUND

The market for fully electric automotive road vehicles is increasing. There is a is need for improved electric powertrains that are lighter, less spacious, and less costly than those known today. At the same time, there is also a need to maintain or improve the performance of the powertrains, both with respect to range, acceleration, and speed.

GENERAL DESCRIPTION

It is an object of the proposed technologies to address the abovementioned needs and shortcomings of known technologies, and to provide improved electric powertrains. Different aspects of the proposed technologies are presented below.

In a first aspect of the proposed technologies, a torque converter for an automotive road vehicle is provided having a first end, a second end, and an output shaft exiting the torque converter at, accessible at, or extending from, the first end. The torque converter is further configured to receive an input torque at the first end and to deliver an output torque with, or via, the output shaft. The first end may be a rear end, or a turbine end, and the second end may be a front end, or a turbine end. The torque converter may comprise an impeller and a turbine, and the impeller may be located closer to the second end than the turbine, and the turbine may be located closer to the first end than the impeller. Throughout these specifications, first end and rear end are used interchangeably to denote one end of a torque converter. Similarly, second end and front end are used interchangeably to denote the other end of a torque converter.

More specifically, a torque converter for an automotive road vehicle is provided. It comprises: a cover comprising a rear cover portion and a front cover portion, wherein the rear cover portion comprises, or forms, a rear shaft aperture, or first aperture. The torque converter further comprises: an output shaft exiting the torque converter through the rear shaft aperture, an impeller supported by the front cover portion, a turbine supported by the output shaft and positioned between, or in the space formed between, the impeller and the rear cover portion, and a stator positioned between, or in the space formed between, the impeller and the turbine.

The proposed technology has the effect that the output torque is provided at the rear cover portion where torque is typically supplied to the torque converter. It is understood that the torque converter provides a fluid coupling by a fluid, and that the fluid coupling is between the impeller and the turbine. The cover, impeller, turbine, and stator may be concentric with respect to the output shaft. It is understood that a torque converter can convert an input torque to an amplified, or greater, output torque.

As described above, the torque converter may have a rear end and a front end, or a first end and a second end, and the rear cover portion is located at the rear end and the impeller is located at the front end, or the rear end is at the rear cover portion and the front end is at the impeller. This means that the rear shaft aperture is located at the rear end, and that the output shaft exits the torque converter at the rear end of the torque converter. The output shaft may have a first shaft portion, or rear shaft portion, that extends from the rear shaft aperture. It may further have a central shaft portion located inside the torque converter that is connected to and aligned, or coaxial, with the rear shaft portion. The output shaft may constitute a monolithic structure.

The torque converter may be configured to receive an input torque at the rear end of the torque converter. The cover, or the rear cover portion, may be configured to receive an input torque, or be driven by a prime mover, such as an electric motor. The output shaft may be configured to deliver an output torque or do drive a load. The impeller, turbine, and stator may be configured to convert the input torque to the output torque.

In other words, the torque converter has a rear end, a front end, and an output shaft exiting the torque converter at the rear end, and that the torque converter is configured to receive an input torque at the rear end and to deliver an output torque with the output shaft.

The impeller may be fixed or rigidly connected to the cover. The turbine may be fixed or rigidly connected to the output shaft. The cover and impeller may jointly form an encloses space, which may contain the fluid within the torque converter during operation. The turbine may be inside the enclosed space. The torque converter may comprise the fluid, which may be a liquid, such as an oil. The fluid may be contained in the enclosed space.

The impeller being supported by the cover means that it is configured to receive the input torque from the cover. It may be fixed to the cover. It is understood that the impeller and the turbine are configured for a torque transfer, from the impeller to the turbine by the fluid. The stator may be configured to alter a flow of the fluid from the turbine to the impeller, and to convert the input torque to the output torque. This way, the output torque can be greater than the input torque.

The rear cover portion may extend, or primarily extend, radially, or transversely, with respect to the output shaft. The front cover portion may extend, or primarily extend, from the rear cover portion and along the output shaft, or towards the front end. The impeller may extend, or primarily extend, radially, or transversely, with respect to the output shaft. Here, that a structure extends primarily on one direction is understood as the structure having the greatest extension, or greatest length measure, in that direction.

Throughout these specifications, rear and front are to be construed as indicating relative positions with respect to the torque converter as such, not as absolute positions relative to the surroundings, such as the body of a vehicle. For example, they could be replaced by the terms proximal and distal, or by the terms first side and second side, respectively. This means that the rear end of the torque converter can face the front of a vehicle.

In a second aspect of the proposed technologies, a torque converter for an automotive road vehicle is provided having a first end, a second end, and an output shaft exiting the torque converter at, accessible at, or extending from, the first end and the second end. The torque converter is configured to receive an input torque at the first end and to deliver an output torque with, or via, the output shaft. The first end may be a rear end, or a turbine end, and the second end may be a front end, or a turbine end. The torque converter may comprise an impeller and a turbine, and the impeller may be located closer to the second end than the turbine, and the turbine may be located closer to the first end than the impeller. The torque converter may have any of the features described above in relation to the torque converter according to the first aspect of the proposed technologies.

More specifically, a torque converter according to the first aspect of the proposed technologies is provided, wherein the impeller comprises, or forms a front shaft aperture, or second aperture, and the output shaft exits the torque converter through the front shaft aperture. This has the effect that the output torque is provided at two opposite ends of the torque converter.

As mentioned above, the torque converter may have a rear end and a front end, and the rear cover portion is located at the rear end and the impeller is located at the front end. This means that the front shaft aperture is located at the front end, and that the output shaft exits the torque converter also at the front end of the torque converter.

The output shaft may have a second shaft portion, or front shaft portion, that extends from the front shaft aperture. The front shaft portion may be connected to and aligned, or coaxial, with the central shaft portion. Worded differently, the output shaft may have a first shaft portion, or rear shaft portion, that extends from the rear end of the torque converter. The output shaft may further have a second shaft portion, or front shaft portion, that extends from the front end of the torque converter. Additionally, the output shaft may have central shaft portion located inside and connecting the rear shaft portion and the front shaft portion. Again, the output shaft may constitute a monolithic structure. This means that the torque converter has a rear end, a front end, and an output shaft exiting the torque converter at the rear end and the front end, wherein the torque converter is configured to receive an input torque at the rear end and to deliver an output with the output shaft.

The torque converters according to the above aspects of the proposed technologies may further comprises: a stator support rotationally supporting the stator and exiting the torque converter through the front shaft aperture.

The stator support may be configured to be fixed, or static, relative to the body, or frame of the vehicle, or it may be configured to be fixed, or attached, to a surrounding housing. This means that the position or orientation of the stator support does not change relative to the body of the vehicle, or a surrounding housing, during operation of the torque converter, while the cover, impeller, stator, turbine, and output shaft may rotate relative to the body of the vehicle, or a surrounding housing, during operation.

It is understood that the stator support extends from inside the torque converter to outside the torque converter. Alternatively, the stator may exit the torque converter through the front shaft aperture. The complete stator support is then located outside the torque converter positioned.

The stator support may comprise a freewheel, or overrunning clutch, such as a sprag clutch, rotationally supporting the stator relative to the stator support. It is understood that the freewheel limits the stator to rotate in a single, or only one, direction relative to the stator support. The freewheel may be centered on or coaxial with the output shaft. It may be positioned between, or in a space formed between, the stator and the output shaft.

The stator support may comprise, or form, a stator support bore through which the output shaft extends.

The stator support bore may have a rear opening located inside the torque converter, or within the enclosed space formed by the cover and the impeller. It is understood that the output shaft exits the stator support bore through the rear opening towards, or in the direction of, the rear shaft aperture. The stator support bore may have a front opening located outside the torque converter, or outside the enclosed space formed by the cover and the impeller. The output shaft may exit the front shaft aperture before it exits the front opening of the stator support bore.

The torque converters according to the above aspects of the proposed technologies may further comprise: an input shaft fixed or rigidly connected to the rear cover portion, wherein the input shaft comprises, or forms, an input shaft bore through which the output shaft, or the rear shaft portion of the output shaft, extends.

This means that the output shaft extends within and through the input shaft, and that the input torque is provided at the same side of the torque converter as the output torque is supplied. The input shaft may be aligned, or coaxial, with, or relative to, the output shaft. It is understood that the input shaft is configured, or intended, to receive the input torque.

It is understood that, at each point along the input shaft, the input shaft bore has a diameter, or the input shaft has an inner diameter, that is greater than the diameter of the output shaft. It is further understood that the input shaft may have a length that is shorter than its diameter. For example, the length may be less than the diameter, or less than half of the diameter. This allows for a prime mover to be positioned close to the torque converter. The input shaft may connect to the rear cover portion at the rear shaft aperture. This allows for an input shaft of a smaller diameter.

The input shaft bore may have a front opening located at the rear shaft aperture. It may further have a rear opening that is distal from the rear cover portion. Both the front opening and the rear opening of the input shaft may be located outside the torque converter, or outside the enclosed space formed by the cover and the impeller. The output shaft may exit the input shaft bore, the input shaft, or the torque converter, through the rear opening of the input shaft bore. The input shaft bore may be aligned, or coaxial, with the stator support bore.

The rear cover portion may define the rear end of the torque converter at which the input torque is intended to be supplied. If present, the input shaft may define the rear end of the torque converter at which the input torque is intended to be supplied.

The rear cover portion may comprise, or form, a torque input hub, or a torque input connector. The torque input hub may extend, or protrude, outwards from the rear cover portion, or in the opposite direction in which the impeller is located. The input shaft may connect to the torque input hub. The torque input hub may be located at the rear shaft aperture. Additionally, or alternatively, the torque input hub may form the rear shaft aperture.

The torque converters according to the above aspects of the proposed technologies may further comprise: a rear radial rolling bearing, or a radial rolling-element bearing, connecting the cover, or rear cover portion, and the output shaft.

It is understood that the rear radial rolling bearing rotationally supports the cover, or rear cover portion, relative to the output shaft. A radial rolling bearing is understood to provide a radial support. The specified position of the bearing is advantageous for the mechanical stability of the torque converter.

Additionally, or alternatively, the torque converter may comprise: a rear radial rolling bearing connecting the cover, or rear cover portion, and the turbine. This means that the bearing rotationally supports the cover, or rear cover portion, relative to the turbine. Additionally, or alternatively, the torque converter may comprise: a rear radial rolling bearing connecting the input shaft and the output shaft.

The torque converters according to the above aspects of the proposed technologies may further comprise: a clutch having an (a) unengaged state in which the cover and the output shaft are unlocked and can spin at different speeds, and an (b) engaged state in which the cover and the output shaft are locked together, or fully engaged by static friction, and spin at the same speed.

It is understood that the clutch operationally connects the cover and the output shaft. For example, it may contact the rear cover portion and the turbine in the engaged state.

The clutch may further have a (c) slipping state in which the cover and the output shaft are partially locked together, or partially engaged by kinetic friction, and can spin at different speeds.

When the clutch is in the unengaged state, it is understood that it does not mechanically transfers torque between the cover and the output shaft. A torque transfer caused only by a fluid coupling, or a viscous drag, of the fluid in the torque converter is not considered a mechanical torque transfer in this context. That the cover and the output shaft are partially locked together means that there is a slipping mechanical coupling between the cover and the output shaft. The slipping state is understood to encompass a partly engaged state. It is not to be construed as a pure fluid coupling. The cover and the output shaft being locked together means that there is a non-slipping mechanical coupling between the cover and the output shaft. It is understood the clutch may change from the unengaged state to the engaged state via the slipping state, or vice versa. The clutch my also change instantaneously from the unengaged state to the engaged state, for example by a rapid activation of the clutch when the cover and the turbine rotate at the same speed, or from the engaged state to the unengaged state when no torque is supplied by the cover.

The clutch may be configured to be continuously operated in the slipping state. This means that it can be operated in the slipping state for a period that is longer than a transition from the unengaged state to the engaged state.

The clutch may be a lock-up clutch, which means that its ground state is the engaged state, and that it is activated to transition from the engaged state to the unengaged state. For example, the clutch may be spring biased to be in its engaged state.

The clutch may be hydraulically operated. It may be operated, or activated, by a change in the pressure, or flow, of a fluid contained in the torque converter, or in the enclosed space of the torque converter. The fluid may be the same as the fluid transferring torque from the impeller to the turbine.

The clutch may be an internal clutch. It may be positioned between, or in a space formed between, the turbine and the rear cover portion. It is understood that in the engaged state, the clutch transfers all torque supplied to the rear end to the output shaft. It is further understood that in the slipping state, the clutch transfers some, or a fraction, of the torque supplied to the rear end to the output shaft The output shaft may comprise, or form, a shaft conduit configured to supply the fluid to the enclosed space of the torque converter. For example, it may supply the fluid at a point between the turbine and the rear cover portion. This way, the pressure of the fluid in the torque converter can be regulated and the clutch can be operated from outside the torque converter. The shaft conduit may pass through the rear shaft aperture. Alternatively, the input shaft may comprise, or form, a shaft conduit configured to supply the fluid to the enclosed space of the torque converter.

In a third aspect of the proposed technologies an electric powertrain for an automotive road vehicle is provided. The powertrain comprises: a drive assembly. The drive assembly comprises: an electric motor and a torque converter, wherein the torque converter comprises an output shaft and is configured to receive torque from the electric motor and to deliver torque via the output shaft. The drive assembly has a first side and an opposite second side. The electric motor and the torque converter are centered on the output shaft and the output shaft extends through the drive assembly and is accessible for delivering torque on both the first side and the second side of the drive assembly.

Worded differently, the output shaft extends through the drive assembly and may comprise a first mechanical interface on the first side of the drive assembly for delivering torque and a second mechanical interface on the second side of the drive assembly for delivering torque. Alternatively worded, the output shaft extends through the drive assembly and the powertrain comprises: a first wheel connector, or first hub, for connecting to a first wheel, wherein the first wheel connector is positioned on the first side of the drive assembly in the powertrain, and a second wheel connector, or second hub, for connecting to a second wheel, wherein the second wheel connector is positioned on the second side of the drive assembly in the powertrain.

The torque converter may have any of the features described above for the torque converter according to the second aspect of the proposed technologies. The electric motor may further have a motor shaft, which may be coupled to the torque converter.

The output shaft may have a first shaft portion, or a rear shaft portion, and a coaxial second shaft portion, or front shaft portion, wherein the first shaft portion is accessible from the first side of the drive assembly and the second shaft portion is accessible from the second side of the drive assembly. The powertrain may comprise: a first wheel connector, or first hub, for connecting to a first wheel, wherein the first wheel connector is operationally connected to the first shaft portion, and a second wheel connector, or a second hub, for connecting to a second wheel, wherein the second wheel connector is operationally connected to the second shaft portion. That a wheel connector is operationally connected to a shaft portion means that there may be other mechanical components, such as clutches, between them.

Worded differently, the powertrain comprises: a torque converter according to the second aspect of the proposed technologies, or having a first end, a second end, and an output shaft exiting the torque converter at the first end and the second end, wherein the torque converter is configured to receive an input torque at the first end and to deliver an output with the output shaft. The powertrain further comprises: an electric motor having a motor shaft coupled to the rear end of the torque converter, or to the torque converter at the rear end of the torque converter. The first end may be a rear end, or a turbine end, and the second end may be a front end, or a turbine end. The torque converter may comprise an impeller and a turbine, and the impeller may be located closer to the second end than the turbine, and the turbine may be located closer to the first end than the turbine.

As mentioned above, the output shaft may have a first shaft portion, or a rear shaft portion, that extends from the rear end of the torque converter. The output shaft may also have a second shaft portion, or a front shaft portion, that extends from the front end of the torque converter. Additionally, the output shaft may have central shaft portion located inside and connecting the rear shaft portion and the front shaft portion. The rear shaft portion, the central shaft portion, and the front shaft portion may be aligned, or coaxial. As described above, the powertrain may further comprise: a first wheel connector, or first hub, for connecting to a first wheel, wherein the first wheel connector is operationally connected to the rear shaft portion, and a second wheel connector, or a second hub, for connecting to a second wheel, wherein the second wheel connector is operationally connected to the front shaft portion.

It is understood that the electric motor is configured to supply a torque by the motor shaft. The motor shaft and the output shaft may be aligned, or coaxial. The motor shaft being to the rear end of the torque converter means that it supplies input torque to the torque converter, or more precisely at its rear end.

It is also understood in these specifications that an electric powertrain is a fully electric powertrain, which means that there is no combustion engine supplying torque to the powertrain. The prime movers in an electric powertrain are without exception electric motors.

The electric motor is understood to encompass any type of electric motor, such as an induction motor or a permanent-magnet electric motor. The electric motor may be a permanent-magnet electric motor, which is advantageous in combination with the torque converter.

The motor shaft may connect to the input shaft of the torque converter, or it may constitute the input shaft of the torque converter. Here, and throughout these specifications, the input shaft may be a monolithic, or it may be a composite structure composed of several individual parts that are joined together. Similarly, the motor shaft may be a monolithic or a composite structure, and the output shaft may a monolithic or a composite structure. For example, the motor shaft may in part, or fully, be composed of a rotor of the electric motor. However, each of the shafts are understood to be rigid, or composed of parts that are rotationally fixed relative to one another during operation.

The motor shaft may be rotationally fixed to the torque converter, for example to the cover, to the rear cover portion, or to the input shaft of the torque converter. This means that there is no clutch or mechanism that can decouple the electric motor from the torque converter. Additionally, the motor shaft may be synchronous with the torque converter, for example with the cover, the rear cover portion, or the input shaft of the torque converter. This means that there is no torque conversion between the electric motor and the torque converter, for example by mechanical gears, or a gear shifting mechanism. The motor shaft and the cover, the rear cover portion, or the input shaft of the torque converter rotate at the same speed. In other words, the torque transfer from the motor shaft to the torque converter may be conversion free, or the motor shaft and the cover, the rear cover portion, or the input shaft may rotate that the same rate, or rotational speed. This means that the electric motor can be positioned close to the torque converter, allowing for a compact powertrain or a concentration of the mass of the powertrain.

In the third aspect of the proposed technologies, the motor shaft may comprise, or form, a motor shaft bore through which the output shaft, or the rear shaft portion, extends. This means that the output shaft can supply torque on the opposite side of the electric motor relative to the position of the torque converter. It is understood that the output shaft extends through the complete length of the motor shaft bore. It enters the motor shaft bore on the side of the electric motor facing the torque converter and exits the motor shaft bore on the side of the electric motor facing away from the torque converter.

The motor shaft bore may have a front opening, or second opening, on the side of the electric motor facing the torque converter, and a rear opening, or first opening, on the side of the electric motor facing away from the torque converter. It is understood that the output shaft enters the motor shaft bore through the front opening and exits the motor shaft bore through the rear opening. The motor shaft bore may be aligned, or coaxial, with the input shaft bore.

The electric motor may have a stator and a rotor. The rotor may comprise, or form a rotor bore through which the output shaft, or the motor shaft, extends. The motor shaft may form part of the rotor.

The powertrain, or drive assembly, may further comprise a housing enclosing the electric motor and torque converter. The stator support of the torque converter may be rigidly attached to the housing. Additionally, the stator of the electric motor may be rigidly attached to the housing. The housing may comprise, or form, a motor partition between, or in the space formed between, the torque converter and the electric motor. The powertrain may further comprise a radial rolling bearing connecting the input shaft, the motor shaft, or the rotor and the motor partition. In other words, the powertrain may comprise a radial rolling bearing rotationally supporting the input shaft, motor shaft, or the rotor relative to the motor partition. This contributes to an improved support of the rotor of the electric motor.

The housing may form a first aperture through which the rear shaft portion extends. Similarly, the housing may form a second aperture through which the front shaft portion extends.

The torque converter may expel the fluid providing the fluid coupling during operation, or with the clutch in the unengaged state. The housing may form an enclosure around the torque converter collecting, or configured to collect, the expelled fluid.

It is specified that the motor shaft is coupled to the rear end of the torque converter. The motor shaft may further be connected to the rear end of the torque converter. This means that there is no functional component between the motor shaft and the torque converter, such as gear shifting, torque converting, or de-coupling, components.

Alternatively, the electric powertrain, or the drive assembly, may further comprise a reduction gear set having a reduction gear input, or reduction gear input part, and a reduction gear output, or reduction gear output part. The reduction gear set may be configured to reduce a first rotational speed of the reduction gear input to a lower second rotational speed of the reduction gear output. Worded differently, the reduction gear set may be configured to convert an input torque received by the reduction gear input to a higher output torque delivered to the reduction gear output.

The reduction gear input may be coupled to the electric motor and the reduction gear output may be coupled to the torque converter. Worded differently, the reduction gear input may be connected to the motor shaft and the reduction gear output may be connected to the torque converter, or the rear end of the torque converter, or to the input shaft of the torque converter. This way, the electric motor operates at a higher rotational speed than the torque converter.

The reduction gear set may comprise, or form, a reduction gear bore through which the output shaft extends. The reduction gear bore may be aligned, or coaxial, with the motor shaft bore. If the torque converter has an input shaft, the reduction gear bore may be aligned, or coaxial, with the input shaft bore. The reduction gear bore may have a front opening on the side of the reduction gear set facing the torque converter, and a rear opening on the side of the reduction gear set facing the electric motor. It is understood that the output shaft enters the reduction gear bore through the front opening and exits the reduction gear bore through the rear opening.

The reduction gear set may be a planetary gear set, or an epicyclic gear train, comprising a sun gear, planet gears, a ring gear, and a carrier. The reduction gear input may comprise, or form, the sun gear. The reduction gear output may comprise, or form, the carrier. The planet gears and the ring gear operationally connects the sun gear and the carrier. The ring gear may be fixed relative to the to the surroundings, such as the body of a vehicle or the housing. This means that the ring gear cannot rotate. If there is a reduction gear bore, the reduction gear input and the reduction gear output, or the sun gear and the carrier, may jointly form the reduction gear bore.

The electric powertrain may further comprise a first reduction gear set and a second reduction gear set. Each of the first and second reduction gear sets has a reduction gear input, or reduction gear input part, and a reduction gear output, or reduction gear output part. Each of the first and second reduction gear sets may be configured as the reduction gear set described above. Additionally, or alternatively, each of the first and second reduction may be a planetary gear set, which may have any of the features of the planetary gear set described above.

The reduction gear input of each of the first and second reduction gear sets may be connected to the output shaft. In an alternative wording, the reduction gear input of the first reduction gear set may be connected to the rear shaft portion and the reduction gear input of the second reduction gear set may be connected to the front shaft portion. The first reduction gear set may face the rear end of the torque converter, and the second reduction gear set may face the front end of the torque converter. The electric motor may be positioned between, or in the space formed between, the torque converter and the first reduction gear set. Worded differently, the first reduction gear set may be positioned on the first side of the drive assembly in the powertrain, and the second reduction gear set may be positioned on the second side of the drive assembly in the powertrain, or the reduction gear input of the first reduction gear set may be connected to the first mechanical interface and the reduction gear input of the second reduction gear set may be connected to the second mechanical interface.

Any component described elsewhere in these specifications as being connected to the output shaft, or the rear shaft portion and the front shaft portion of the output shaft, may instead be connected to the reduction gear output of the first and second reduction gear sets.

In a fourth aspect of the proposed technologies, the electric powertrain according to the third aspect of the proposed technologies further comprises: a first clutch having a clutch input, or clutch input part, and a clutch output, or a clutch output part, and a second clutch having a clutch input, or clutch input part, and a clutch output, or a clutch output part. The clutch input of each of the first clutch and the second clutch is coupled to the output shaft. The first clutch may face the rear end of the torque converter, and the second clutch may face the front end of the torque converter. Alternatively worded, the first clutch and the second clutch may be positioned on opposite sides of the torque converter, or drive assembly, in the powertrain. The electric motor may be positioned between, or in the space formed between, the torque converter and the first clutch.

In an alternative wording, the clutch input of the first clutch is connected to the rear shaft portion and the clutch input of the second clutch is connected to the front shaft portion, and the electric motor may be positioned between, or in the space formed between, the torque converter and the first clutch.

It is understood that an output torque supplied by the output shaft of the torque converter is received as an input torque by the clutch input of each of the first clutch and the second clutch. This way the output torque is divided between the first clutch and the second clutch.

The clutch input of each of the first clutch and the second clutch may be connected to the output shaft, or the clutch input of the first clutch may be connected to the rear shaft portion and the clutch input of the second clutch may be connected to the front shaft portion. This means that there are no functional components between the output shaft and the first and second clutches.

The clutch input of each of the first clutch and the second clutch may be rotationally fixed to the output shaft of the torque converter. This means that there is no mechanism that can decouple the first and second clutches from the output shaft. Additionally, the clutch inputs may be synchronous with the output shaft, which means that there is no torque conversion between the first and second clutches and the output shaft, for example by mechanical gears, or a gear shifting mechanism.

The housing may comprise, or form, a first clutch partition between, or in the space formed between, the electric motor and the first clutch. The powertrain may further comprise a first radial rolling bearing connecting the output shaft and the first clutch partition. In other words, the powertrain may comprise a first radial rolling bearing rotationally supporting the output shaft relative to the first clutch partition. This contributes to an improved support of the output shaft and the turbine of the torque converter.

The housing may comprise, or form, a second clutch partition between, or in the space formed between, the torque converter and the second clutch. The powertrain may further comprise a second radial rolling bearing connecting the output shaft and the second clutch partition. In other words, the powertrain may comprise a second radial rolling bearing rotationally supporting the output shaft relative to the second clutch partition. This contributes to an improved support of the output shaft and the turbine of the torque converter.

As mentioned in relation to the third aspect of the proposed technologies, the electric powertrain may further comprise a first reduction gear set and a second reduction gear set. In an alternative to the clutch input of each of the first clutch and the second clutch being connected to the output shaft, if the electric powertrain further comprises first and second reduction gear sets, the clutch input of the first and second clutches may be connected to the reduction gear output of the first and second reduction gear sets, respectively. This means that there are no functional components between neighboring clutches and reduction gear sets.

Alternatively, the reduction gear input of each of the first and second reduction gear sets may instead be connected to the output part of the first and second clutches, respectively. Any component described elsewhere in these specifications as connected to the output part of the first and second clutches, may instead be connected to the reduction gear output of the first and second reduction gear sets, respectively.

Each of the first and second reduction gear sets has a reduction gear input, or reduction gear input part, and a reduction gear output, or reduction gear output part. Each of the first and second reduction gear sets may be configured as the reduction gear set described above. Additionally, or alternatively, each of the first and second reduction may be a planetary gear set, which may have any of the features of the planetary gear set described above.

In a fifth aspect of the proposed technologies, a bevel gear assembly is provided that comprises: a gear input shaft, a gear output shaft, or center axle, that is transverse, or at a right angle, to the gear input shaft and having a first end, or first output end, and a second end, or second output end, and a bevel gear operationally connecting the gear input shaft and the gear output shaft. The first end and the second end of the gear output shaft are on opposite sides, or opposite first and second sides, of the bevel gear.

It is understood that the bevel gear converts, or transfers, an input torque received by the gear input shaft to an output torque supplied by the gear output shaft at the first end and the second end.

The bevel gear assembly may comprise a housing, or shaft housing, enclosing the bevel gear. The gear input shaft and the gear output shaft may extend from the housing. This means that the gear output shaft exits the housing on opposite sides, or opposite first and second sides, of the housing.

The housing may comprise, or form, a bevel gear partition at the gear input shaft. The bevel gear assembly may further comprise a radial rolling bearing connecting the gear input shaft, and the bevel gear partition. In other words, the bevel gear assembly may comprise a radial rolling bearing rotationally supporting the gear input shaft, relative to the bevel gear partition.

The bevel gear assembly may further comprise: a first clutch having a clutch input, or clutch input part, and a clutch output, or a clutch output part, and a second clutch having a clutch input, or clutch input part, and a clutch output, or a clutch output part. The clutch input of the first clutch is connected to the first end of the gear output shaft, and the clutch input of the second clutch is connected to the second end of the gear output shaft. This means that the bevel gear is positioned between, or in the space between, the first clutch and the second clutch.

It is understood that an input torque, such as the output torque from the output shaft of a torque converter, is received by the gear input shaft. The input torque is then converted, or transferred, to an output torque by the bevel gear. The output torque is transferred to the clutch inputs by the gear output shaft. This way the output torque is divided between the first clutch and the second clutch.

The clutch input of each of the first clutch and the second clutch may be rotationally fixed to the gear output shaft. This means that there is no mechanism that can decouple the first and second clutches from the gear output shaft. Additionally, the clutch inputs may be synchronous with the gear output shaft, which means that there is no torque conversion between the first and second clutches and the gear output shaft, for example by mechanical gears, or a gear shifting mechanism.

The housing may comprise, or form, a first clutch partition between, or in the space formed between, the bevel gear and the first clutch. The powertrain may further comprise a first radial rolling bearing connecting the gear output shaft and the first clutch partition. In other words, the powertrain may comprise a first radial rolling bearing rotationally supporting the gear output shaft relative to the first clutch partition. This contributes to an improved support of the bevel gear and the first clutch.

The housing may further comprise, or form, a second clutch partition between, or in the space formed between, the bevel gear and the second clutch. The powertrain may further comprise a second radial rolling bearing connecting the gear output shaft and the second clutch partition. In other words, the powertrain may comprise a second radial rolling bearing rotationally supporting the gear output shaft relative to the second clutch partition. This contributes to an improved support of the bevel gear and the second clutch.

In a sixth aspect of the proposed technologies, an electric powertrain for an automotive road vehicle is provided that comprises: a bevel gear assembly according to the fifth aspect of the proposed technologies, and an electric motor having a motor shaft connected to the gear input shaft of the bevel gear assembly.

It is understood that the electric motor is configured to supply a torque by the motor shaft. The motor shaft being connected to the gear input shaft of the bevel gear assembly means that it supplies input torque to the gear input shaft.

Here, and throughout these specifications, the electric motor is understood to encompass any type of electric motor, such as an induction motor or a permanent-magnet electric motor. Preferably, the electric motor is a permanent-magnet electric motor, which is advantageous in combination with the bevel gear assembly.

The electric motor may comprise a stator and a rotor. The motor shaft may constitute the gear input shaft of the bevel gear assembly. The motor shaft may be a monolithic structure, or it may be a composite structure composed of several individual parts that are joined together. For example, the motor shaft may in part, or fully, be composed of the rotor of the electric motor.

The motor shaft may be rotationally fixed to the gear input shaft of the bevel gear assembly. This means that there is no clutch or mechanism that can decouple the electric motor from the bevel gear assembly. Additionally, the motor shaft may be synchronous with the gear input shaft of the bevel gear assembly. This means that there is no torque conversion between the electric motor and the bevel gear assembly, for example by mechanical gears, or a gear shifting mechanism.

It is understood that the electric motor is configured to supply an output torque by the motor shaft, and that an output torque supplied by the motor shaft is received as an input torque by the gear input shaft of the bevel gear assembly.

The bevel gear assembly, or the powertrain may, comprise a housing. The stator of the electric motor may be fixed, or rigidly attached, to the housing. The housing may comprise, or form, a motor partition between, or in the space formed between, the bevel gear assembly and the electric motor. The powertrain may further comprise a radial rolling bearing connecting the motor shaft, or the gear input shaft, and the motor partition. In other words, the powertrain may comprise a radial rolling bearing rotationally supporting the motor shaft relative to the motor partition. This contributes to an improved support of the motor shaft In a seventh aspect of the proposed technologies, an electric powertrain for an automotive road vehicle comprises: a bevel gear assembly according to the fifth aspect of the proposed technologies, and a torque converter having a rear end, a front end, and an output shaft exiting the torque converter at, accessible at, or extending from, the front end, wherein the output shaft is connected to the gear input shaft of the bevel gear assembly. The powertrain further comprises: an electric motor having a motor shaft operationally connected to the rear end of the torque converter, or to the torque converter at the rear end of the torque converter.

It is understood that the electric motor is configured to supply a torque by the motor shaft. The motor shaft being operationally connected to the rear end of the torque converter means that it supplies an input torque to the rear end. This means that the electric motor is configured to supply an output torque by the motor shaft, and that an output torque supplied by the motor shaft is received as an input torque by the torque converter.

The electric motor is understood to encompass any type of electric motor, such as an induction motor or a permanent-magnet electric motor. The electric motor may be a permanent-magnet electric motor, which is advantageous in combination with the torque converter.

The electric motor may comprise a stator and a rotor. The motor shaft may constitute an input shaft connected to the rear end of the torque converter. The motor shaft may be a monolithic structure, or it may be a composite structure composed of several individual parts that are joined together. For example, the motor shaft may in part, or fully, be composed of the rotor of the electric motor.

The motor shaft may be rotationally fixed to the rear end of the torque converter. This means that there is no clutch or mechanism that can decouple the electric motor from the torque converter. Additionally, the motor shaft may be synchronous with the rear end of the torque converter. This also means that there is no torque conversion between the electric motor and the torque converter, for example by mechanical gears, or a gear shifting mechanism.

The torque converter described here differs from the previously described torque converters in that the output shaft does not exit the torque converter at the rear end, or that the output shaft is not accessible for torque transfer at the rear end. It is understood that rear end of the torque converter faces the electric motor, and that the torque converter is positioned between, or in the space formed between, the electric motor and the bevel gear assembly. Alternatively worded, the torque converter is positioned between the electric motor and the bevel gear assembly in the powertrain.

The torque converter may comprise a fluid, which may be a liquid, such as an oil. The fluid may be contained in the torque converter during operation. The fluid may provide a fluid coupling between the rear end and the output shaft. It is understood that a torque converter can convert an input torque to an amplified, or greater, output torque.

As above, the terms rear and front are to be construed as indicating relative positions with respect to the torque converter as such, not as absolute positions relative to the surroundings, such as the body of a vehicle or other components of the powertrain.

The bevel gear assembly, or the powertrain may, comprise a housing. The stator of the electric motor may be fixed, or rigidly attached, to the housing of the bevel gear assembly. The housing may comprise, or form, a torque converter partition between, or in the space formed between, the bevel gear assembly and the torque converter. The powertrain may further comprise a radial rolling bearing connecting the output shaft of the torque converter and the torque converter partition. In other words, the powertrain may comprise a first radial rolling bearing rotationally supporting the output shaft relative to the torque converter partition. This contributes to an improved support of the output shaft.

The housing may comprise, or form, a motor partition between, or in the space formed between, the torque converter and the electric motor. The powertrain may further comprise a radial rolling bearing connecting the motor shaft and the motor partition. In other words, the powertrain may comprise a radial rolling bearing rotationally supporting the motor shaft relative to the motor partition. This contributes to an improved support of the motor shaft.

The torque converter may have: a clutch having an (a) unengaged state in which the rear end and the output shaft are unlocked and can spin at different speeds, and an (b) engaged state in which the rear end and the output shaft are locked together, or fully engaged by static friction, and spin at the same speed. It is understood that the clutch operationally connects the rear end and the output shaft. The clutch further may further have a (c) slipping state in which the rear end and the output shaft are partially locked together, or partially engaged by kinetic friction, and can spin at different speeds.

When the clutch is in the unengaged state, it is understood that it does not mechanically transfers torque between the rear end and the output shaft. A torque transfer caused only by a fluid coupling, or a viscous drag, of the liquid in the torque converter is not considered a mechanical torque transfer in this context. That the rear end and the output shaft are partially locked together means that there is a slipping mechanical coupling between the rear end and the output shaft. The slipping state is understood to encompass a partly engaged state, it is not to be construed as a pure fluid coupling. The rear end and the output shaft being locked together means that there is a non-slipping mechanical coupling between the rear end and the output shaft.

The clutch may function in the same manner as the clutch of the first and second aspects of the proposed technologies. For example, the clutch may be a lock-up clutch, which means that its ground state is the engaged state, and that it is activated to transition from the engaged state to the unengaged state. The clutch may be hydraulically operated. It may be operated, or activated, by a change in the pressure, or flow, of a fluid contained in the torque converter, or in the enclosed space of the torque converter. The fluid may be the same as the fluid transferring torque from the impeller to the turbine.

The clutch may be an internal clutch. It is understood that in the engaged state the clutch transfers all torque supplied to the rear end to the output shaft. It is further understood that in the slipping state the clutch transfers some, or a fraction, of the torque supplied to the rear end to the output shaft.

The output shaft may comprise, or form, a shaft conduit configured to supply the fluid to the torque converter. This way, the pressure of the fluid in the torque converter can be regulated and the clutch can be operated from outside the torque converter.

In an eighth aspect of the proposed technologies, the electric powertrain according to the third aspect of the proposed technologies further comprises: a bevel gear assembly according to the fifth aspect of the proposed technologies, wherein the gear input shaft of the bevel gear assembly is connected to the output shaft of the torque converter.

It is understood that the gear input shaft, may constitute, or form, a part of the output shaft of the torque converter. This means that the bevel gear may operationally connect the output shaft of the torque converter and the gear output shaft. The output shaft of the torque converter may be a composite structure and the gear input shaft may be separable from the rest of the output shaft. Alternatively, the output shaft of the torque converter and the gear input shaft of the bevel gear assembly may form a monolithic structure.

It is also understood that an output torque supplied by the output shaft of the torque converter is received as an input torque by the gear input shaft of the bevel gear assembly.

The gear input shaft may be rotationally fixed to the output shaft of the torque converter. This means that there is no clutch or mechanism that can decouple the gear input shaft from the output shaft. Additionally, the gear input shaft may be synchronous with output shaft of the torque converter. This means that there is no torque conversion between the gear input shaft and the output shaft, for example by mechanical gears, or a gear shifting mechanism.

The bevel gear assembly may be supported by the housing. The housing may enclose the bevel gear. The housing may form the shaft housing, or the shaft housing may form part of the housing.

The front end of the torque converter may face the bevel gear assembly. Worded differently, the front shaft portion of the output shaft may connect to the gear input shaft, or the front shaft portion may constitute, or form the gear input shaft of the bevel gear assembly. The housing may comprise, or form, a bevel gear partition between, or in the space formed between, the torque converter and the bevel gear assembly. The powertrain may further comprise a radial rolling bearing connecting the output shaft, or the gear input shaft, and the bevel gear partition. In other words, the powertrain may comprise a radial rolling bearing rotationally supporting the output shaft, or the gear input shaft, relative to the bevel gear partition.

Alternatively, the rear end of the torque converter may face the bevel gear assembly. This means that the electric motor is positioned between, or in the space between, the torque converter and the bevel gear assembly. Worded differently, the rear shaft portion of the output shaft may connect to the gear input shaft, or the rear shaft portion may constitute, or form, the gear input shaft of the bevel gear assembly. The housing may then comprise, or form, a bevel gear partition between, or in the space formed between, the electric motor and the bevel gear assembly. The powertrain may further comprise a radial rolling bearing connecting the output shaft, or the gear input shaft, and the bevel gear partition. In other words, the powertrain may comprise a radial rolling bearing rotationally supporting the output shaft, or the gear input shaft, relative to the bevel gear partition. This contributes to an improved support of the output shaft and the turbine of the torque converter.

In a ninth aspect of the proposed technologies an electric powertrain for an automotive road vehicle is provided that comprises: a differential having a gear input shaft, a first gear output shaft, and a second gear output shaft. The powertrain further comprises: a torque converter having a rear end, a front end, and an output shaft exiting the torque converter at, accessible at, or extending from, the front end, wherein the output shaft is connected to the gear input shaft of the differential. The powertrain further has an electric motor having a motor shaft operationally connected to the rear end of the torque converter, or to the torque converter at the rear end of the torque converter.

This aspect of the proposed technologies may have any of the features and function of the powertrain according to the seventh aspect of the proposed technologies. It differs by the bevel gear assembly having been replaced by the differential.

It is understood that the differential operationally connects the gear input shaft, the first gear output shaft, and the second gear output shaft. The first gear output shaft and the second gear output shaft may be transverse, or at a right angle, to the gear input shaft. They may be on opposite sides, or opposite first and second sides, of the differential.

The differential may be a limited-slip differential or an open differential. It is understood that the gear input output shaft, may constitute, or form, a part of the output shaft of the torque converter. This means that the differential may operationally connect the output shaft of the torque converter and the first and second gear output shafts. The output shaft of the torque converter may be a composite structure and the gear input shaft may be separable from the rest of the output shaft. Alternatively, the output shaft of the torque converter and the gear input shaft of the differential may form a monolithic structure.

The gear input shaft may be rotationally fixed to the output shaft of the torque converter. This means that there is no clutch or mechanism that can decouple the gear input shaft from the output shaft. Additionally, the gear input shaft may be synchronous with output shaft of the torque converter. This also means that there is no torque conversion between the gear input shaft and the output shaft, for example by mechanical gears, or a gear shifting mechanism.

It is understood that the rear end of the torque converter faces the electric motor, and that the torque converter is positioned between, or in the space formed between, the electric motor and the differential.

The differential, or the powertrain may, comprise a housing. The stator of the electric motor may be rigidly attached to the housing. The housing may comprise, or form, a torque converter partition between, or in the space formed between, the differential and the torque converter. The powertrain may further comprise a radial rolling bearing connecting the output shaft of the torque converter and the torque converter partition. In other words, the powertrain may comprise a first radial rolling bearing rotationally supporting the output shaft relative to the torque converter partition. This contributes to an improved support of the output shaft.

The housing may comprise, or form, a motor partition between, or in the space formed between, the torque converter and the electric motor. The powertrain may further comprise a radial rolling bearing connecting the motor shaft and the motor partition. In other words, the powertrain may comprise a radial rolling bearing rotationally supporting the motor shaft relative to the motor partition. This contributes to an improved support of the motor shaft In a tenth aspect of the proposed technologies, the electric powertrain according to the third aspect of the proposed technologies further comprises: a differential having a gear input shaft, a first gear output shaft, and a second gear output shaft, wherein the gear input shaft of the differential is connected to the output shaft of the torque converter.

The differential may have any of the features or functions of the differential according to the ninth aspect of the proposed technologies. For example, the differential may be a limited-slip differential or an open differential, and the gear input output shaft of the differential, may constitute, or form, a part of the output shaft of the torque converter. It is understood that an output torque supplied by the output shaft of the torque converter is received as an input torque by the gear input shaft of the differential.

The gear input shaft may be rotationally fixed to the output shaft of the torque converter. This means that there is no clutch or mechanism that can decouple the gear input shaft from the output shaft. Additionally, the gear input shaft may be synchronous with the output shaft of the torque converter. This means that there is no torque conversion between the gear input shaft and the output shaft, for example by mechanical gears, or a gear shifting mechanism.

The differential may be supported by the housing. The housing may enclose the differential. It may form a shaft housing enclosing the differential.

The front end of the torque converter may face the differential. Worded differently, the front shaft portion of the output shaft may connect to the gear input shaft, or the front shaft portion may constitute, or form the gear input shaft of the differential. The housing may then comprise, or form, a torque converter partition between, or in the space formed between, the torque converter and the differential. The powertrain may further comprise a radial rolling bearing connecting the output shaft, or the gear input shaft, and the torque converter partition. In other words, the powertrain may comprise a radial rolling bearing rotationally supporting the output shaft, or the gear input shaft, relative to the torque converter partition.

Alternatively, the rear end of the torque converter may face the differential. This means that the electric motor is positioned between, or in the space between, the torque converter and the differential. Worded differently, the rear shaft portion of the output shaft may connect to the gear input shaft, or the rear shaft portion may constitute, or form, the gear input shaft of the differential. The housing may comprise, or form, a motor partition between, or in the space formed between, the electric motor and the differential. The powertrain may further comprise a radial rolling bearing connecting the output shaft, or the gear input shaft, and the motor partition. In other words, the powertrain may comprise a radial rolling bearing rotationally supporting the output shaft, or the gear input shaft, relative to the motor partition. This contributes to an improved support of the output shaft and the turbine of the torque converter.

In an eleventh aspect of the proposed technologies, an electric powertrain for an automotive road vehicle is provided that comprises: an electric motor comprising a motor shaft having first shaft portion at, extending from, or accessible at, a first side of the electric motor and a second shaft portion at, extending from, or accessible at, an opposite second side of the electric motor. The powertrain further comprises: a first clutch having a clutch input, or clutch input part, and a clutch output, or a clutch output part, wherein the clutch input of the first clutch is coupled to the first shaft portion, and a second clutch having a clutch input, or clutch input part, and a clutch output, or a clutch output part, wherein the clutch input of the second clutch is coupled to the second shaft portion.

The electric motor may comprise a stator and a rotor, and the rotor may comprise, or form a form, a central shaft portion connecting the first shaft portion and the second shaft portion. The first shaft portion, the central shaft portion, and the second shaft portion may be aligned, or coaxial. The shaft portions are understood to be rigid or composed of parts that are rotationally fixed relative to one another during operation.

It is understood that the electric motor is configured to supply an output torque by the motor shaft, and that an output torque supplied by the motor shaft is received as an input torque by the clutch input of each of the first clutch and the second clutch. This way the output torque is divided between the first clutch and the second clutch.

The clutch input of the first clutch may be connected to the first shaft portion and the clutch input of the second clutch may be connected to the second shaft portion. The clutch input of each of the first clutch and the second clutch may be rotationally fixed to the motor shaft. This means that there is no mechanism that can decouple the first and second clutches from the motor shaft. Additionally, the clutch inputs may be synchronous with the motor shaft, which means that there is no torque conversion between the first and second clutches and the motor shaft, for example by mechanical gears, or a gear shifting mechanism.

The powertrain may further comprise a housing. The stator of the electric motor may be fixed, or rigidly attached, to the housing. The housing may comprise, or form, a first clutch partition between, or in the space formed between, the electric motor and the first clutch. The powertrain may further comprise a first radial rolling bearing connecting the motor shaft and the first clutch partition. In other words, the powertrain may comprise a first radial rolling bearing rotationally supporting the motor shaft relative to the first clutch partition. This contributes to an improved support of the motor shaft and the clutch input of the first clutch.

The housing may comprise, or form, a second clutch partition between, or in the space formed between, the torque converter and the second clutch. The powertrain may further comprise a second radial rolling bearing connecting the motor shaft and the second clutch partition. In other words, the powertrain may comprise a second radial rolling bearing rotationally supporting the motor shaft relative to the second clutch partition. This contributes to an improved support of the motor shaft and the clutch input of the second clutch.

The electric powertrain may further comprise a first reduction gear set and a second reduction gear set. Each of the first and second reduction gear sets has a reduction gear input, or reduction gear input part, and a reduction gear output, or reduction gear output part. Each of the first and second reduction gear sets may be configured as the reduction gear set described above. Additionally, or alternatively, each of the first and second reduction may be a planetary gear set, which may have any of the features of the planetary gear set described above.

In an alternative to the clutch input of the first and second clutches being connected to the first and second shaft portions, respectively, the reduction gear input of the first and second reduction gear sets may be connected to the first and second shaft portions of the motor shaft, respectively, and the clutch input of the first and second clutches may be connected to the reduction gear output of the first and second reduction gear sets, respectively. This means that there are no functional components between the electric motor and the reduction gear sets, or between the neighboring clutches and reduction gear sets.

Alternatively, the reduction gear input of each of the first and second reduction gear sets may instead be connected to the output part of the first and second clutches, respectively. Any component described elsewhere in these specifications as connected to the output part of the first and second clutches, may instead be connected to the reduction gear output of the first and second reduction gear sets, respectively.

In a twelfth aspect of the proposed technologies, an electric powertrain for an automotive road vehicle is provided that comprises: an electric motor comprising a motor shaft, and a bevel gear assembly according to the fifth aspect of the proposed technologies, wherein the gear input shaft of the bevel gear assembly is connected to the motor shaft of the electric motor.

The electric motor may comprise a stator and a rotor. The rotor may be connected to, comprise, or form a form part of, the motor shaft. The motor shaft may have a first shaft portion at, extending from, or accessible at, a first side of the electric motor and a second shaft portion at, extending from, or accessible at, an opposite second side of the electric motor. It may further have a central shaft portion connecting the first shaft portion and the second shaft portion. The gear input shaft may be connected to the first shaft portion. The first shaft portion, the central shaft portion, and the second shaft portion may be aligned, or coaxial. The rotor may be connected to, comprise, or form a form part of, the central shaft portion. The shaft portions are understood to be rigid or composed of parts that are rotationally fixed relative to one another during operation.

It is understood that the electric motor is configured to supply an output torque by the motor shaft, and that an output torque supplied by the motor shaft is received as an input torque by the gear input shaft.

The gear input shaft of the bevel gear assembly may be rotationally fixed to the motor shaft. This means that there is no mechanism that can decouple the bevel gear assembly from the motor shaft. Additionally, the gear input shaft may be synchronous with the motor shaft, which means that there is no torque conversion between the bevel gear assembly and the motor shaft, for example by mechanical gears, or a gear shifting mechanism.

The powertrain may further comprise a housing. The stator of the electric motor may be fixed, or rigidly attached, to the housing. The housing may comprise, or form, a bevel gear partition between, or in the space formed between, the electric motor and the bevel gear assembly. The powertrain may further comprise a radial rolling bearing connecting the motor shaft, or the gear input shaft, and the bevel gear partition. In other words, the powertrain may comprise a radial rolling bearing rotationally supporting the motor shaft, or the gear input shaft, relative to the bevel gear partition. This contributes to an improved support of the motor shaft and bevel gear.

Each of the above-described electric powertrains may further comprise a first wheel axle and a second wheel axle, which may constitute, or form, a pair of wheel axles. The abovementioned first wheel connector and second wheel connector may be connected, or rotationally fixed, to the first wheel axle and the second wheel axle, respectively. The first wheel connector and second wheel connector may be synchronous with the first wheel axle and the second wheel axle, respectively.

The clutch output of the first clutch may be connected to the first wheel axle and the clutch output of the second clutch may be connected to the second wheel axle. Alternatively, the first gear output shaft and the second gear output shaft of the differential may be connected to the first wheel axle and the second wheel axle, respectively.

The first wheel axle and the second wheel axle may extend in opposite directions. The first wheel axle and the second wheel axle may be rotationally fixed to the clutch output of the first clutch and the second clutch, or to first gear output shaft and the second gear output shaft of the differential, respectively. This means that there is no mechanism that can decouple the wheel axles from the clutch outputs or output shafts. Additionally, the first wheel axle and the second wheel axle may be synchronous with the clutch output of the first clutch and the second clutch, or with first gear output shaft and the second gear output shaft of the differential, respectively, which means that there is no torque conversion between the wheel axles and the clutch outputs or gear output shafts, for example by mechanical gears, or a gear shifting mechanism.

The electric powertrain may further comprise a first wheel and a second wheel. Alternatively worded, an automotive road vehicle may comprise a first wheel and a second wheel. The first wheel and the second wheel may be connected to the first wheel axle and the second wheel axle, or to the first wheel connector and the second wheel connector, respectively. The first wheel and the second wheel may constitute, or form, a pair of wheels.

The first wheel and the second wheel, or the first wheel connector and the second wheel connector, may be rotationally fixed to the first wheel axle and the second wheel axle, respectively. This means that there is no mechanism that can decouple the wheels from the wheel axles. Additionally, the first wheel and the second wheel may be synchronous with the first wheel axle and the second wheel axle, respectively, which means that there is no torque conversion between the wheels and the wheel axles, for example by mechanical gears, or a gear shifting mechanism.

Different electric powertrains are described having a first clutch and a second clutch. Each of the first clutch and the second clutch may have (a) an unengaged state in which the clutch input and the clutch output are unlocked and can spin at different speeds, (b) a slipping state in which the clutch input and the clutch output are partially locked together, or partially engaged by kinetic friction, and can spin at different speeds, and (c) an engaged state in which the clutch input and the clutch output are locked together, or fully engaged by static friction, and spin at the same speed.

It is understood that when the clutch input and the clutch output are unlocked, no torque is mechanically transferred there between. A torque transfer caused only by a fluid coupling, or a viscous drag, of a coolant or lubricant is not considered a mechanical torque transfer in this context. That the clutch input and the clutch output are partially locked together means that there is a slipping mechanical coupling between the clutch input and the clutch output. The slipping state is understood to encompass a partly engaged state. The clutch input and the clutch output being locked together means that there is a non-slipping mechanical coupling between the clutch input and the clutch output. It is understood that the first and second clutches can change from the unengaged state to the engaged state via the slipping state. The first and second clutches my also change instantaneously from the unengaged state to the engaged state, for example by a rapid activation of the clutch when the clutch input and clutch output rotate at the same speed, or from the engaged state to the unengaged state when no torque is supplied by clutch input. It is also understood that they can operate in the slipping state or the unengaged state for a prolonged period. It is understood that the amount of torque transferred between the clutch input and the clutch output in the slipping state can be changed, or varied, dynamically. The change can be continuous, or in small steps.

There is a certain resistance in permanent-magnet motors if its rotor is rotated. This resistance is typically greater than for inductions motors. Thus, it is advantageous if the electric motor that is used together with the first clutch and the second clutch is a permanent-magnet electric motor, since in the unengaged state the electric motor can be fully disconnected from the wheels, which allows for the vehicle to be propelled by other means without any resistance from the permanent-magnet motor, for example by another powertrain of the vehicle.

In a thirteenth aspect of the proposed technologies an electric powertrain for an automotive road vehicle is provided that comprises: an electric motor comprising a motor shaft having first shaft portion at, extending from, or accessible at, a first side of the electric motor and a second shaft portion at, extending from, or accessible at, an opposite second side of the electric motor. The powertrain further comprises: a first torque converter having a rear end coupled to the first shaft portion, a front end, and an output shaft exiting the first torque converter at, accessible at, or extending from, the front end, and a second torque converter having a rear end coupled to the second shaft portion, a front end, and an output shaft exiting the second torque converter at, accessible at, or extending from, the front end. Each of the first torque converter and the second torque converter is configured to receive an input torque at the rear end and to deliver an output torque with the output shaft.

The torque converters described here differs from the torque converters in the first and second aspects of the proposed technologies in that the output shaft does not exits the torque converters at the rear end. It is understood that rear end of each torque converter faces the electric motor, and that the electric motor is positioned between, or in the space formed between, the first torque converter and the second torque converter.

It is understood that the electric motor is configured to supply an output torque by the motor shaft, and that an output torque supplied by the motor shaft is received as an input torque by both torque converters. This way the output torque is divided between the first torque converter and the second torque converter.

The torque converters may comprise a fluid, which may be a liquid, such as an oil. The fluid may be contained in the torque converter during operation. The fluid may provide a fluid coupling between the rear end and the output shaft. It is understood that a torque converter can convert an input torque to an amplified, or greater, output torque.

As also explained elsewhere, the terms rear and front are to be construed as indicating relative positions with respect to the torque converter as such, not as absolute positions relative to the surroundings, such as the body of a vehicle or other components of the powertrain. For example, they could be replaced by the terms proximal and distal, or by the terms first side and second side, respectively.

The rear end of the first and second torque converter may be connected to the first and second shaft portions of the motor shaft, respectively. This means that there are no functional components between the torque converters and the electric motor.

The rear end of each of the first torque converter and the second torque converter may be rotationally fixed to the motor shaft. This means that there is no mechanism that can decouple the first and second torque converters from the motor shaft. Additionally, the rear ends may be synchronous with the motor shaft, which means that there is no torque conversion between the first and second torque converters and the motor shaft, for example by mechanical gears, or a gear shifting mechanism.

The electric motor may comprise a stator and a rotor. The motor shaft may constitute an input shaft connected to the rear end of each of the first and second torque converters. The motor shaft may be a monolithic structure, or it may be a composite structure composed of several individual parts that are joined together. For example, the motor shaft may in part, or fully, be composed of the rotor of the electric motor. The motor shaft is understood to be rigid or composed of parts that are rotationally fixed relative to one another during operation.

The powertrain may further comprise a housing. The stator of the electric motor may be rigidly attached to the housing. The housing may comprise, or form, a first torque converter partition between, or in the space formed between, the electric motor and the first torque converter. The powertrain may further comprise a first radial rolling bearing connecting the motor shaft and the first torque converter partition. In other words, the powertrain may comprise a first radial rolling bearing rotationally supporting the motor shaft relative to the first torque converter partition. This contributes to an improved support of the motor shaft and the rear end of the first torque converter.

The housing may comprise, or form, a second torque converter partition between, or in the space formed between, the torque converter and the second torque converter. The powertrain may further comprise a second radial rolling bearing connecting the motor shaft and the second torque converter partition. In other words, the powertrain may comprise a second radial rolling bearing rotationally supporting the motor shaft relative to the second torque converter partition. This contributes to an improved support of the motor shaft and the rear end of the second torque converter.

Each of the first torque converter and the second torque converter may have: a clutch having an (a) unengaged state in which the rear end and the output shaft are unlocked and can spin at different speeds, and an (b) engaged state in which the rear end and the output shaft are locked together, or fully engaged by static friction, and spin at the same speed. It is understood that the clutch operationally connects the rear end and the output shaft.

The clutch may further have a (c) slipping state in which the rear end and the output shaft are partially locked together, or partially engaged by kinetic friction, and can spin at different speeds.

When the clutch is in the unengaged state, it is understood that it does not mechanically transfers torque between the rear end and the output shaft. A torque transfer caused only by a fluid coupling, or a viscous drag, of the liquid in the torque converter is not considered a mechanical torque transfer in this context. That the rear end and the output shaft are partially locked together means that there is a slipping mechanical coupling between the cover and the output shaft. The slipping state is understood to encompass a partly engaged state, it is not to be construed as a pure fluid coupling. The rear end and the output shaft being locked together means that there is a non-slipping mechanical coupling between the rear end and the output shaft. It is understood the clutch changes from the unengaged state to the engaged state via the slipping state, or vice versa. The clutch may be configured to be continuously operated in the slipping state. This means that it can be operated in the slipping state for a period that is longer than the transition from the unengaged state to the engaged state.

The clutch may further have any of the features or function of the clutches for torque converters that are described elsewhere. For example, the clutch may be a lock-up clutch, which means that its ground state is the engaged state, and that it is activated to transition from the engaged state to the unengaged state. For example, the clutch may be spring biased to be in its engaged state.

The clutch may be hydraulically operated. It may be operated, or activated, by a change in the pressure, or flow, of a fluid contained in the torque converter, or in the enclosed space of the torque converter. The fluid may be the same as the fluid transferring torque from the impeller to the turbine.

The clutch may be an internal clutch. It is understood that in the engaged state the clutch transfers all torque supplied to the rear end to the output shaft. It is further understood that in the slipping state the clutch transfers some, or a fraction, of the torque supplied to the rear end to the output shaft.

The output shaft may comprise, or form, a shaft conduit configured to supply the fluid to the torque converter. This way, the pressure of the fluid in the torque converter can be regulated and the clutch can be operated from outside the torque converter.

The electric powertrain may further comprise a first wheel axle and a second wheel axle. The output shaft of the first torque converter may be connected to the first wheel axle and the output shaft of the second torque converter may be connected to a second wheel axle. The first wheel axle and the second wheel axle may extend in opposite directions.

The first wheel axle and the second wheel axle may be rotationally fixed to the output shaft of the first torque converter and the second torque converter, respectively. This means that there is no mechanism that can decouple the wheel axles from the output shafts. Additionally, the first wheel axle and the second wheel axle may be synchronous with output shaft of the first torque converter and the second torque converter, respectively, which means that there is no torque conversion between the wheel axles and the output shafts, for example by mechanical gears, or a gear shifting mechanism.

As mentioned above, the electric powertrain may further comprise a first wheel and a second wheel, or a first wheel connector, or first hub, for connecting to a first wheel and a second wheel connector, or a second hub, for connecting to a second wheel. The first wheel axle and the second wheel axle may be connected to the first wheel and the second wheel, or to the first wheel connector and the second wheel connector, respectively. This may be at the opposite ends of the axles relative to the torque converters.

The first wheel and the second wheel, or the first wheel connector and the second wheel connector, may be rotationally fixed to the first wheel axle and the second wheel axle, respectively. This means that there is no mechanism that can decouple the wheels from the wheel axles. Additionally, the first wheel and the second wheel, or the first wheel connector and the second wheel connector, may be synchronous with the first wheel axle and the second wheel axle, respectively, which means that there is no torque conversion between the wheels and the wheel axles, for example by mechanical gears, or a gear shifting mechanism.

The electric powertrain may further comprise a first reduction gear set and a second reduction gear set. Each of the first and second reduction gear sets has a reduction gear input, or reduction gear input part, and a reduction gear output, or reduction gear output part. Each of the first and second reduction gear sets may be configured as the reduction gear set described above in relation to the third aspect of the proposed technologies. Additionally, or alternatively, each of the first and second reduction may be a planetary gear set, which may have any of the features of the planetary gear set of the third aspect of the proposed technologies.

In an alternative to the rear end of the first and second torque converters being connected to the first and second shaft portions of the motor shaft, respectively, the reduction gear input of the first and second reduction gear sets may be connected to the first and second shaft portions of the motor shaft, respectively, and the rear end of the first and second torque converters may be connected to the reduction gear output of the first and second reduction gear sets, respectively. This means that there are no functional components between the electric motor and the reduction gear sets, or between the neighboring torque converters and reduction gear sets.

Alternatively, the reduction gear input of each of the first and second reduction gear sets may instead be connected to the output shaft exiting the first and second torque converters, respectively. Any component described elsewhere in these specifications as connected to the output shaft of the first and second torque converters, such as the abovementioned first and second wheel axles, may instead be connected to the reduction gear output of the first and second reduction gear sets, respectively.

In the different aspects of the proposed technologies, it is understood that the electric powertrain is a fully electric powertrain, which means that there is no combustion engine supplying torque to the powertrain. This is also mentioned above for some of the aspects of the proposed technologies. It is understood that the prime movers in an electric powertrain are without exception electric motors. In each of the above-described powertrains, the electric motor may be the only electric motor, or prime mover, of the powertrain. In other words, the powertrain comprises a single prime mover, and that the prime mover is the electric motor.

The electric motor is understood to encompass any type of electric motor, such as an induction motor or a permanent-magnet electric motor. The electric motor may be a permanent-magnet electric motor, which is advantageous in combination with the specified torque converters and the first and second clutches.

Different powertrains are described above. The electric powertrains may further comprise: an electric power storage, such as a battery, and an inverter operationally connecting the battery and the electric motor and configured to control the operation of the electric motor. For example, the inverter converts a Direct Current (DC) to an Alternating Current (AC). An inverter can change the rotational speed of a motor by adjusting the AC frequency. It can also increase or decrease the power or torque of an electric motor by adjusting the AC voltage or current. The powertrain may comprise a controller setting the operational parameters of the powertrain. For example, the controller may convert a pressure on the accelerator pedal to a signal setting the inverter to deliver an AC to the electric motor with a specific frequency, current, and voltage.

The electric power storage may be the only source of power for the electric motor. An electric power source, such as a fuel cell or a generator driven by a combustion engine, is not considered to form part of the electric powertrain. The generator is not coupled directly to the electric motor and the combustion engine is not a prime mover supplying torque to the powertrain. Additionally, a battery charger that supplies the battery with electric power, for example by converting an AC to a DC of a suitable voltage and current, is not considered a part of the powertrain.

If a powertrain comprises the above-described first clutch and second clutch, the powertrain may further comprise: a hydraulic control system operationally connected to the first clutch and a second clutch and configured to control the operation of the first clutch and the second clutch by the supply of a fluid, for example by individually maintaining or changing the state of the first clutch and the second clutch. The hydraulic control system may also be configured to cool and lubricate the first clutch and the second clutch by the supply of the fluid.

If a powertrain comprises the above-described torque converter, or torque converters, the powertrain may further comprise: a hydraulic control system operationally connected to the torque converter, or torque converters, and configured to control the operation of the torque converter, or torque converters, by the supply of a fluid, for example by maintaining or changing the state of the clutch in the torque converter, or torque converters. The hydraulic control system may also be configured to cool the torque converter, or torque converters. The fluid that is supplied by the hydraulic control system may be the fluid providing the fluid coupling in the torque converter.

If the powertrain has two torque converters, the amount of torque transferred in the slipping state can be changed, varied, or regulated. The hydraulic control system may be configured to dynamically regulate the amount of transferred torque depending on driving conditions, for example to provide torque vectoring.

If a powertrain comprises the above-described first clutch, second clutch, and torque converter, the powertrain may further comprise: a hydraulic control system operationally connected to the first clutch, second clutch, and torque converter and configured to control the operation of the first clutch, second clutch, and torque converter by the supply of a fluid. The hydraulic control system may also be configured to cool the first clutch, the second clutch, and the torque converter. This means that the same fluid is used for the first clutch, the second clutch, and the torque converter. The number of components can then be reduced, which contributes to a powertrain that is lighter and requires less space.

For the first clutch and the second clutch, the amount of torque transferred between the clutch input and the clutch output in the slipping state can be changed, varied, or regulated. The hydraulic control system may be configured for to dynamically regulate the amount of transferred torque depending on driving conditions, for example to provide torque vectoring.

In a fourteenth aspect of the proposed technologies, an automotive road vehicle is provided that comprises: a powertrain according to any of the above aspects of the proposed technologies including a powertrain.

It is understood that the automotive road vehicle may comprise a pair of wheels and a pair of wheel axles. The pair of wheels and the pair of wheel axles may form part of any of the powertrains described above, or the pair of wheels may be attached to the first and second wheel connectors described above. The electric motor of the powertrain may be the only prime mover of the automotive road vehicle. For example, this means that the vehicle does not have any combustion engine providing torque in the powertrain.

The automotive road vehicle may comprise an additional powertrain or a bevel gear assembly, according to any of the above aspects including a power train or a bevel gear assembly. It is understood that the automotive road vehicle may comprise a pair of additional wheels and a pair of additional wheel axles. These may form part of the additional powertrain, or the pair of additional wheels may be attached to first and second additional wheel connectors of the additional powertrain. It is understood that the additional wheels, additional wheel axles, and additional wheel connectors may be arranged in the same manner as the wheels, wheel axles, and wheel connectors in the different powertrains described above. The electric motors of the powertrain and the additional powertrains may be the only prime movers of the automotive road vehicle. This means that the vehicle does not have any combustion engine.

The powertrain and the additional powertrain may be of the same type, or of different types. The hydraulic control system may be operationally connected to the powertrain and the additional powertrain and configured to control the operation of these components. This means that the same fluid may be used in the control of the components of the powertrain and the additional power train.

The electric powertrains may further comprise an additional inverter operationally connecting the electric power storage, or battery, and the electric motor of the additional powertrain. The additional inverter may have any of the features and functions of the inverter described above. This means that the same electric power storage supplies electric power to the electric motors of both the powertrain and the additional powertrain. The inverter and the additional inverter may be configured to be operated independently from one another. This way, the electric motors of the powertrain and the additional powertrain can be operated independently, and the automotive road vehicle can selectively be operated in front-wheel drive, rear-wheel drive, or four-wheel drive.

The electric motor of the additional powertrain is understood to encompass both permanent-magnet motors and induction motors. The electric motor of the powertrain may be a permanent-magnet motor and the electric motor of the additional powertrain may be an induction motor. This allows for an optimization with respect to the different characteristics of the two types of motors.

The pair of wheels may be the rear wheels of the vehicle and the pair of additional wheels may be the front wheels of the vehicle. The front wheels may be the steering wheels.

In a fifteenth aspect of the proposed technologies, an automotive road vehicle according to the fourteenth aspect is provided having a powertrain according to the tenth aspect of the proposed technologies. The powertrain includes the pair of wheel axles and the vehicle comprises the pair of wheels. The powertrain further comprises: a drive shaft, or prop shaft, connected to the output shaft of the torque converter on the opposite side of the torque converter from, or relative to, the differential. The powertrain further comprises: a pair of additional wheel axles, and the vehicle further comprises: a pair of additional wheels, wherein each additional wheel is connected to a single additional wheel axle. The powertrain further comprises: an additional differential operationally connecting the drive shaft and the additional wheel axles.

It is understood that an output torque supplied by the output shaft of the torque converter is received by the drive shaft. This way, the output torque supplied by the torque converter is divided between the differential and the additional differential, and in extension between the pair of wheels and the pair of additional wheels, thus providing a vehicle with four-wheel drive with a single electric motor as the only prime mover. It is also understood that the additional differential is connecting to the drive shaft and to the additional wheel axles.

It is further understood that the pair of additional wheels comprises, or is constituted by, a first additional wheel and a second additional wheel. Similarly, the pair of additional wheel axles comprises, or is constituted by a first additional wheel axle and a second additional wheel axle. The first additional wheel axle is then connected to the first additional wheel, for example by a first additional wheel connector corresponding to the above described first wheel connector, and the second additional wheel axle is then connected to the second additional wheel, for example by a second additional wheel connector corresponding to the above described second wheel connector. Each of the additional wheel axles are individually connected to the additional differential.

The drive shaft may comprise first shaft portion connected to the output shaft of the torque converter and a second shaft portion connected to the additional differential, and a center clutch operationally connecting the first shaft portion and the second shaft portion. The center clutch may have a clutch input, or clutch input part, and a clutch output, or a clutch output part, wherein the clutch input of is connected to the first shaft portion and the clutch output part is connected to the second shaft portion. This means that the center clutch is connected to the first shaft portion and the second shaft portion.

The center clutch may have any of the features of the first and second clutches described above. For example, it may have (a) an unengaged state in which the clutch input and the clutch output are unlocked and can spin at different speeds, (b) a slipping state in which the clutch input and the clutch output are partially locked together and can spin at different speeds, and (c) an engaged state in which the clutch input and the clutch output are locked together and spin at the same speed.

The above-described hydraulic control system may be operationally connected to the center clutch and configured to control the operation of the center clutch by the supply of a fluid, for example for example by maintaining or changing the state of the center clutch. The hydraulic control system may also be configured to cool or lubricate the center clutch. The fluid that is supplied by the hydraulic control system may be the fluid providing the fluid coupling in the torque converter.

The hydraulic control system and the central clutch may be configured for to dynamically regulate the amount of torque that is transferred to the pair of additional wheels. This allows for the vehicle to have a selective four-wheel drive. The amount of torque may depend on driving conditions, for example to provide an optimal torque transfer by the wheel for faster acceleration. Additionally, the hydraulic control system and the central clutch may be configured for to compensate for the two pairs of wheels rotating at different speeds, for example when the vehicle is turning or hitting a bump in the road. This may be achieved by setting the central clutch in the slipping state.

The pair of wheels may be the rear wheels of the vehicle and the pair of additional wheels may be the front wheels of the vehicle. The front wheels may be the steering wheels. The additional differential may be an open differential, or a limited-slip differential. The electric motor of the powertrain may be the only prime mover of the automotive road vehicle. This means that the vehicle does not have any combustion engine.

In a sixteenth aspect of the proposed technologies, an automotive road vehicle according to the fourteenth aspect is provided, wherein the powertrain is according to the eighth aspect and includes the pair of wheel axles. The vehicle includes the above-mentioned pair of wheels. The powertrain further comprises: a drive shaft, or prop shaft, connected to the output shaft of the torque converter on the opposite side of the torque converter from, or relative to, the bevel gear assembly. The powertrain further comprises: a pair of additional wheel axles, and the vehicle further comprises: a pair of additional wheels, wherein each additional wheel is connected to a single additional wheel axle. The powertrain further comprises: a differential operationally connecting the drive shaft and the additional wheel axles.

It is understood that an output torque supplied by the output shaft of the torque converter is received by the drive shaft. This way, the output torque supplied by the torque converter is divided between the bevel gear assembly and the differential, and in extension between the pair of wheels and the pair of additional wheels, thus providing a vehicle with four-wheel drive with a single electric motor as the only prime mover. It is also understood that the differential is connecting to the drive shaft and to the additional wheel axles.

It is further understood that the pair of additional wheels comprises, or is constituted by, a first additional wheel and a second additional wheel. Similarly, the pair of additional wheel axles comprises, or is constituted by, a first additional wheel axle and a second additional wheel axle. The first additional wheel axle is then connected to the first additional wheel, for example by a first additional wheel connector corresponding to the above described first wheel connector, and the second additional wheel axle is then connected to the second additional wheel, for example by a second additional wheel connector corresponding to the above described second wheel connector. Each of the additional wheel axles are individually connected to the differential.

It should be noted that the drive shaft does not comprise a center clutch operationally connecting a first shaft portion and the second shaft portion, as in the previous aspect of the proposed technology. This means that the two ends of the drive shafts, or the first shaft portion and the second shaft portion, are connected to one another.

The powertrain comprises the above-described first clutch, second clutch, and torque converter. As described above, the powertrain may further comprise: a hydraulic control system operationally connected to the first clutch, second clutch, and torque converter and configured to control the operation of these components.

For the first clutch and the second clutch, the amount of torque transferred between the clutch input and the clutch output in the slipping state can be changed, varied, or regulated. The hydraulic control system may be configured to dynamically regulate the amount of transferred torque depending on driving conditions, or to dynamically change the state of the first and second clutches.

The differential is locked to the output shaft of the torque converter by the drive shaft, and the output shaft in turn is locked to the bevel gear assembly, or more precisely to its gear input shaft. This way, the first clutch, the second clutch, and the hydraulic control system may regulate the torque distribution between the pair of wheels and the pair of additional wheels. The amount of torque distributed to respective pair may depend on driving conditions, for example to provide an optimal torque transfer by the wheels for faster acceleration. Additionally, the hydraulic control system, the first clutch, and the second clutch may be configured to compensate for the two pairs of wheels rotating at different speeds, for example when the vehicle is turning or hitting a bump in the road. This may be achieved by setting the first clutch and the second clutch in the slipping or unengaged state.

The pair of wheels may be the rear wheels of the vehicle and the pair of additional wheels may be the front wheels of the vehicle. The front wheels may be the steering wheels. The differential may be an open differential, or a limited-slip differential. The electric motor of the powertrain may be the only prime mover of the automotive road vehicle. This means that the vehicle does not have any combustion engine.

In a seventeenth aspect of the proposed technologies, an automotive road vehicle according to the fourteenth aspect is provided having a powertrain according to the eighth aspect of the proposed technologies including the pair of wheel axles. The vehicle comprises the pair of wheels. The powertrain further comprises: a drive shaft, or prop shaft, connected to the output shaft of the torque converter on the opposite side of the torque converter from, or relative to, the bevel gear assembly. The powertrain further comprises: a pair of additional wheel axles, and the vehicle further comprises: a pair of additional wheels, wherein each additional wheel is connected to a single additional wheel axle. The powertrain further comprises: an additional bevel gear assembly according to the fifth aspect of the proposed technologies operationally connecting the drive shaft and the additional wheel axles.

This aspect of the proposed technologies is similar to the fifteenth aspect of the proposed technologies, with the difference that the differential has been replaced by the additional bevel gear assembly.

It is understood that an output torque supplied by the output shaft of the torque converter is received by the drive shaft. This way, the output torque supplied by the torque converter is divided between the bevel gear assembly and the additional bevel gear assembly, and in extension between the pair of wheels and the pair of additional wheels, thus providing a vehicle with four-wheel drive with a single electric motor as the only prime mover. It is also understood that the additional bevel gear assembly is connecting to the drive shaft and to the additional wheel axles.

It is further understood that the pair of additional wheels comprises, or is constituted by, a first additional wheel and a second additional wheel. Similarly, the pair of additional wheel axles comprises, or is constituted by, a first additional wheel axle and a second additional wheel axle. The first additional wheel axle is then connected to the first additional wheel, for example by a first additional wheel connector corresponding to the above described first wheel connector, and the second additional wheel axle is then connected to the second additional wheel, for example by a second additional wheel connector corresponding to the above described second wheel connector. Each of the additional wheel axles are individually connected to the additional bevel gear assembly. For example, the first additional wheel axle and the second additional wheel axle may be connected to the clutch output of the first clutch and the second clutch, respectively, of the additional bevel gear assembly.

The powertrain comprises the above-described first clutch, second clutch, and torque converter. As described above, the powertrain may further comprise: a hydraulic control system operationally connected to the first clutch, second clutch, and torque converter and configured to control the operation of these components. The hydraulic control system may further be operationally connected to the first clutch and the second clutch of the additional bevel gear, and it may be configured to control the operation of these components.

For the first clutch and the second clutch of the bevel gear assembly, the amount of torque transferred between the clutch input and the clutch output in the slipping state can be changed, varied, or regulated. The hydraulic control system may be configured to dynamically regulate the amount of torque transferred by the first clutch and the second clutch depending on driving conditions, or to dynamically change the state of the first and second clutches. It may be configured for torque vectoring with the pair of wheels. The first clutch and the second clutch of the additional bevel gear assembly may be operated in a similar, or the same, manner, and the hydraulic control system may be configured for torque vectoring with the pair of additional wheels.

The additional bevel gear assembly, or the gear input shaft of the additional bevel gear assembly, may be locked to the output shaft of the torque converter by the drive shaft. The output shaft in turn is locked to the bevel gear assembly, or more precisely to its the gear input shaft. This way the, the first clutch and the second clutch of both bevel gear assemblies may regulate the torque distribution between the pair of wheels and the pair of additional wheels. The amount of torque distributed to respective pair may depend on driving conditions, for example to provide an optimal torque transfer by the wheels for faster acceleration. Additionally, the hydraulic control system and the central clutch may be configured for to compensate for the two pairs of wheels rotating at different speeds, for example when the vehicle is turning or hitting a bump in the road. This may be achieved by setting the first clutch and the second clutch in the slipping or unengaged state.

The pair of wheels may be the rear wheels of the vehicle and the pair of additional wheels may be the front wheels of the vehicle. The front wheels may be the steering wheels. The electric motor of the powertrain may be the only prime mover of the automotive road vehicle. This means that the vehicle does not have any combustion engine.

In an eighteenth aspect of the proposed technologies, an automotive road vehicle according to the fourteenth aspect of the proposed technologies is provided with the powertrain according to the fourth aspect of the proposed technologies and including the pair of wheel axles. The vehicle also includes the above-mentioned pair of wheels.

The automotive road vehicle may further comprise an additional powertrain according to the fourth aspect of the proposed technologies including a pair of additional wheel axles. The vehicle may also comprise a pair of additional wheels. This provides a four-wheel drive without any drive shaft, or prop shaft, arranged between the pair of wheels and the pair of additional wheels, thus providing space for larger or more batteries.

It is understood that the pair of additional wheel axles and the pair of additional wheels may be arranged and connected in the same manner as the pair of wheel axles and pair of wheels.

As described above, the powertrain may further comprise: a hydraulic control system operationally connected to the first clutch, second clutch, and torque converter of the powertrain, and it may be configured to control the operation of these components. The hydraulic control system may further be operationally connected and configured to control the corresponding components of the additional powertrain.

For the first clutch and the second clutch of both the powertrain and the additional powertrain, the amount of torque transferred between the clutch input and the clutch output in the slipping state can be changed, varied, or regulated.

The hydraulic control system may be configured for to dynamically regulate the amount of torque transferred by the first clutch and the second clutch depending on driving conditions, or to dynamically change the state of the first and second clutches. It may be configured for torque vectoring with the pair of wheels and the pair of additional wheels. The first clutch and the second clutch of the additional bevel gear assembly may be operated in a similar, or the same, manner, and the hydraulic control system may be configured for torque vectoring with the pair of additional wheels.

The hydraulic control system may be configured to individually regulate the torque supplied by the pair of wheels and the pair of additional wheels. The amount of torque supplied by respective pair may depend on driving conditions, for example to provide an optimal torque transfer by the wheels for faster acceleration. Additionally, the hydraulic control system and the first clutch and second clutch of respective powertrain and additional powertrain may be configured to compensate for the two pairs of wheels rotating at different speeds, for example when the vehicle is turning or hitting a bump in the road. This may be achieved by setting the first clutch and/or the second clutch in the slipping or unengaged state.

The pair of wheels may be the rear wheels of the vehicle and the pair of additional wheels may be the front wheels of the vehicle. The front wheels may be the steering wheels. The electric motors of the powertrain and the additional powertrain may be the only prime movers of the automotive road vehicle. This means that the vehicle does not have any combustion engine.

In a nineteenth aspect of the proposed technologies, an automotive road vehicle according to the fourteenth aspect of the proposed technologies is provided with the powertrain according to the seventh aspect of the proposed technologies including the pair of wheel axles. The vehicle also includes the above-mentioned pair of wheels. The pair of wheels may be the rear wheels of the vehicle. Alternatively, the pair of wheels may be the front wheels of the vehicle. The front wheels may be the steering wheels.

The electric motor of the powertrain may be the only prime mover of the automotive road vehicle. This means that the vehicle does not have any combustion engine, or any additional electric motor. The automotive road vehicle may comprise a pair of additional wheels that are independent from, or not connected to, the powertrain.

In a twentieth aspect of the proposed technologies, an automotive road vehicle according to the fourteenth aspect of the proposed technologies is provided with the powertrain according to the seventh aspect of the proposed technologies including the pair of wheel axles. The vehicle also includes the above-mentioned pair of wheels. The automotive road vehicle further comprises: an additional powertrain according to the seventh aspect of the proposed technologies including a pair of additional wheel axles. The vehicle may also comprise a pair of additional wheels. It is understood that the pair of additional wheel axles and the pair of additional wheels may be arranged and connected in the same manner as the pair of wheel axles and the pair of wheels.

This provides a four-wheel drive without any drive shaft, or prop shaft, arranged between the pair of wheels and the pair of additional wheels, thus providing space for larger or more batteries.

It is understood that the pair of additional wheel axles and the pair of additional wheels may be arranged and connected in the same manner as the pair of wheel axles and the pair of wheels.

As described above, the powertrain may further comprise: a hydraulic control system operationally connected to the first clutch, second clutch, and torque converter of the powertrain, and it may be configured to control the operation of these components. The hydraulic control system may further be operationally connected and configured to control the corresponding components of the additional powertrain.

For the first clutch and the second clutch of both the powertrain and the additional powertrain, the amount of torque transferred between the clutch input and the clutch output in the slipping state can be changed, varied, or regulated. The hydraulic control system may be configured for to dynamically regulate the amount of torque transferred by the first clutch and the second clutch depending on driving conditions, or to dynamically change the state of the first and second clutches. It may be configured for torque vectoring with the pair of wheels and the pair of additional wheels.

The hydraulic control system may be configured to individually regulate the torque supplied by the pair of wheels and the pair of additional wheels. The amount of torque supplied to respective pair may depend on driving conditions, for example to provide an optimal torque transfer by the wheels for faster acceleration. Additionally, the hydraulic control system and the first clutch and second clutch of the powertrain and additional powertrain, respectively, may be configured to compensate for the two pairs of wheels rotating at different speeds, for example when the vehicle is turning or hitting a bump in the road. This may be achieved by setting the first clutch and the second clutch in the slipping or unengaged state.

The pair of wheels may be the rear wheels of the vehicle and the pair of additional wheels may be the front wheels of the vehicle. The front wheels may be the steering wheels. The electric motors of the powertrain and the additional powertrain may be the only prime movers of the automotive road vehicle. This means that the vehicle does not have any combustion engine.

In a twenty first aspect of the proposed technologies, the powertrain of the automotive road vehicle according to the twentieth aspect of the proposed technologies further comprises a tertiary electric motor having a motor shaft operationally connected to the bevel gear assembly, or the gear input shaft of the bevel gear assembly, of the powertrain.

It is understood that the tertiary electric motor is configured to supply an output torque by its motor shaft, and that the output torque is received as an input torque by the bevel gear assembly, or the gear input shaft of the bevel gear assembly. The electric motor of the powertrain may be positioned between the bevel gear assembly and the tertiary electric motor. Additionally, the motor shaft of the tertiary electric motor may be connected to the motor shaft of the electric motor. This way, the output torque from the tertiary motor is supplied to the bevel gear assembly via the motor shaft of the electric motor.

In this aspect of the proposed technology, the electric motors of the powertrain and the additional powertrain may be permanent-magnet motors. Additionally, the tertiary electric motor may be an induction motor. The latter may be configured to supply a greater output torque than the permanent-magnet motors, at least for a brief period, for example during rapid acceleration.

The electric powertrains may further comprise a tertiary inverter operationally connecting the electric power storage, or battery, and the tertiary electric motor of the powertrain. The tertiary inverter may have any of the features and functions of the inverter described above. The inverter, the additional inverter, and the tertiary inverter may be configured to be operated independently from one another. This way, power supplied may selectively be from a permanent-magnet motor and/or an induction motor.

In a twenty second aspect of the proposed technologies, an automotive road vehicle according to the fourteenth aspect of the proposed technologies is provided with the powertrain according to the ninth aspect of the proposed technologies. The powertrain further comprises: a first drive shaft, or first prop shaft, connected to the first gear output of the differential, and a second drive shaft, or first prop shaft, connected to the second gear output of the differential. The powertrain further comprises: a pair of wheel axles and the vehicle further comprises a pair of wheels, wherein each wheel is individually connected to a single wheel axle, and a first differential operationally connecting the first drive shaft and the pair of wheel axles. The powertrain further comprises: a pair of additional wheel axles and a pair of additional wheels, wherein each additional wheel is individually connected to a single additional wheel axle. The powertrain further comprises: a second differential operationally connecting the second drive shaft and the pair of additional wheel axles.

It is described above that the differential according to the ninth aspect of the proposed technologies has a gear input shaft, a first gear output shaft, and a second gear output shaft. It is understood that an output torque supplied by the first gear output shaft and the second gear output shaft is received by the first drive shaft and the second drive shaft, respectively. This means that the output torque supplied by the torque converter is divided between the first differential and the second differential, and in extension between the pair of wheels and the pair of additional wheels, thus providing a vehicle with four-wheel drive with a single electric motor as the only prime mover.

It is further understood that a pair of wheels, such as the pair of additional wheels, comprises, or is constituted by, a first wheel and a second wheel. Similarly, a pair of wheel axles, or additional wheel axles, comprises, or is constituted by, a first wheel axle and a second wheel axle. The first wheel axle is then connected to the first wheel and the second wheel axle is then connected to the second wheel. Each of the wheel axles are then individually connected to a differential. For example, each of the additional wheel axles is individually connected to the second differential Each of the differential, the first differential, and the second differential may be a limited-slip differential or an open differential. The pair of wheels may be the rear wheels of the vehicle and the pair of additional wheels may be the front wheels of the vehicle. The front wheels may be the steering wheels. The electric motor of the powertrain may be the only prime mover of the automotive road vehicle. This means that the vehicle does not have any combustion engine.

In a twenty third aspect of the proposed technologies, an automotive road vehicle according to the fourteenth aspect of the proposed technologies is provided with the powertrain according to the thirteenth aspect of the proposed technologies including the pair of wheel axles. The vehicle further includes the pair of wheels. The automotive road vehicle further comprises: an additional powertrain according to the thirteenth aspect of the proposed technologies including a pair of additional wheel axles, and the vehicles further includes a pair of additional wheels. It is understood that the pair of additional wheel axles and the pair of additional wheels may be arranged and connected in the same manner as the pair of wheel axles and the pair of wheels.

The additional powertrain enables a four-wheel drive without any drive shaft, or prop shaft, arranged between the pair of wheels and the pair of additional wheels, thus providing space for larger or more batteries. The pair of additional wheel axles and the pair of additional wheels of the additional powertrain may be arranged and connected in the same manner as the corresponding components of the powertrain.

As described above, the powertrain may further comprise: a hydraulic control system operationally connected to the first torque converter and the second torque converter of the powertrain, and it may be configured to control the operation of these components. The hydraulic control system may further be operationally connected and configured to control the corresponding components of the additional powertrain.

For the first torque converter and the second torque converter of both the powertrain and the additional powertrain, the amount of torque transferred in the slipping state can be changed, varied, or regulated. The hydraulic control system may be configured for to dynamically regulate the amount of torque transferred by the first torque converter and the second torque converter depending on driving conditions, or to dynamically change the state of the first and second torque converters. It may be configured for torque vectoring with the pair of wheels and the pair of additional wheels. Worded differently, the first torque converter and the second torque converter of the powertrain and the additional powertrain and the hydraulic control system may be configured for torque vectoring with the pair of wheels and the pair of additional wheels.

The hydraulic control system may be configured to individually regulate the torque supplied by the pair of wheels and the pair of additional wheels. The amount of torque supplied to respective pair may depend on driving conditions, for example to provide an optimal torque transfer by the wheels for faster acceleration. Additionally, the hydraulic control system and the first torque converter and second torque converter of respective powertrain and additional powertrain may be configured to compensate for the two pairs of wheels rotating at different speeds, for example when the vehicle is turning or hitting a bump in the road. This may be achieved by setting the first torque converter and the second torque converter of the powertrain and/or the additional powertrain in the slipping or unengaged state.

The pair of wheels may be the rear wheels of the vehicle and the pair of additional wheels may be the front wheels of the vehicle. The front wheels may be the steering wheels. The electric motors of the powertrain and the additional powertrain may be the only prime movers of the automotive road vehicle. This means that the vehicle does not have any combustion engine.

In a twenty fourth aspect of the proposed technologies, an automotive road vehicle according to the fourteenth aspect of the proposed technologies is provided with the powertrain according to the eleventh aspect of the proposed technologies including the pair of wheel axles. The vehicle includes the pair of wheels. The automotive road vehicle further has an additional powertrain according to the eleventh aspect of the proposed technologies including a pair of additional wheel axles, and the vehicle further has a pair of additional wheels. It is understood that the pair of additional wheel axles and the pair of additional wheels may be arranged and connected in the same manner as the pair of wheel axles and the pair of wheels.

The additional powertrain enables a four-wheel drive without any drive shaft, or prop shaft, arranged between the pair of wheels and the pair of additional wheels, thus providing space for larger or more batteries. The pair of additional wheel axles and the pair of additional wheels of the additional powertrain may be arranged and connected in the same manner as the corresponding components of the powertrain.

As described above, the powertrain may further comprise: a hydraulic control system operationally connected to the first clutch and the second clutch of the powertrain, and it may be configured to control the operation of these components. The hydraulic control system may further be operationally connected and configured to control the corresponding components of the additional powertrain.

For the first clutch and the second clutch of both the powertrain and the additional powertrain, the amount of torque transferred in the slipping state can be changed, varied, or regulated. The hydraulic control system may be configured for to dynamically regulate the amount of torque transferred by the first clutch and the second clutch depending on driving conditions, or to dynamically change the state of the first and second clutches. It may be configured for torque vectoring with the pair of wheels and the pair of additional wheels.

The hydraulic control system may be configured to individually regulate the torque supplied by the pair of wheels and the pair of additional wheels. The amount of torque supplied to respective pair may depend on driving conditions, for example to provide an optimal torque transfer by the wheels for faster acceleration. Additionally, the hydraulic control system and the first clutch and second clutch of respective powertrain and additional powertrain may be configured to compensate for the two pairs of wheels rotating at different speeds, for example when the vehicle is turning or hitting a bump in the road. This may be achieved by setting the first clutch and the second clutch in the slipping or unengaged state.

The pair of wheels may be the rear wheels of the vehicle and the pair of additional wheels may be the front wheels of the vehicle. The front wheels may be the steering wheels. The electric motors of the powertrain and the additional powertrain may be the only prime movers of the automotive road vehicle. This means that the vehicle does not have any combustion engine.

In a twenty fifth aspect of the proposed technologies, an electric powertrain is provided for an automotive road vehicle, wherein the vehicle has a first wheel and a second wheel forming a pair of wheels and first additional wheel and a second additional wheel forming an pair of additional wheels. The powertrain comprises: an electric motor and a drivetrain connected, or coupled, to the electric motor and configured to distribute, or transmit, torque from the electric motor to the pair of wheels and the pair of additional wheels. Alternatively worded, an electric powertrain is provided for an automotive road vehicle, wherein the powertrain comprises: an electric motor and a drivetrain connected, or coupled, to the electric motor. The drivetrain comprises a pair of wheel connectors, or hubs, and a pair of additional wheel connectors, or additional hubs, and is configured to distribute, or transmit, torque from the electric motor to the pair of wheel connectors and the pair of additional wheel connectors. It is understood that each wheel connector is configured to connect to a wheel.

In the below discussion, any feature or function relating to the pair of wheels and the pair of additional wheels may also apply to the pair of wheel connectors and the pair of additional wheel connectors, respectively. Any feature or function relating to the first wheel may also apply to one of the wheel connectors, and any feature or function relating to the second wheel may also apply to the other wheel connector. Similarly, any feature or function relating to the first additional wheel may also apply to one of the additional wheel connectors, and any feature or function relating to the second additional wheel may also apply to the other additional wheel connector.

Instead of an electric motor, the powertrain may comprise the drive assembly The drive assembly comprises: an electric motor and a torque converter according to the third aspect of the proposed technology, with the drivetrain instead coupled to the output shaft of the torque converter. This means that that the drivetrain is configured to distribute, or transmit, torque from the output shaft to the pair of wheel connectors and the pair of additional wheel connectors.

The drivetrain comprises: a final drive configured to convert torque at a first gear ratio, or first torque conversion. The drivetrain may further comprise: a first wheel axle connected, or coupled, to the final drive and configured to connect, or couple, to the first wheel, and a second wheel axle connected, or coupled, to the final drive and configured to connect, or couple, to the second wheel. Alternatively, the drivetrain may further comprise a first wheel axle connecting, or coupling, the final drive and one of the wheel connectors, and a second wheel axle connecting, or coupling, the final drive and the other of the wheel connectors. The drivetrain further comprises: an additional final drive configured to convert torque at a second gear ratio, or second torque conversion. The drivetrain may further comprise: a first additional wheel axle connected, or coupled, to the additional final drive and configured to connect, or couple, to the first additional wheel, and a second additional wheel axle connected, or coupled, to the additional final drive and configured to connect, or couple, to the second additional wheel. Alternatively, the drivetrain may further comprise a first additional wheel axle connecting, or coupling, the additional final drive and one of the additional wheel connectors, and a second additional wheel axle connecting, or coupling, the additional final drive and the other of the additional wheel connectors.

The first gear ratio and the second gear ratio are different. The drivetrain further comprises: a drive shaft, or prop shaft, connected to, coupled to, or connecting, the final drive and the additional final drive. The output shaft of the torque converter of the drive assembly may form part of the drive shaft. The drivetrain further comprises: a clutch arrangement configured to operate in an (a) unengaged state in which no torque is distributed from the electric motor to the pair of wheels and an (b) engaged state in which torque is distributed from the electric motor to the pair of wheels, and an additional clutch arrangement configured to operate in an (a) unengaged state in which no torque is distributed form the electric motor to the pair of additional wheels and an (b) engaged state in which torque is distributed from the electric motor to the pair of additional wheels. If the powertrain has a drive assembly, the above-described torque distributions is instead from the output shaft of the torque converter of the drive assembly. If the powertrain instead of a pair of wheels has a pair of wheel connectors, the above-described torque distributions is instead to the pair of wheel connectors.

Worded differently, the clutch arrangement is configured to connected and disconnect the pair of wheels to and from the torque supply from the electric motor, or from the torque supply from the output shaft of the torque converter of the drive assembly, and the additional clutch arrangement is configured to connected and disconnect the pair of additional wheels, to and from the torque supply from the electric motor, or from the output shaft of the torque converter of the drive assembly.

It is understood that the electric motor, or the output shaft of the torque converter of the drive assembly, is configured to supply the torque to the drivetrain. It is further understood that the drivetrain is connected, or coupled, to the electric motor, or to the output shaft of the torque converter of the drive assembly, for receiving torque therefrom. The electric motor, or the electric motor of the drive assembly, may be a single electric motor of the powertrain. This means that there is no other electric motor delivering torque to the pair of wheels and the pair of additional wheels via the drivetrain.

The first clutch arrangement and the second clutch arrangement form part of the drivetrain. Thus, the distribution of torque by the clutch arrangements constitutes a distribution of torque by the drivetrain.

A shaft or axle are understood as a rotating mechanical element by which torque, or power, can be transmitted between mechanical elements. It is understood to encompass a rotating coupling, or connection, and is not as limited to elongated mechanical elements. The shaft or axle may be monolithic or composed of several elements. The shaft or axle is understood to transmit, or transfer, torque at a fixed gear ratio. This means that the shaft or axle cannot include a gear-shifting mechanism. Each shaft or axle, or portions thereof, described here may be rigid, which means that its opposed ends are rotationally fixed, or locked, and cannot be decoupled from one another, for example by a clutch.

The drive shaft being connected to the first and second final drives and the first and second final drives having different gear ratios means that the pair of wheels will rotate at a different speed relative to the additional wheels, which would lock the wheels when driving. This would result in malfunction of the drivetrain even at small differences in the gear ratios. The clutch arrangements allow for the for the pair of wheels to be receive torque form the electric motor, or the output shaft of the torque converter of the drive assembly, while the pair of additional wheels are disconnected, and vice versa, thus preventing the wheels from locking.

Typically, an electric motor has the best efficiency within a predetermined interval of rotational speeds. The first gear ratio of the final drive and the predetermined interval determines a first interval of rotational speeds of the pair of wheels. Similarly, the second gear ratio of the additional final drive and the predetermined interval determines a second interval of rotational speeds of the pair of additional wheels, which is different from the first interval of rotational speeds. By selecting which of the wheel pairs to connect to the electric motor, or to the output shaft of the torque converter, an improved performance is achieved without any dedicated gear shifting mechanism.

The final drive and the additional final drive may be the only torque converting components of the drivetrain. Here, a torque reduction of a clutch in a slipping state is not considered a torque conversion.

The final drive and the additional final drive may be rotationally fixed or locked. The drive shaft may rotationally fix, or lock, the final drive and the additional final drive. It is understood that the final drive and the additional final drive being rotationally fixed, or locked, is a permanent feature. This means that there can be no decoupling clutches between the final drive and the additional final drive. The final drive and the additional final drive may be synchronous. The drive shaft may force the final drive and the additional final drive to be synchronous. It is understood that the final drive and the additional final drive being synchronous is a permanent feature. This means that both ends of the drive shaft rotate at the same rate. This means that there is no torque conversion between the final drive and the additional final drive, such as a reduction gear.

The drive shaft may as a whole may be rigid. It may be composed of several portions with neighboring portions being rigidly attached to one another. For example, the output shaft of the torque converter may form part of the drive shaft. This means that the drive shaft is not interrupted by any mechanical component.

The final drive and the first and second wheel axles may be rotationally fixed, or locked. The final drive and the first and second wheel axles may be synchronous. The first and second wheel axles may be configured to rotationally fix, or lock, the final drive and the first and second wheels, respectively. Similarly, first and second wheel axles may be rotationally fixed, or locked, to the wheel connectors. The first and second wheel axles may force the final drive and the first and second wheels, respectively, to be synchronous. The additional final drive, the first and second additional wheel axles, and the first and second additional wheels may have the corresponding rotational fixing and synchronization. The additional final drive, the first and second additional wheel axles, and the additional wheel connectors may be connected as described for the final drive, the first and second wheel axles, and the wheel connectors.

Two components being rotationally fixed, or locked means that there is no mechanism that can decouple the components from one another, such as a clutch. Two components being synchronous means that there is no torque conversion between the components, such as mechanical gears, or gear shifting mechanisms. As mentioned above, a clutch is understood to provide no torque conversion. It may provide a torque reduction in a slipping state. If there is a clutch between components, it is understood that they are synchronous with the clutch in an engaged state.

The final drive may comprise an input shaft or central shaft, a first output shaft or first side shaft, and a second output shaft or second side shaft, and may be configured to convert torque received by the input shaft to torque supplied by the first output shaft and the second output shaft, or vice versa, at the first gear ratio, or first torque conversion. The first wheel axle is then connected, or coupled, to the first output shaft, and the second wheel axle is then connected, or coupled, to the second output shaft.

The additional final drive may comprise an additional input shaft or additional central shaft, a first additional output shaft or first additional side shaft, and a second additional output shaft or additional second side shaft, and may be configured to convert torque received by the additional input shaft to torque supplied by the first additional output shaft and the second additional output shaft, or vice versa, at the second gear ratio, or second torque conversion. The first additional wheel axle is then connected, or coupled, to the first additional output shaft, and the second additional wheel axle is then connected, or coupled, to the second additional output shaft. Additionally, the drive shaft, or prop shaft, may be connected, or coupled, to the input shaft of the final drive and to the additional input shaft of the additional final drive, The input shaft of the final drive may be rotationally fixed, or locked, to the input shaft of the additional final drive, for example by the drive shaft. The drive shaft may rotationally fix, or lock, the input shaft of the final drive to the input shaft of the additional final drive. The input shaft of the final drive and the input shaft of the additional final drive may be synchronous. The drive shaft may force the input shaft of the final drive and the input shaft of the additional final drive to be synchronous.

The first and second output shafts of the final drive may be rotationally fixed, or locked, to the input shaft of the additional final drive. The first output shaft may be rotationally fixed to the second output shaft forming a single output shaft. The first and second output shafts may be synchronous. Alternatively, the final drive may be configured to allow the first output shaft and the second output shaft to rotate relative to one another, for example when forming part of a differential.

The first and second wheel axles may respectively be rotationally fixed, or locked, to the first and second output shafts. The first and second output shafts and the respective first and second wheel axles may be synchronous. The first and second wheel axles may be configured to respectively rotationally fix, or lock, the first and second wheels to the first and second output shafts. The first and second additional output shafts, the additional input shaft, the first and second additional wheel axles, and the first and second additional wheels may have the corresponding rotational fixing and synchronization. The additional final drive may be configured to allow the first additional output shaft and the second additional output shaft to rotate relative to one another.

The electric motor may comprise a stator and rotor, and the rotor may be configured to supply the torque to the drivetrain.

The clutch arrangement may be configured to operate in a (c) slipping state, or partly engaged state, in which the pair of wheels are slipping relative to the rotor, or partly locked to the rotor or to the drive shaft. Similarly, the additional clutch arrangement may be configured to operate in a (c) slipping state, or partly engaged state, in which the pair of additional wheels are slipping relative to the rotor, or partly locked to the rotor or to the drive shaft.

This allows for a limited selective four-wheel drive. When the clutch arrangement and the additional clutch arrangement are in the (a) unengaged state, it is understood that there is no mechanical torque transfer between the electric motor, or the output shaft of the torque converter of the drive assembly, and the pair of wheels and the pair of additional wheels, respectively. A torque transfer caused only by a fluid coupling, or a viscous drag, of a fluid is not considered a mechanical torque transfer.

When the clutch arrangement or the additional clutch arrangement are in the (b) engaged state, it is understood that there is a mechanical torque transfer without any slippage between the electric motor, or the output shaft of the torque converter of the drive assembly, and the pair of wheels or the pair of additional wheels, respectively. This means that the rotation of the pair of wheels or the pair of additional wheels is locked to the rotation of the electric motor, the rotor of the electric motor, or the output shaft of the torque converter of the drive assembly.

The respective clutch arrangement and additional clutch arrangement may be configured to change instantaneously from the (a) unengaged state to the (b) engaged state, and vice versa. The respective clutch arrangement and additional clutch arrangement may be configured to change from the (a) unengaged state to the (b) engaged state via the (c) slipping state.

When the clutch arrangement and the additional clutch arrangement are in the (c) slipping state, it is understood that, in comparison with the (b) engaged state, there is a limited, or reduced, mechanical torque transfer between the electric motor, or the output shaft of the torque converter of the drive assembly, and the pair of wheels and the pair of additional wheels, respectively. That the pair of wheels and the pair of additional wheels are slipping relative to the rotor, or partly locked to the rotor, means that there is a slipping mechanical coupling between the cover and the output shaft.

In the (a) unengaged state there may be no static and no kinetic friction in the distribution of torque. In the (b) engaged state there may be a static friction and no kinetic friction in the distribution of torque. In the (c) slipping state there may be a kinetic friction and no static friction in the distribution of torque.

The clutch arrangement may further be configured to operate in the (b) engaged state or (c) slipping state simultaneously to the additional clutch arrangement operating in the (c) slipping state. Similarly, the additional clutch arrangement may be configured to operate in the (b) engaged state or (c) slipping state simultaneously to the clutch arrangement operating in the (c) slipping state. This allows for four-wheel drive of the vehicle. The clutch arrangement and the additional clutch arrangement may be configured to continuously, or intermittently, operate in the (c) slipping state. This means that they can be operated in the (c) slipping state for a period that is longer than a transition from the (a) unengaged state to the (b) engaged state.

The clutch arrangement may comprise: a center clutch connected, or coupled, to the drive shaft, or positioned in the drivetrain between the final drive and the additional final drive, wherein the center clutch provides the operation of the clutch arrangement.

It is understood that the center clutch is operationally connected, or coupled, to the drive shaft. It may form part of the drive shaft. The center clutch may be the only clutch of the clutch arrangement.

The center clutch may have a clutch input, or clutch input part, and a clutch output, or a clutch output part. The drive shaft may comprise a first shaft portion and a second shaft portion. The center clutch may operationally connect the first shaft portion and the second shaft portion. The first shaft portion and the second shaft portion may be parallel or coaxial. The output shaft of the torque converter of the drive assembly may form part of the first shaft portion of the drive shaft.

The first shaft portion may be connected, or coupled to the center clutch, or the clutch input of the center clutch. The second shaft portion may be connected, or coupled to the center clutch, or the clutch output, of the center clutch, and to the final drive, or the input shaft of the final drive.

The final drive may be rotationally fixed, or locked, to the center clutch. The drive shaft may rotationally fix, or lock, the final drive to the center clutch. The final drive and the center clutch may be synchronous. The drive shaft, or the second shaft portion, may force the final drive and the center clutch to be synchronous.

The first shaft portion may be rotationally fixed, or locked, to the center clutch, or the clutch input of the center clutch. The first shaft portion and the center clutch, or the clutch input of the center clutch may be synchronous. The center clutch or the output of the center clutch, the second shaft portion, and the final drive or the input shaft of the final drive may be rotationally fixed or locked. Additionally, or alternatively, they may be synchronous.

The first shaft portion may be connected, or coupled to the, the additional final drive, or the input shaft of the additional final drive. The first shaft portion and the input shaft of the additional final drive may be rotationally fixed or locked. Additionally, or alternatively, they may be synchronous.

In combination with the center clutch, the final drive, or to the first output shaft of the final drive, and the first wheel may be rotationally fixed, or locked. Additionally, or alternatively, they may be synchronous. The first output shaft, the first wheel axle, and the first wheel may be rotationally fixed, or locked. Additionally, or alternatively, they may be synchronous.

Similarly, the final drive, or to the second output shaft of the final drive, and the second wheel may be rotationally fixed, or locked. Additionally, or alternatively, they may be synchronous. The second output shaft, the second wheel axle, and the second wheel may be rotationally fixed, or locked. Additionally, or alternatively, they may be synchronous.

It is specified above that features and functions relating to the wheels may also be present for the wheel connectors. Thus, if the drivetrain has a pair of wheel connectors, the first output shaft, the first wheel axle, and one of the wheel connectors may be rotationally fixed, or locked, and the second output shaft, the second wheel axle, and the other wheel connector may be rotationally fixed, or locked.

The final drive may comprise a differential. This allows the first and second additional wheels to rotate at different speeds, for example when the vehicle is turning.

The clutch arrangement may comprise: a first clutch connected, or coupled, to the first wheel axle, or positioned in the drivetrain between the final drive and the first wheel, and a second clutch connected, or coupled, to the second wheel axle, or positioned in the drivetrain between the final drive and the second wheel, wherein the first clutch and the second clutch provide the operation of the clutch arrangement.

It is understood that the first and second clutches are operationally connected, or coupled, to the first and second wheel axles, respectively. They may form part of the first and second wheel axles. The first and second clutches may be the only clutches of the clutch arrangement.

The first clutch may have a clutch input, or clutch input part, and a clutch output, or a clutch output part. The first wheel axle may comprise a first axle portion and a second axle portion. The first clutch may operationally connect the first axle portion and the second axle portion. The first axle portion and the second axle portion of the first wheel axle may be parallel or coaxial. The clutch input may be connected to the first axle portion of the first wheel axle and the clutch output may be connected to the second axle portion of the first wheel axle.

The first axle portion may be connected, or coupled, to the final drive, or to the first output shaft of the final drive and to the first clutch, or the clutch input of the first clutch. The second axle portion may be connected, or coupled, to the first clutch, or the clutch output of the first clutch. It may further be configured to be connected, or coupled, to the first wheel.

The final drive, or the first output shaft of the final drive, may be rotationally fixed, or locked, to the first clutch, or the clutch input of the first clutch. The final drive, or the first output shaft of the final drive, and the first clutch, or the clutch input of the first clutch, may be synchronous. The first output shaft of the final drive, the first axle portion of the first wheel axle, and the clutch input of the first clutch may be rotationally fixed, or locked, to each other. Additionally, or alternatively, they may be synchronous.

The first clutch, or the clutch output of the first clutch, may be configured to be rotationally fixed, or locked, to the first wheel. The first clutch, or the clutch output of the first clutch, may be configured to be synchronous with the first wheel. The first clutch, or the clutch output of the first clutch, and the second axle portion, may be rotationally fixed, or locked, to each other. Additionally, or alternatively, they may be synchronous. The second axle portion may be configured to be rotationally fixed, or locked, to the first wheel, and/or synchronous with the first wheel.

The second clutch may have a clutch input, or clutch input part, and a clutch output, or a clutch output part. The second wheel axle may comprise a first axle portion and a second axle portion. The final drive, the second output shaft of the final drive, the second clutch, the clutch input of the second clutch, the clutch output of the second clutch, the first axle portion of the second wheel axle, the second axle portion of the second wheel axle, and the second wheel may be arranged in the same way as the described above for the final drive, the first output shaft of the final drive, the first clutch, the clutch input of the first clutch, the clutch output of the first clutch, the first axle portion of the first wheel axle, the second axle portion of the first wheel axle, and the first wheel.

The additional clutch arrangement may comprise: an additional center clutch connected, or coupled, to the drive shaft, or positioned in the drivetrain between the final drive and the additional final drive, wherein the additional center clutch provides the operation of the additional clutch arrangement.

It is understood that the additional center clutch is operationally connected, or coupled, to the drive shaft. It may form part of the drive shaft. The additional center clutch may be the only clutch of the additional clutch arrangement.

The additional center clutch may have a clutch input, or clutch input part, and a clutch output, or a clutch output part. The drive shaft may comprise a first additional shaft portion and a second additional shaft portion. The additional center clutch may operationally connect the first additional shaft portion and the second additional shaft portion. The first additional shaft portion and the second additional shaft portion may be parallel or coaxial. The output shaft of the torque converter of the drive assembly may form part of the first additional shaft portion of the drive shaft.

The first additional shaft portion may be connected, or coupled to the additional center clutch, or the clutch input of the additional center clutch. The second additional shaft portion may shaft portion may be connected, or coupled to the additional center clutch, or the clutch output of the additional center clutch, and to the additional final drive, or the additional input shaft of the additional final drive.

The additional final drive may be rotationally fixed, or locked, to the additional center clutch. The drive shaft may rotationally fix, or lock, the additional final drive to the additional center clutch. The additional final drive and the additional center clutch may be synchronous. The drive shaft, or the second additional shaft portion, may force the additional final drive and the additional center clutch to be synchronous.

The first additional shaft portion may be rotationally fixed, or locked, to the additional center clutch, or the clutch input of the additional center clutch. The additional first shaft portion and the additional center clutch, or the clutch input of the additional center clutch may be synchronous. The additional center clutch or the output of the additional center clutch, the second additional shaft portion, and the additional final drive or the additional input shaft of the additional final drive may be rotationally fixed or locked. Additionally, or alternatively, they may be synchronous.

The first shaft portion and the first additional shaft portion may be parallel or coaxial. The first shaft portion and the first additional shaft portion may be rotationally fixed, or locked, to one another. Additionally, or alternatively, they may be synchronous. The first shaft portion and the additional shaft portion may be the same.

If there is no center clutch, the first additional shaft portion may be connected, or coupled to the final drive, or to the input shaft of the final drive. The first additional shaft portion and the input shaft of the final drive may be rotationally fixed or locked. Additionally, or alternatively, they may be synchronous.

In combination with the additional center clutch, the additional final drive, or to the first additional output shaft of the additional final drive, and the first additional wheel may be rotationally fixed, or locked. Additionally, or alternatively, they may be synchronous. The first additional output shaft, the first additional wheel axle, and the first additional wheel may be rotationally fixed, or locked. Additionally, or alternatively, they may be synchronous.

Similarly, the additional final drive, or to the second additional output shaft of the additional final drive, and the second additional wheel may be rotationally fixed, or locked. Additionally, or alternatively, they may be synchronous. The second additional output shaft, the second additional wheel axle, and the second additional wheel may be rotationally fixed, or locked. Additionally, or alternatively, they may be synchronous.

It is specified above that features and functions relating to the additional wheels may also be present for the additional wheel connectors. Thus, if the drivetrain has a pair of additional wheel connectors, the first additional output shaft, the first additional wheel axle, and one of the additional wheel connectors may be rotationally fixed, or locked, and the second additional output shaft, the second additional wheel axle, and the other additional wheel connector may be rotationally fixed or locked.

The additional final drive may comprise a differential. This allows the first and second additional wheels to rotate at different speeds, for example when the vehicle is turning.

The clutch arrangement may comprise: a first additional clutch connected, or coupled, to the first additional wheel axle, or positioned in the drivetrain between the additional final drive and the first additional wheel, and a second additional clutch connected, or coupled, to the second additional wheel axle, or positioned in the drivetrain between the additional final drive and the second additional wheel, wherein the first additional clutch and the second additional clutch provide the operation of the additional clutch arrangement.

It is understood that the first and second additional clutches are operationally connected, or coupled, to the first and second wheel axles, respectively. They may form part of the first and second wheel axles. The first and second additional clutches may be the only clutches of the additional clutch arrangement.

The first additional clutch may have a clutch input, or clutch input part, and a clutch output, or a clutch output part. The first additional wheel axle may comprise a first axle portion and a second axle portion. The first additional clutch may operationally connect the first axle portion and the second axle portion. The first axle portion and the second axle portion of the first additional wheel axle may be parallel or coaxial. The clutch input may be connected to the first axle portion of the first additional wheel axle and the clutch output may be connected to the second axle portion of the additional first wheel axle.

The first axle portion may be connected, or coupled, to the additional final drive, or to the first additional output shaft of the additional final drive and to the first additional clutch, or the clutch input of the first additional clutch. The second axle portion may be connected, or coupled, to the first additional clutch, or the clutch output of the first additional clutch and may be configured to be connected, or coupled, to the first additional wheel.

The additional final drive, or the first additional output shaft of the additional final drive, may be rotationally fixed, or locked, to the first additional clutch, or the clutch input of the first additional clutch. The additional final drive, or the additional first output shaft of the additional final drive, and the additional first clutch, or the clutch input of the first additional clutch, may be synchronous. The first additional output shaft of the additional final drive, the first axle portion of the first additional wheel axle, and the clutch input of the first additional clutch may be rotationally fixed, or locked, to each other. Additionally, or alternatively, they may be synchronous.

The first additional clutch, or the clutch output of the first additional clutch, may be configured to be rotationally fixed, or locked, to the first additional wheel. The first additional clutch, or the clutch output of the first additional clutch, may be configured to be synchronous with the first additional wheel. The first additional clutch, or the clutch output of the first additional clutch, and the second axle portion, may be rotationally fixed, or locked, to each other. Additionally, or alternatively, they may be synchronous. The second axle portion may be configured to be rotationally fixed, or locked, to the first wheel, and/or synchronous with the first additional wheel.

The second additional clutch may have a clutch input, or clutch input part, and a clutch output, or a clutch output part. The second additional wheel axle may comprise a first axle portion and a second axle portion. The additional final drive, the second additional output shaft of the additional final drive, the second additional clutch, the clutch input of the second additional clutch, the clutch output of the second additional clutch, the first axle portion of the second additional wheel axle, the second axle portion of the second additional wheel axle, and the second additional wheel may be arranged in the same way as the described above for the additional final drive, the first additional output shaft of the additional final drive, the first additional clutch, the clutch input of the first additional clutch, the clutch output of the first additional clutch, the first axle portion of the first additional wheel axle, the second axle portion of the first additional wheel axle, and the first additional wheel.

Providing the operation of a clutch arrangement is understood to encompass providing the (a) unengaged state and the (b) engaged state of the clutch arrangement. It may further encompass providing the (c) slipping state of the clutch arrangement.

Each of the center clutch, the first clutch, and the second clutch may have an (a) unengaged state in which the clutch input and the clutch output are unlocked and can spin at different speeds, an (b) engaged state in which the clutch input and the clutch output are locked together, or fully engaged by static friction, and spin at the same speed. They may further have a (c) a slipping state in which the clutch input and the clutch output are partially locked together, or partially engaged by kinetic friction, and can spin at different speeds. The states are presented in a different order than previously in the specifications. The change is order is not to be construed as a change in function.

As for the earlier described clutches, it is understood that when the clutch input and the clutch output are unlocked, no torque is mechanically transferred there between. A torque transfer caused only by a fluid coupling, or a viscous drag, of a coolant or lubricant is not considered a mechanical torque transfer in this context. That the clutch input and the clutch output are partially locked together means that there is a slipping mechanical coupling between the clutch input and the clutch output. The slipping state is understood to encompass a partly engaged state. The clutch input and the clutch output being locked together means that there is a non-slipping mechanical coupling between the clutch input and the clutch output.

It is understood that the center clutch, the first clutch, and the second clutch can change from the (a) unengaged state to the (b) engaged state via the (c) slipping state. The clutches may also be configured change instantaneously from the (a) unengaged state to the (b) engaged state, for example by a rapid activation of the clutch when the clutch input and clutch output rotate at the same speed, or from the (b) engaged state to the (a) unengaged state when no torque is supplied by clutch input. They may be configured to operate in the (c) slipping state or the unengaged state for a prolonged period. The clutch may be configured to be continuously operated in the (c) slipping state. This means that it can be operated in the (c) slipping state for a period that is longer than a transition from the (a) unengaged state to the (b) engaged state. It is understood that the amount of torque transferred between the clutch input and the clutch output in the slipping state can be changed, varied, or regulated dynamically. The change can be continuous, or in small steps.

Each of the center clutch, the first clutch, and the second clutch may be a locking clutch, which means that it is in the (a) unengaged state when not activated, and that when it is activated it transitions from the (a) unengaged state to the (b) engaged state. For example, the clutch may be spring biased to be in its (a) unengaged state.

The additional center clutch, the first additional clutch, and the second additional clutch may have the same features, or be arranged in the same manner, as the center clutch, the first clutch, and the second clutch, respectively.

Each of the first and second clutches, the first and second additional clutches, the center clutch, and the additional center clutch may be hydraulically operated. The drivetrain may further comprise: a hydraulic control system operationally connected to each of the clutches and configured to control the operation of the clutches by a supply of a fluid, or hydraulic fluid, for example by individually maintaining or changing the state of the clutches. The hydraulic control system may also be configured to cool and lubricate the clutches by the supply of the fluid. The hydraulic control system may be the above-described hydraulic control system.

The hydraulic control system and the first clutch arrangement may be configured to provide torque vectoring with the first wheel and the second wheel. Similarly, the hydraulic control system the additional clutch arrangement may be configured to provide torque vectoring with the first additional wheel and the second additional wheel. hydraulic control system, the clutch arrangement, and the additional clutch arrangement may be configured to provide a four-wheel drive with the pair of wheels and the pair of additional wheels.

For the first clutch and the second clutch, the amount of torque transferred between the clutch input and the clutch output in the slipping state may be changed, varied, or regulated by the hydraulic control system. Similarly, for the first additional clutch and the second additional clutch, the amount of torque transferred between the clutch input and the clutch output in the slipping state may be changed, varied, or regulated hydraulic control system. The hydraulic control system may be configured for to dynamically regulate the amount of transferred torque depending on driving conditions, for example to provide torque vectoring or four-wheel drive.

The electric motor may be connected, or coupled to the drive shaft, or positioned in the drivetrain, between the final drive and the additional final drive, or between the clutch arrangement and the additional clutch arrangement.

This means that the electric motor is configured to supply the torque to the drive shaft. If the clutch arrangement has the center clutch, the center clutch may be connected, or coupled, to the drive shaft, or positioned in the drivetrain, between the electric motor and the final drive. If the additional clutch arrangement has the additional center clutch, the additional center clutch may be connected, or coupled, to the drive shaft, or positioned in the drivetrain, between the electric motor and the additional final drive. If clutch arrangement has the center clutch and the additional clutch arrangement has the additional center clutch, the electric motor may be connected, or coupled, to the drive shaft, or positioned in the drivetrain, between the center clutch and the additional center clutch.

If the drive shaft comprises the first shaft portion, the electric motor, or the rotor of the electric motor, may be connected, or coupled, to the first shaft portion, or the electric motor may be configured to supply torque to the first shaft portion. The electric motor, or the rotor of the electric motor, may be rotationally fixed, or locked, to the first shaft portion. The electric motor, or the rotor of the electric motor, and the first shaft portion may be synchronous.

The electric motor, or the rotor of the electric motor, may be rotationally fixed, or locked, to the center clutch, or the clutch input of the center clutch. Additionally, or alternatively, they may be synchronous.

If the drive shaft comprises the first additional shaft portion, the electric motor, or the rotor of the electric motor, may be connected, or coupled, to the first additional shaft portion, or the electric motor may be configured to supply torque to the first additional shaft portion. The electric motor, or the rotor of the electric motor, may be rotationally fixed, or locked, to the first additional shaft portion. The electric motor, or the rotor of the electric motor, and the first additional shaft portion may be synchronous.

The electric motor, or the rotor of the electric motor, may be rotationally fixed, or locked, to the additional center clutch, or the clutch input of the additional center clutch. Additionally, or alternatively, they may be synchronous.

The first shaft portion and the first additional shaft portion may be the same, or be connected to each other, for example via the rotor of the electric motor.

Different arrangements of the electric motor and the rotor of the electric motor are described above in relation to the drive shaft and the center clutch. If the powertrain has a drive assembly with an electric motor and a torque converter, the drive assembly and the output shaft of the torque converter of the drive assembly may be arranged in the same manner as the electric motor and the rotor of the electric motor, respectively. For example, the drive assembly may be positioned in the drivetrain between the final drive and the additional final drive, or between the clutch arrangement and the additional clutch arrangement, and the output shaft may be rotationally fixed, or locked, to the clutch input of the center clutch.

The electric motor may be connected, or coupled to the first wheel axle, or positioned in the drivetrain, between the final drive and the first wheel. This means that the electric motor is configured to supply the torque to the first wheel axle. If the clutch arrangement has the first clutch, the electric motor may be connected, or coupled, to the first drive axle, or positioned in the drivetrain, between final drive and the first clutch.

If the first wheel axle comprises the first axle portion, the electric motor, or the rotor of the electric motor, may be connected, or coupled, to the first axle portion, or the electric motor may be configured to supply torque to the first axle portion. The electric motor, or the rotor of the electric motor, may be rotationally fixed, or locked, to the first axle portion. The electric motor, or the rotor of the electric motor, and the first axle portion may be synchronous.

The electric motor, or the rotor of the electric motor, may be rotationally fixed, or locked, to the first clutch, or the clutch input of the first clutch. Additionally, or alternatively, they may be synchronous. Similarly, the electric motor, or the rotor of the electric motor, may be rotationally fixed, or locked, to the final drive, or the first output shaft of the final drive. Additionally, or alternatively, they may be synchronous.

Different arrangements of the electric motor and the rotor of the electric motor are described above in relation to the first wheel axle and the first clutch. If the powertrain has a drive assembly with an electric motor and a torque converter, the drive assembly and the output shaft of the torque converter of the drive assembly may be arranged in the same manner as the electric motor and the rotor of the electric motor, respectively. For example, the drive assembly may be positioned in the drivetrain between the final drive and the first wheel, and the output shaft may be rotationally fixed, or locked, to the clutch input of the first clutch.

The electric powertrain may comprise an additional electric motor configured to supply additional torque to the drivetrain. The additional electric motor may comprise a stator and a rotor. The rotor is understood to supply the additional torque to the drivetrain. The additional electric motor may be connected, or coupled to the second wheel axle, or positioned in the drivetrain, between the final drive and the second wheel. This means that the electric motor is configured to supply the torque to the second wheel axle. If the clutch arrangement has the second clutch, the additional electric motor may be connected, or coupled, to the second wheel axle, or positioned in the drivetrain, between final drive and the second clutch.

If the second wheel axle comprises the first axle portion, the additional electric motor, or the rotor of the additional electric motor, may be connected, or coupled, to the first axle portion, or the additional electric motor may be configured to supply torque to the first axle portion. The additional electric motor, or the rotor of the additional electric motor, may be rotationally fixed, or locked, to the first axle portion. The additional electric motor, or the rotor of the additional electric motor, and the first axle portion of the second wheel axle may be synchronous.

The additional electric motor, or the rotor of the additional electric motor, may be rotationally fixed, or locked, to the second clutch, or the clutch input of the second clutch. Additionally, or alternatively, they may be synchronous. Similarly, the additional electric motor, or the rotor of the additional electric motor, may be rotationally fixed, or locked, to the final drive, or the second output shaft of the final drive. Additionally, or alternatively, they may be synchronous.

That an electric motor is connected, or coupled, to a shaft or axle between two components, or positioned in the drivetrain between two components, means that it supplies torque to the shaft or axle, and in extension to the drivetrain, between these components.

The final drive may comprise a bevel gear providing the first gear ratio. Similarly, the additional final drive may comprise a bevel gear providing the second gear ratio.

Each of the final drive and the additional final drive may comprise a bevel gear assembly. The bevel gear assembly comprises: an input shaft or gear input shaft, a first output shaft or first gear output shaft, and a second output shaft or second gear output shaft. The input shaft, the first output shaft, and second output shaft may be the same as described above for the final drive and the additional final drive.

The first and second output shafts may be coaxial and transverse, or at a right angle, to the input shaft. The first output shaft may have a first end, or first output end, and the second output shaft may have a second end, or second output end. The bevel gear assembly further comprises the above-mentioned bevel gear that operationally connects the input shaft to the first and second output shafts. The first end and the second end of the output shaft are on opposite sides, or opposite first and second sides, of the bevel gear.

The first output shaft may be rotationally fixed to the second output shaft forming a single output shaft. The single output shaft may be monolithic. Alternatively, each of the final drive and the additional final drive may comprise a differential that comprises the bevel gear assembly. The differential allows for the first output shaft and the second output shaft to rotate relative to one another. The differential may be a limited-slip differential or an open differential.

It is understood that the bevel gear converts, or transfers, an input torque received by the input shaft to an output torque supplied by the output shaft, or the first and second output shafts, at the first end and the second end. The bevel gear in the bevel gear assembly or differential of the final drive and the additional final drive may be the only gears of the drivetrain.

The input shaft of the final drive may be connected, or coupled, to the to the drive shaft, or to the second shaft portion of the drive shaft. Similarly, the input shaft of the additional final drive may be connected, or coupled, to the to the drive shaft, or to the second additional shaft portion of the drive shaft.

The clutch output of the center clutch may be connected, or coupled, to the input shaft of the final drive. Here, the input shaft and the second shaft portion may be the same. Similarly, the clutch output of the additional center clutch may be connected, or coupled, to the input shaft of the additional final drive. Here, the gear input shaft and the second additional shaft portion may be the same.

The first wheel axle may be connected, or coupled, to the first end of the output shaft or the first output shaft of the of the final drive. The second wheel axle may be connected, or coupled, to the second end of the output shaft or the second output shaft of the of the final drive. Similarly, the first additional wheel axle may be connected, or coupled, to the first end of the output shaft or the first output shaft of the of the additional final drive. The second additional wheel axle may be connected, or coupled, to the second end of the output shaft or the second output shaft of the of the additional final drive.

The drivetrain of the twenty fifth aspect of the proposed technology may comprise a bevel gear assembly according to the fifth aspect of the proposed technology. The final drive and the clutch arrangement may form part of the bevel gear assembly. This means that the first and second clutches of the clutch arrangement are the first and second clutches of the bevel gear assembly. Similarly, the drivetrain may comprise an additional bevel gear assembly according to the fifth aspect of the proposed technology. The additional final drive and the additional clutch arrangement may form part of the bevel gear assembly.

The drivetrain of the twenty fifth aspect of the proposed technology may comprise an electric motor and a bevel gear assembly according to the twelfth aspect of the proposed technology. The electric motor is the electric motor of the powertrain, and the final drive and the clutch arrangement may form part of the bevel gear assembly. This means that the first and second clutches of the clutch arrangement are the first and second clutches of the bevel gear assembly. Alternatively, the drivetrain may comprise an electric motor and a bevel gear assembly according to the twelfth aspect of the proposed technology. The electric motor is the electric motor of the powertrain, and the additional final drive and the additional clutch arrangement may form part of the additional bevel gear assembly. This means that the first and second additional clutches of the additional clutch arrangement are the first and second clutches of the bevel gear assembly.

The drivetrain may further comprise the first wheel, the second wheel, the first additional wheel, and the second additional wheel. All wheels may have the same wheel diameter. The pair of wheels may be the rear wheels of the vehicle and the pair of additional wheels may be the front wheels of the vehicle.

In a twenty sixth aspect of the proposed technologies, an automotive road vehicle is provided that comprises: a powertrain according to the twenty fifth aspect of the proposed technology.

It is understood that the automotive road vehicle may comprise the pair of wheels and the pair of additional wheels. It is further understood that the first wheel, second wheel, first additional wheel, and second additional wheel are connected to the first wheel axle, the second wheel axle, the first additional wheel axle, and the second additional wheel axle, respectively. The electric motor, and if present the additional electric motor, of the powertrain may be the only prime mover of the automotive road vehicle. For example, this means that the vehicle does not have any combustion engine providing torque in the powertrain.

In the different aspects of the proposed technologies, when it is specified that a first element is connected to a second element, such as a drive shaft to an output shaft of a torque converter, or a reduction gear input to a motor shaft, the first element and the second element may be rotationally fixed to one another. This means that there is no mechanism that can decouple the two elements. Additionally, the first element and the second element may be synchronous with one another, which means that there is no torque conversion between the two elements, for example by mechanical gears, or a gear shifting mechanism. This feature contributed to a simpler layout of the powertrain with reduced weight. In these specifications, the term "coupled" is understood as being more general than the term "connected". The latter term is understood to encompass only passive functional components between the two elements, such as a spline connection, while the former term is understood to encompass also active functional components between the two elements, such as gear sets, gear shifting components, or clutches.

BRIEF DESCRIPTION OF DRAWINGS

Different embodiments of the proposed technologies are presented with reference to the figures.

DETAILED DESCRIPTION

Figure 1:
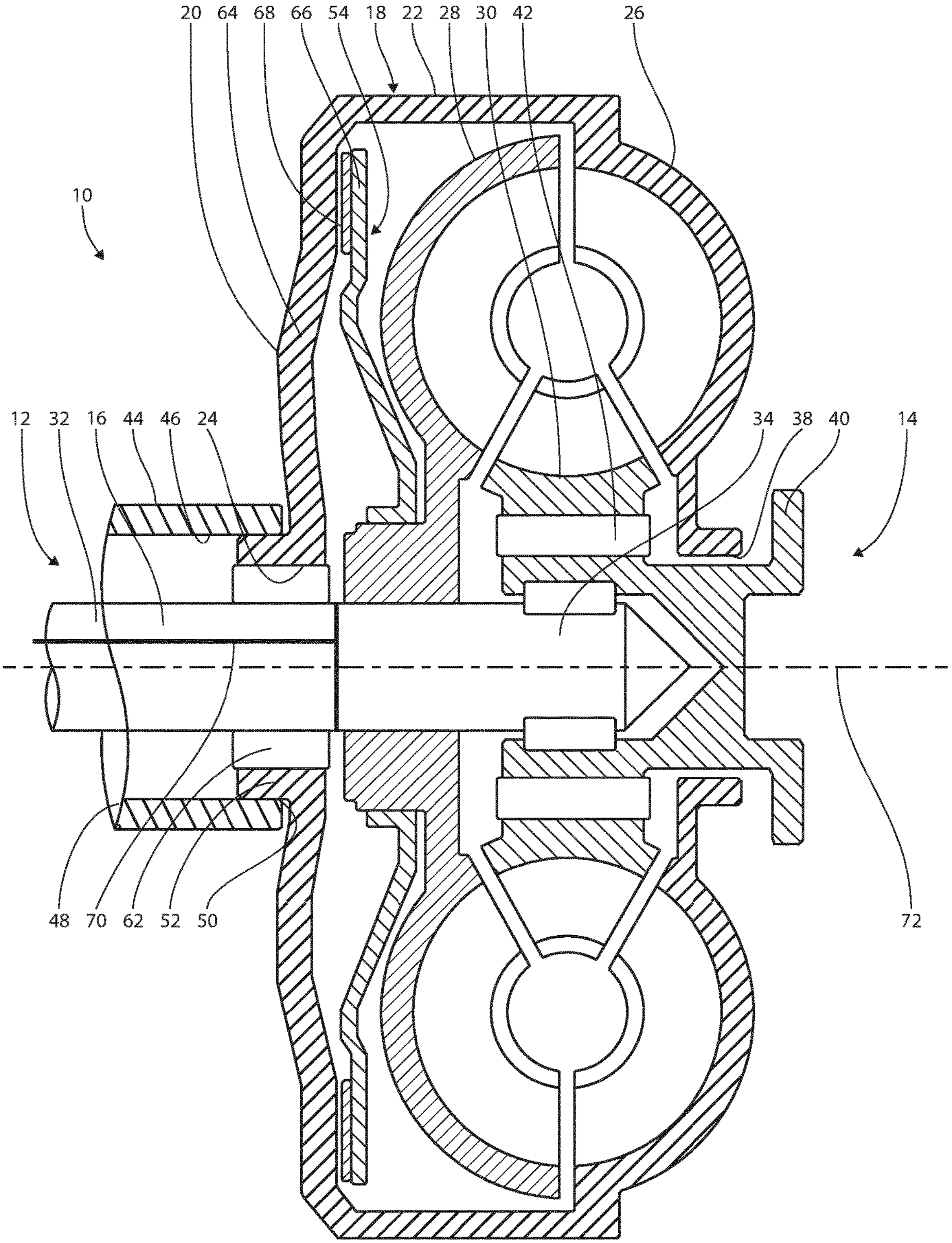
FIG. 1 is a cross sectional view of an embodiment of a reverse single-output torque converter with an output shaft only at the rear end.

A first embodiment of the proposed technologies is shown in FIG. 1, showing a schematic view of an embodiment of a torque converter 10, or a reverse output torque converter. The torque converter is intended to be used in an automotive road vehicle. It has a rear end 12, a front end 14, and an output shaft 16. The output shaft 16 exits the torque converter 10 at the rear end 12. The torque converter 10 is configured to receive an input torque at the rear 12 end and to deliver an output torque with the output shaft 16, which means that the output torque is delivered on the same side as the input torque is received.

The torque converter 10 has a cover 18 with a rear cover portion 20 at the rear end 12 and a front cover portion 22. The rear cover portion 20 is disc shaped and extends transversely with respect to the output shaft 16, while the front cover portion 22 is annular and extends from the rear cover portion 20 along the output shaft 16.

The rear cover portion 22 forms a rear shaft aperture 24 and the output shaft 16 exits the torque converter 10 through the rear shaft aperture 24. The torque converter 10 has an impeller 26 at the front end 14 that is rigidly connected to and supported by the front cover portion 22 and extending radially with respect to the output shaft 16. A turbine 28 is supported by the output shaft 16 and is positioned between the impeller 26 and the rear cover portion 20. A stator 30 is positioned between the impeller 26 and the turbine 28. The rotational axis 72 of the torque converter 10 is indicated by a dashed line and the different components are centered on and exhibit rotational symmetry with respect the rotational axis 72. The impeller 26 is at the front end 14 and the turbine 28 is located at the rear end 12. This means that the impeller 26 is located closer to the front end 14 than the turbine 28, and the turbine 28 is located closer to the rear end 12 than the impeller 26.

The torque converter is filled with a fluid in the form of an oil and the impeller 26, turbine 28, and stator 30 provides a fluid coupling transferring and converting an input torque received by the rear end 12 to an output torque delivered by the output shaft 16. The cover 18 and impeller 26 jointly forms an encloses space containing the fluid within the torque converter 10 during operation.

The output shaft 16 has a rear shaft portion 32 that extends from the rear shaft aperture 24. It also has a central shaft portion 34 located inside the torque converter 10.

The torque converter 10 has a stator support 40 that exits the torque converter 10 through a front shaft aperture 38 in the impeller 26, thereby extending from inside the torque converter 10 to outside the torque converter 10. During operation, the stator support 40 is fixed to and supported by a surrounding housing. The stator support 40 has a freewheel 42 rotationally supporting the stator 30 relative to the stator support 40. The freewheel 42 allows the stator 30 to rotate only in one direction relative to the stator support 40.

The rear cover portion 20 forms a torque input hub 52 that protrude outwards from the rear cover portion 20 and forms the rear shaft aperture 24. The torque converter has an input shaft 44 fixed to the torque input hub 52, and in extension to the rear cover portion 20 at the rear shaft aperture 24. The input shaft 44 forms an input shaft bore 46 through which the output shaft 16, more precisely the rear shaft portion 32, extends. The input shaft bore 46 has a front opening 50 located at the rear shaft aperture 24 and a rear opening 48 through which the output shaft 16 exits the input shaft bore 46.

The torque converter 10 has a rear radial rolling bearing 62 connecting the rear cover portion 20 and the output shaft 16 and rotationally supporting the cover 18 relative to the output shaft 16.

The torque converter 10 has a clutch 54 that can be set in an (a) unengaged state in which the cover 18 and the output shaft 16 are unlocked and can spin at different speeds. It can further be set in an (b) engaged state in which the cover 18 and the output shaft 16 are locked together and spin at the same speed. The clutch also has a (c) slipping state in which the cover 18 and the output shaft 16 are partially locked together and can spin at different speeds.

The clutch 54 is a lock-up clutch that is spring biased to be in its engaged state. The clutch 54 is hydraulically operated by the fluid in the torque converter 10. A change between states is achieved by changing the pressure or flow of the fluid. The clutch 54 has a piston 66 fitted with an annular friction disc 68 at its radially outer edge. The piston 66 is supported by the turbine 28, rotationally fixed relative to the turbine 28, and spring biased to engage the rear cover portion 18 with the friction disc 68.

The output shaft 16 has a shaft conduit 70 supplying the fluid to the torque converter 10 via the rear shaft aperture 24. Depending on the application of the torque converter, the shaft conduit 70 can also enter the torque converter via the front shaft aperture 38. The fluid is released between the rear cover portion 20 and the turbine 28, and an increase in the pressure will cause the piston 66 to disengage and allow a flow of the fluid within the torque converter 10. This will change the clutch 54 from its (b) engaged state to its unengaged state (a). A smaller increase in the pressure will result in the clutch 54 to change from the (b) engaged state to the slipping state (c), at which point the flow of the fluid is significantly smaller.

The clutch 54 is an internal clutch positioned between and operationally connecting the turbine 28 and the rear cover portion 20. In the (b) engaged state, the clutch 54 mechanically transfers all torque supplied to the cover 18 to the turbine 28, while in the (b) slipping state it mechanically transfers some of the torque supplied to the cover 18 to the turbine 28.

Figure 2:
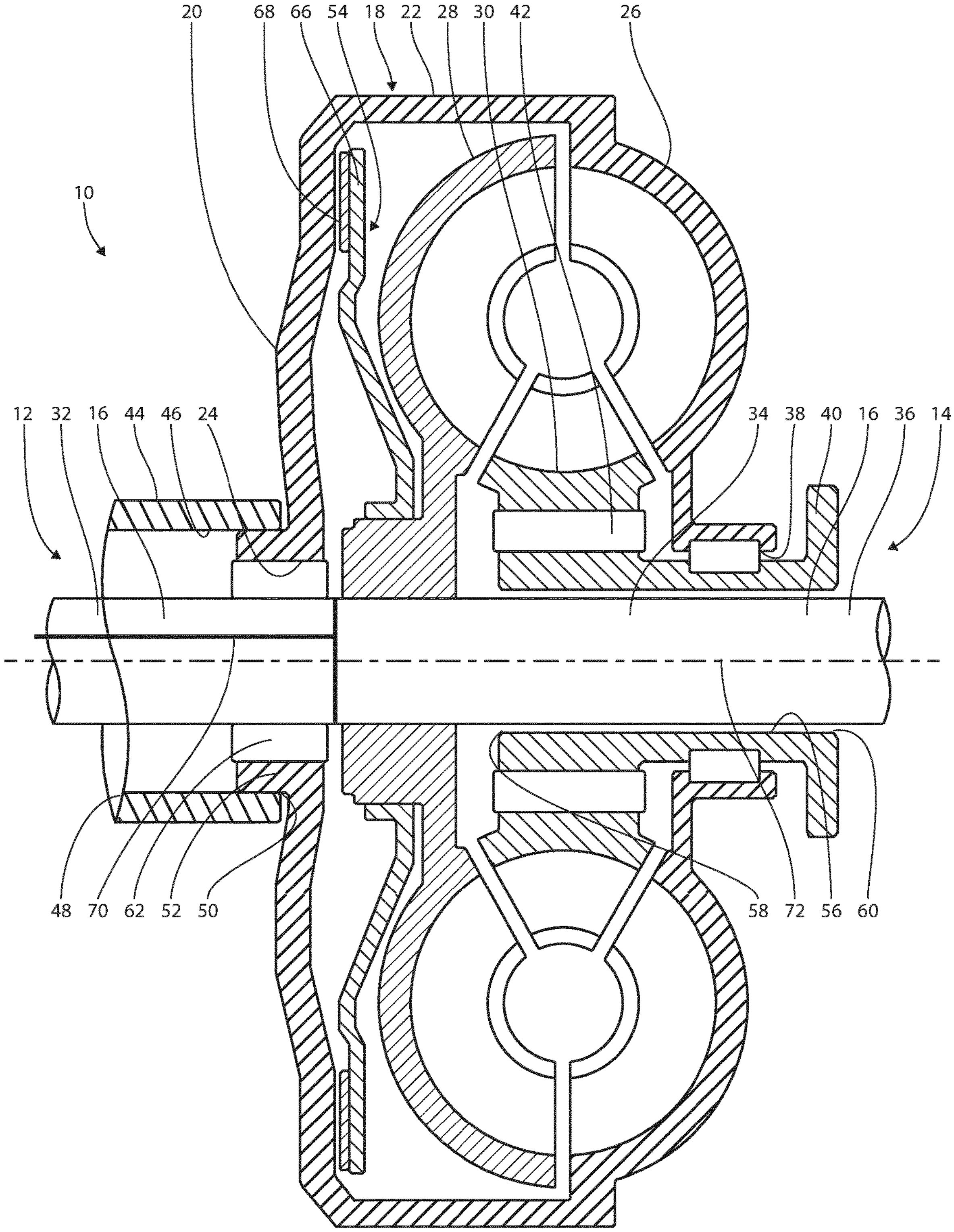
FIG. 2 is a cross sectional view of an embodiment of a dual-output torque converter having an output shaft at the rear end and the front end.

A second embodiment of the proposed technologies is shown in FIG. 2. It has all the features of the embodiment described in relation to FIG. 1. In addition, the impeller 26 forms a front shaft aperture 38 through which the output shaft 16 exits the torque converter 10. This means that the output torque is delivered on both sides of the torque converter 10, not only on the side where the input torque is received.

Additionally, the stator support 40 forms a stator support bore 56 through which the output shaft 16 extends. The stator support bore 56 has a rear opening 58 located inside the torque converter 10 and a front opening 60 located outside the torque converter 10. As described above, the output shaft 16 has a rear shaft portion 32 and a central shaft portion 34. Here, the output shaft 16 also has a front shaft portion 36 that extends from the front end 14 of the torque converter 10.

Figure 3:
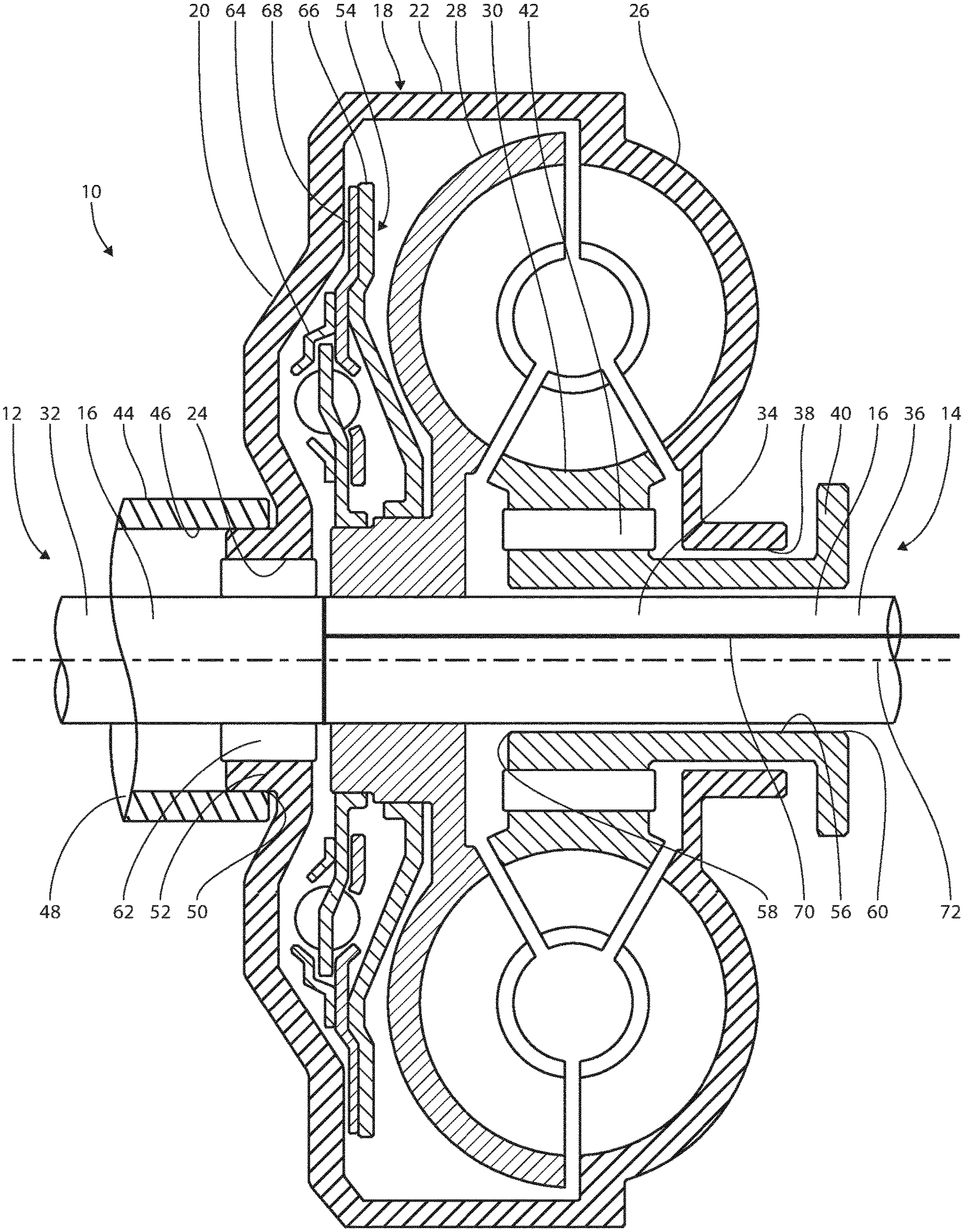
FIG. 3 is a cross sectional view of an alternative embodiment of a dual-output torque converter having a dampener.

An alternative embodiment of the second embodiment is shown in FIG. 3, in which the clutch 54 further has been fitted with a damper 64. In this embodiment, the shaft conduit 70 supplies the fluid to the torque converter 10 via the front shaft aperture 38.

Figure 4:
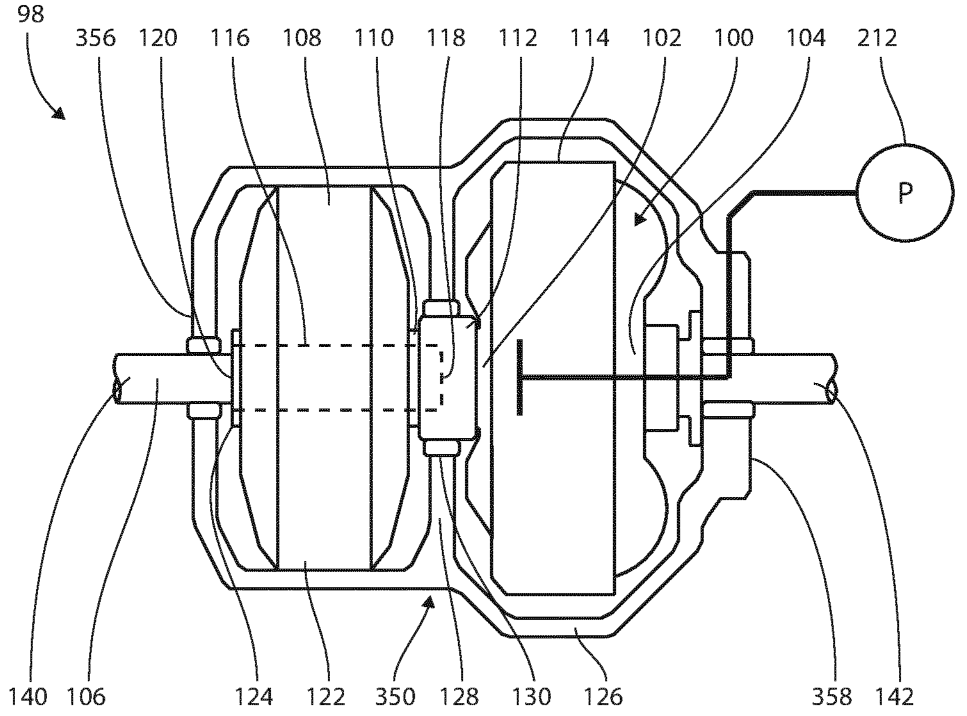
FIG. 4 is a cross sectional view of an embodiment of an electric powertrain with a dual-output torque converter.

FIG. 4 is a cross sectional view of an embodiment of an electric powertrain 98 having a torque converter 100 of the type described in relation to FIG. 2, which means that it has a rear end 102, a front end 104, and an output shaft 106 exiting the torque converter 100 at the rear end 102 and the front end 104. The powertrain 98 has an electric motor 108 with a motor shaft 110 that is connected to the rear end 102 of the torque converter 100, or more precisely to the input shaft 112 of the torque converter 100. This way the motor shaft 110 is rotationally fixed to and rotates with at the same rate as cover 114 of the torque converter 100. The electric motor 108 can supply an output torque by the motor shaft 110.

The motor shaft 110 forms a motor shaft bore 116 (indicated by dashed lines) that is coaxial with the motor shaft 110. The output shaft 106 of the torque converter 100 extends through the motor shaft bore 116. The motor shaft bore 116 has a front opening 118 on the side facing the torque converter 100 and a rear opening 120 on the side facing away from the torque converter 100. The output shaft 106 passes through both the front opening 118 and the rear opening 120.

The electric motor 108 has a stator 122 and a rotor 124. The rotor 124 is connected to the motor shaft 110. The powertrain has a housing 126 enclosing the electric motor 108 and torque converter 100. The stator 122 is fixed to and supported by the housing 126. The housing 126 forms an enclosure around the torque converter 100 that collects fluid that is expelled therefrom. The housing 126 forms a motor partition 128 between the torque converter 100 and the electric motor 108. A radial rolling bearing 130 connects the motor partition 128 and the input shaft 112 and provides rotational support of the latter.

The electric motor 108 and the torque converter 100 jointly forms a drive assembly 350 and the output shaft 108 extends from a first side 356 and a second side 358 of the drive assembly 350. This means that the output shaft 106 also extends through the drive assembly 350. The ends of the output shaft 106 are mechanical interfaces by which torque from the drive assembly can be delivered, for example to a drivetrain. for delivering torque. In one embodiment, the powertrain 98 has a first wheel connector 346 and a second wheel connector 348 positioned on the opposite first side 356 and second side 358 of the drive assembly 350. Each wheel connector 346 and 348 is a hub that can connect to the rim of a first wheel and a second wheel, as is shown for example in FIGS. 24 and 27. The housing 126 form a first aperture 360 through which the rear shaft portion 140 extends and a second aperture 362 through which the front shaft portion 142 extends.

The output shaft 106 has a rear shaft portion 140 and a front shaft portion 142 that are coaxial. The rear shaft portion 140 is accessible on the first side 356 of the drive assembly 350 and the second shaft portion is accessible on the second side 358 of the drive assembly 350. This means that the first wheel connector 346 is operationally connected to the rear shaft portion 140 and the second wheel connector 348 is operationally connected to the front shaft portion 142.

Figure 5:
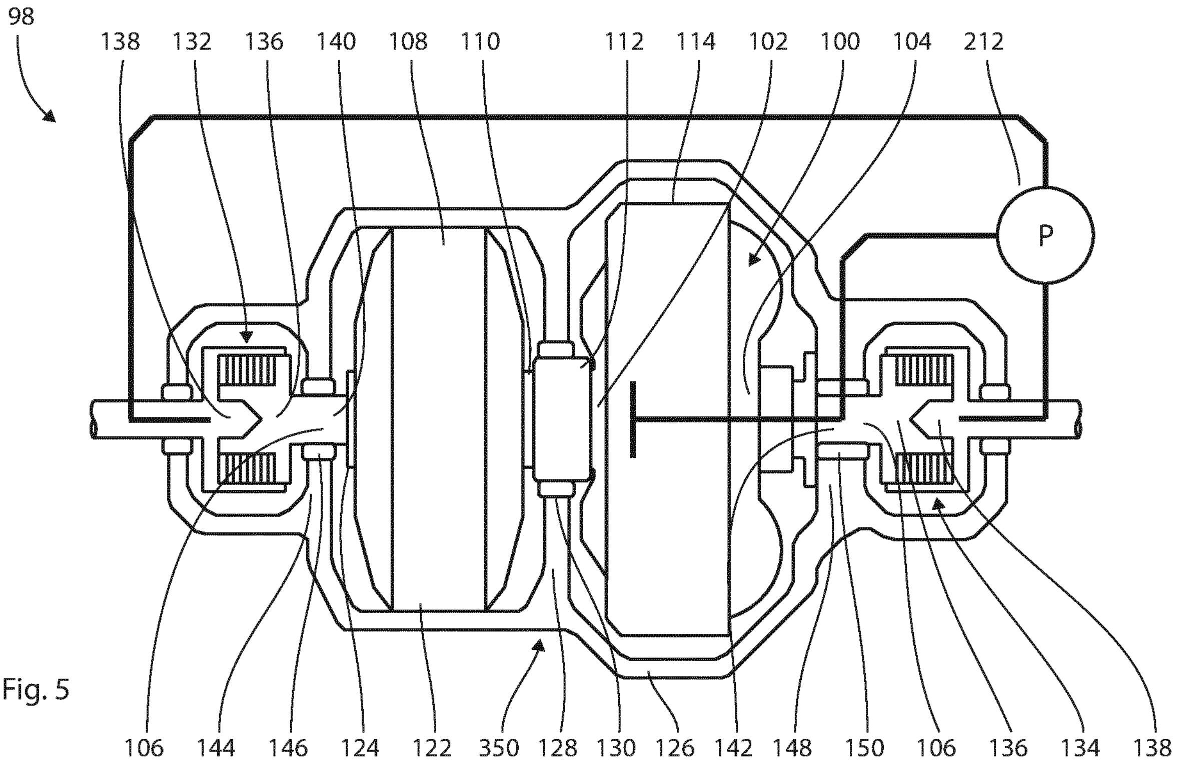
FIG. 5 is a cross sectional view of an embodiment of a linear electric powertrain with a dual-output torque converter having a first clutch at the rear end and a second clutch at the front end.

FIG. 5 is a cross sectional view of an embodiment of an electric powertrain 98 of the type described in relation to FIG. 4 and further having a first clutch 132 and a second clutch 134. The first clutch 132 has a clutch input part 136 and a clutch output part 138, and the clutch input part 136 is connected to the rear shaft portion 140 of the output shaft 106 on the side of the rear end 102 of the torque converter 100 with the electric motor 108 positioned between the first clutch 132 and the torque converter 100. The second clutch 134 similarly has a clutch input part 136 and a clutch output part 138, but the clutch input part 136 is connected to the front shaft portion 142 of the output shaft 106 on the side of the front end 104 of the torque converter 100. This way, the torque converter 100 can supply torque to both the first clutch 132 and the second clutch 134 by the output shaft 106.

The housing also forms a first clutch partition 144 between the electric motor 108 and the first clutch 132 and a first radial rolling bearing 146 rotationally supports the output shaft 106 relative to the first clutch partition 144. Similarly, the housing also forms a second clutch partition 148 between the torque converter 110 and the second clutch 134 and a second radial rolling bearing 150 rotationally supports the output shaft 106 relative to the second clutch partition 148.

Figure 6:
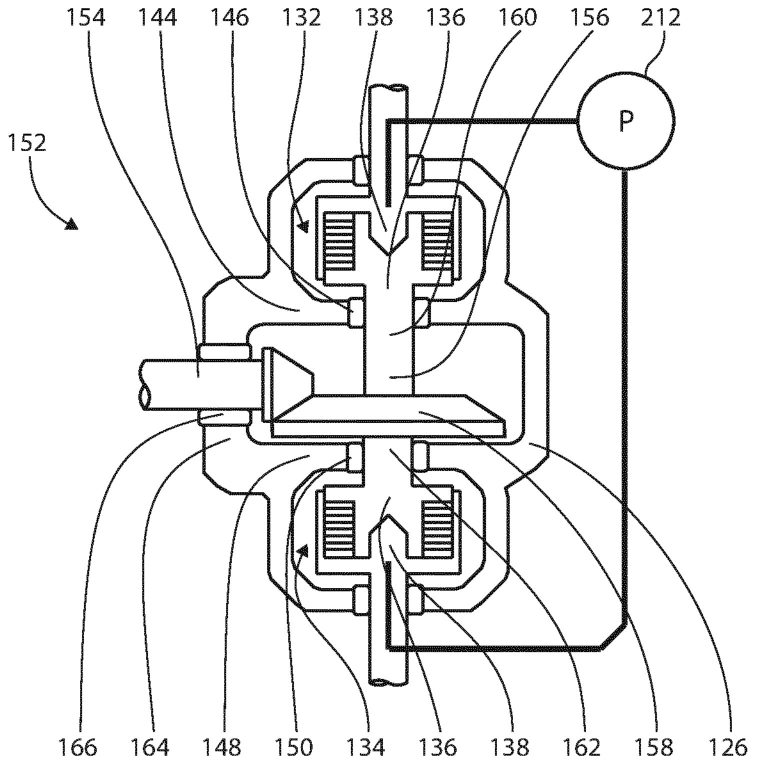
FIG. 6 is a cross sectional view of an embodiment of a bevel gear assembly.

FIG. 6 is a cross sectional view of an embodiment of a bevel gear assembly 152 having a a gear input shaft 154, gear output shaft 156, and a connecting bevel gear 158. The gear output shaft 156 is at a right angle to the gear input shaft 154 and has a first end 160 on one side of the bevel gear 156 and a second end 162 on the other side of the bevel gear 158.

The bevel gear assembly 152 has a housing 126 that encloses the bevel gear 158. The gear input shaft 154 and the gear output shaft 156 extend from the housing 126. The gear output shaft 156 is a monolithic structure and extends through the bevel gear 158 and the housing 126. The housing 126 forms a bevel gear partition 164 at the gear input shaft 154. The bevel gear assembly 152 has a radial rolling bearing 166 that rotationally supports the gear input shaft 154 relative to the bevel gear partition 164.

The bevel gear assembly 152 has a first clutch 132 with a clutch input part 136 and a clutch output part 138, and a second clutch 134 with a clutch input part 136 and a clutch output part 138. The clutch input parts 136 of the first clutch 132 is connected to the first end 160 of the gear output shaft 156, and the clutch input part 136 of the second clutch 134 is connected to the second end 162 of the gear output shaft 156. An input torque that is received by the gear input shaft 154 is converted and transferred by the bevel gear 158 to an output torque that is divided equally between the clutch input parts 136 of the two clutches 132 and 134.

The housing 126 forms a first clutch partition 144 between the bevel gear 158 and the first clutch 122 and a second clutch partition 148 between the bevel gear 158 and the second clutch 134. A first radial rolling bearing 146 rotationally supports the gear output shaft 156 with respect to the first clutch partition 144. Similarly, a second radial rolling bearing 150 rotationally supports the gear output shaft 156 with respect to the second clutch partition 148.

Figure 7:
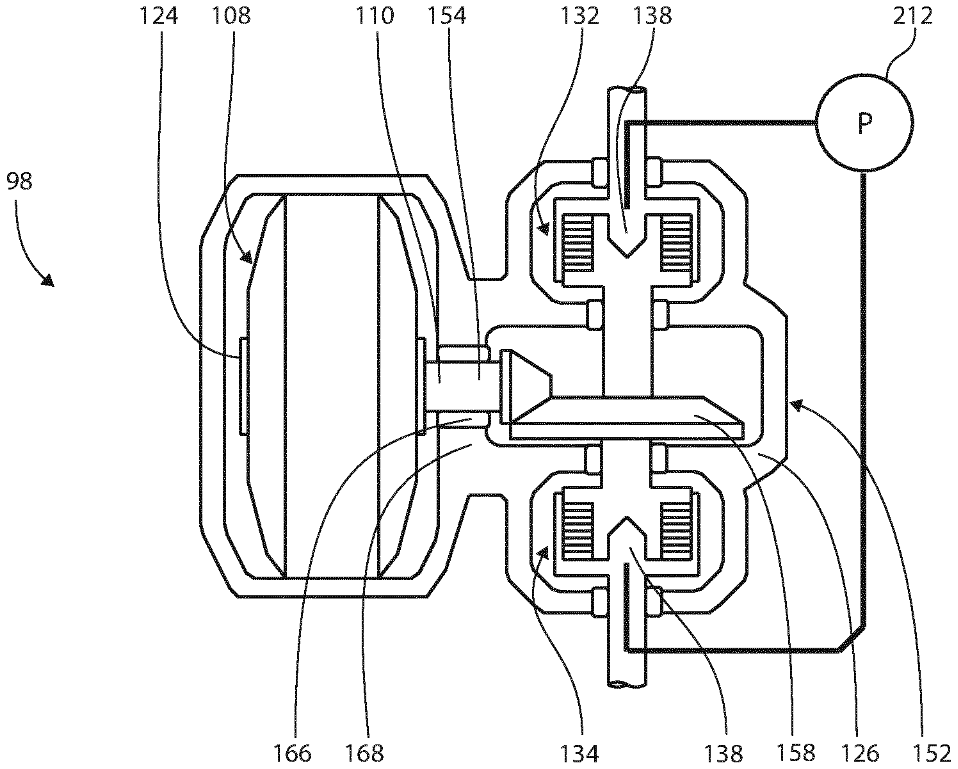
FIG. 7 is a cross sectional view of an embodiment of an electric powertrain with a bevel gear assembly.

FIG. 7 is a cross sectional view of an embodiment of an electric powertrain 98 with a bevel gear assembly 152 of the type described in relation to FIG. 6 and an electric motor 108 with a motor shaft 110 connected to the gear input shaft 154 of the bevel gear assembly 152. The electric motor 108 has a rotor 124 that can supply an output torque to the motor shaft 110, which is then received as in input torque by the gear input shaft 154

The bevel gear assembly 152 has a housing 126. The stator 122 of the electric motor is fixed to the housing 126. The housing 126 forms a motor partition 168 between the bevel gear assembly 152, or bevel gear 158, and the electric motor 108. A radial rolling bearing 166 operationally connects the motor partition 168 and the motor shaft 110, thereby rotationally supporting the latter.

Figure 8:
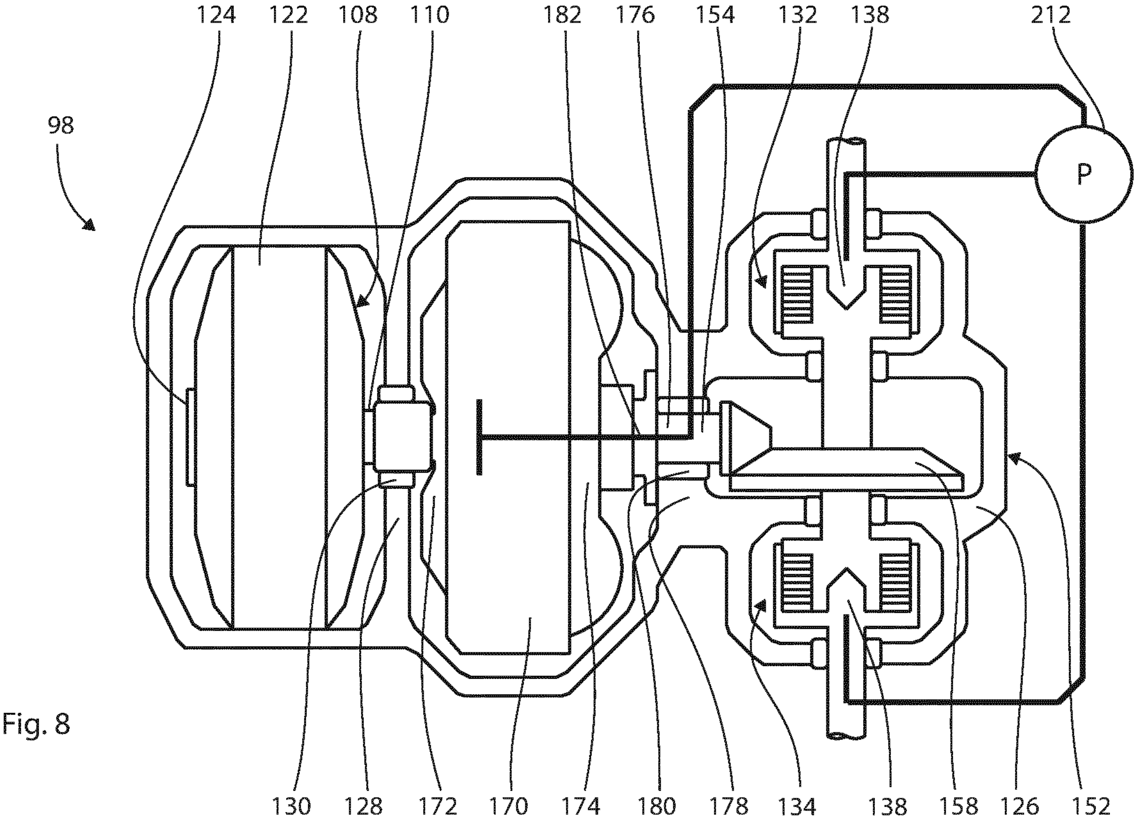
FIG. 8 is a cross sectional view of an embodiment of an electric powertrain with a bevel gear assembly and a single-output torque converter.

FIG. 8 is a cross sectional view of an embodiment of an electric powertrain 98 with a bevel gear assembly 152 as described in relation to FIG. 6 and a torque converter having a rear end 172, a front end 174, and an output shaft 176 exiting the torque converter 170 only at the front end 174. This means that the torque converter is a single-output torque converter, which is different from the dual-output torque converter described in relation to FIGS. 2 and 3. It further has the output at the front end 174, which is the opposite end in comparison with the single-output torque converter of FIG. 1.

The output shaft 176 is connected to the gear input shaft 154 of the bevel gear assembly 152. The powertrain 98 has an electric motor 108 with a solid motor shaft 110 that is connected to the rear end 172 of the torque converter 170 in the same manner as described in relation to FIGS. 4 and 5, but with the exception that the output shaft 176 of the torque converter 170 does not extend through the motor shaft 110, which does not have a motor shaft bore. Here, and throughout these specifications, a motor shaft is considered solid even if it has a shaft conduit for a fluid supply to a torque converter.

The electric motor 108 has a stator 122 and a rotor 124 to which the motor shaft 110 is fixed. The electric motor 180 can supply an output torque by the motor shaft 110 that is received as an input torque by the torque converter 170. The torque converter 170 has a cover, impeller, turbine, and clutch arranged like the embodiments shown in FIGS. 1 to 3. It is filled with a fluid that provides a fluid coupling by which the input torque is converted, or amplified, between the rear end 172 and the output shaft 176.

As mentioned above, the bevel gear assembly 152 has a housing 126 and the stator 122 of the electric motor 108 is fixed to the housing 126. The housing 126 forms a torque converter partition 178 between the bevel gear assembly 152, or bevel gear 158, and the torque converter 170. A radial rolling bearing 180 rotationally supports the output shaft 176 of the torque converter 170 with respect to the torque converter partition 178. The housing 126 also forms a motor partition 128 between the torque converter 170 and the electric motor 108. A radial rolling bearing 130 rotationally supports the motor shaft 110 relative to the motor partition 128.

The torque converter 170 can be operated in the same manner as described in relation to FIG. 1. For example, it has an internal lock-up clutch that is hydraulically operated and can be set in an (a) unengaged state, an (b) engaged state, and a (c) slipping state. The output shaft 176 forms a shaft conduit 182 that supplies the torque converter 170 with the fluid providing the fluid coupling.

Figure 9:
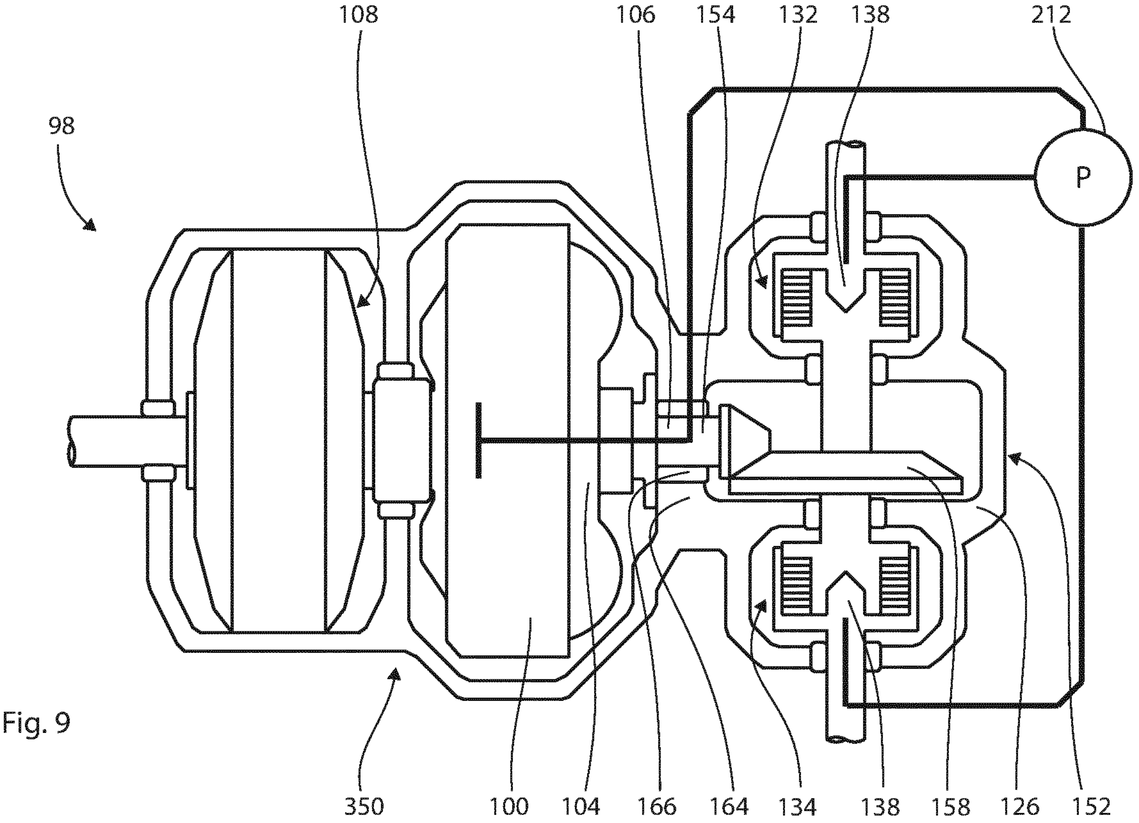
FIG. 9 is a cross sectional view of an embodiment of an electric powertrain with a bevel gear assembly and a dual-output torque converter.

FIG. 9 is a cross sectional view of an embodiment of an electric powertrain 98 with torque converter 100 and an electric motor 108 as described in relation to FIG. 4 and a bevel gear assembly 152 as described in relation to FIG. 6. The front end 104 of the torque converter 100 faces the bevel gear assembly 152 and the gear input shaft 154 of the bevel gear assembly 152 is connected to the output shaft 106 at the front end 104 of the torque converter 100. With reference to FIG. 2, the front shaft portion 36 forms the gear input shaft 154 of the bevel gear assembly 152. This way, an output torque supplied by the output shaft 106 of the torque converter 100 is received as an input torque by the gear input shaft 154 of the bevel gear assembly 152.

The housing 126 forms a bevel gear partition 164 between the torque converter 100 and the bevel gear assembly 152, or the bevel gear 158. The powertrain 98 has a radial rolling bearing 166 connecting the bevel gear partition 164 and the output shaft 106, thus radially supporting the latter.

Figure 10:
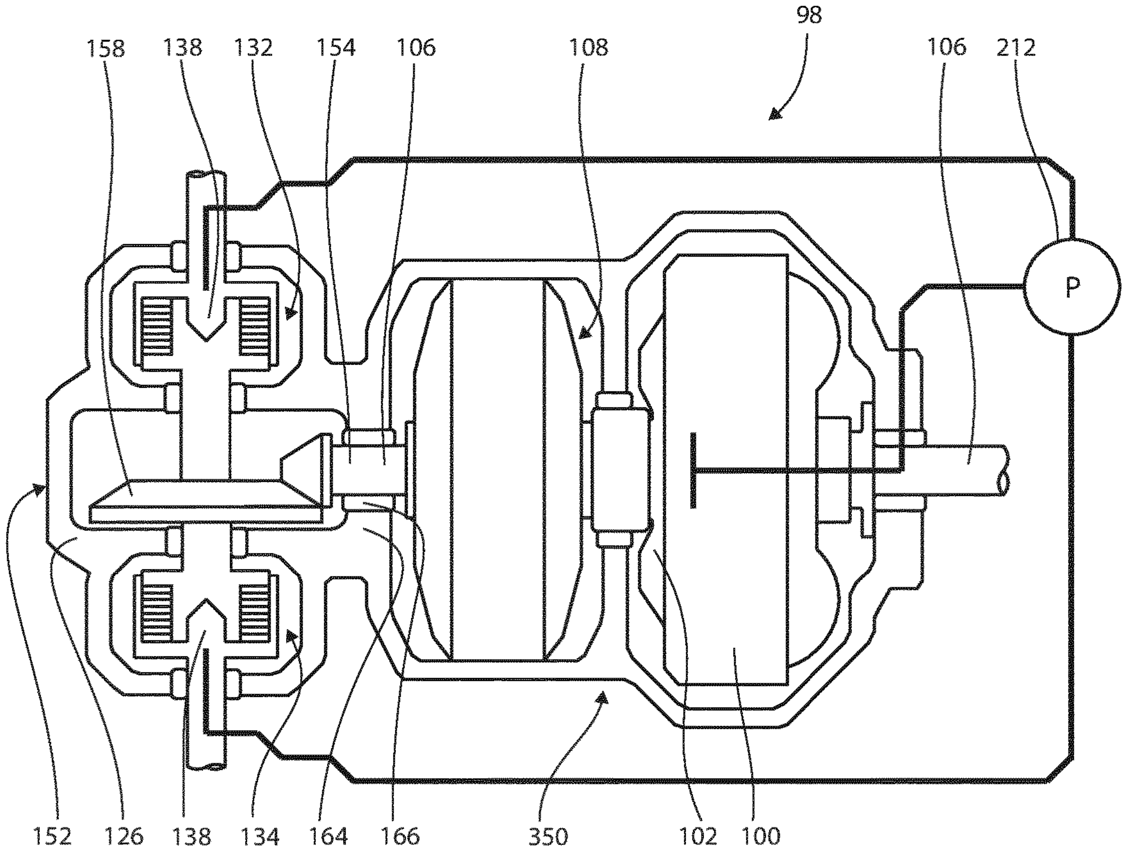
FIG. 10 is a cross sectional view of an embodiment of an electric powertrain with a bevel gear assembly and a dual-output torque converter in an alternative configuration.

FIG. 10 is a cross sectional view of an embodiment of an electric powertrain 98 with torque converter 100 and an electric motor 108 as described in relation to FIG. 4 and a bevel gear assembly 152 as described in relation to FIG. 6. The rear end 102 of the torque converter 100 faces the bevel gear assembly 152 and the gear input shaft 154 of the bevel gear assembly 152 is connected to the output shaft 106 on the opposite side of the electric motor 108 relative to the torque converter 100. With reference to FIG. 2, the rear shaft portion 32 forms the gear input shaft 154 of the bevel gear assembly 152. This way, an output torque supplied by the output shaft 106 of the torque converter 100 is received as an input torque by the gear input shaft 154 of the bevel gear assembly 152.

The housing 126 forms a bevel gear partition 164 between the electric motor 108 and the bevel gear assembly 152, or bevel gear 158. The powertrain 98 has a radial rolling bearing 166 connecting the bevel gear partition 164 and the output shaft 106, thus radially supporting the latter.

Figure 11:
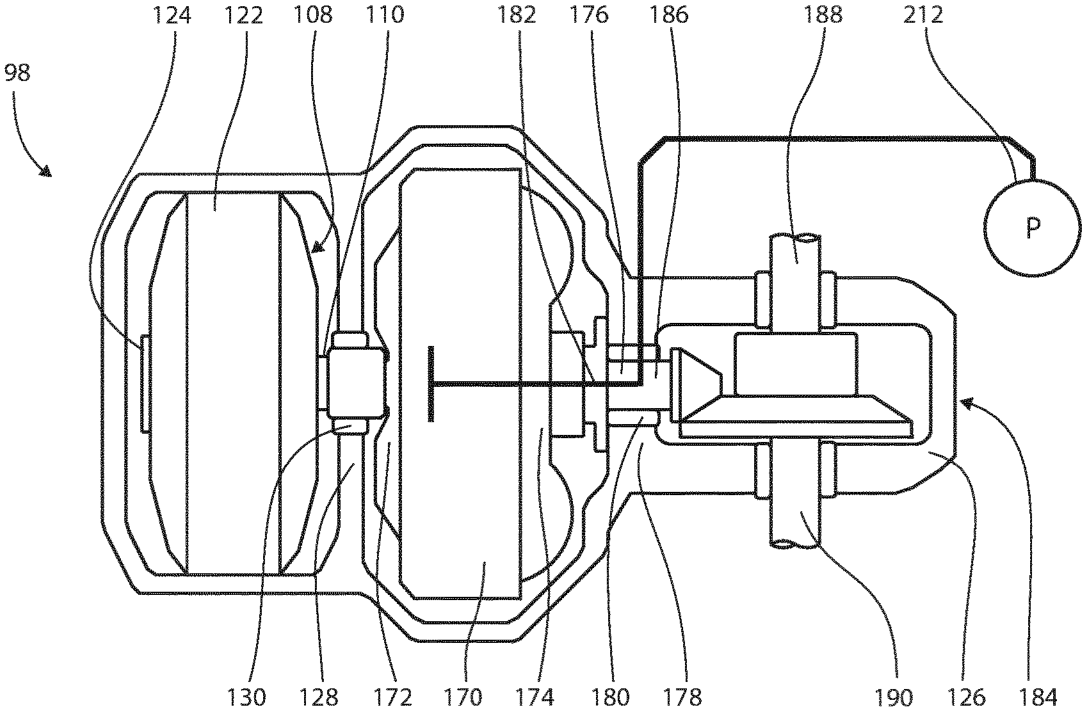
FIG. 11 is a cross sectional view of an embodiment of an electric powertrain with a differential and a single-output torque converter.

FIG. 11 is a cross sectional view of an embodiment of an electric powertrain 98 with a differential 184 having a gear input shaft 186, a first gear output shaft 188, and a second gear output shaft 190. The powertrain further has a torque converter 170 and an electric motor 108 arranged as in the embodiment of FIG. 8. The gear input shaft 186 of the differential 184 is connected to the output shaft 176 that exits the torque converter 170 on its front end 174. The electric motor 108 is connected to the rear end 172 of the torque converter 170. This means that the torque converter 170 is positioned between the electric motor 108 and the differential 184. This embodiment differs from the embodiment in FIG. 8 by the bevel gear assembly 152 being replaced by a differential 184. The torque converter 170 has the same features and functions as in the embodiment of FIG. 8.

The differential 184 connects the gear input shaft 186, the first gear output shaft 188, and the second gear output shaft 190 such that an input torque received by the gear input shaft 186 is distributed between the first gear output shaft 188, and the second gear output shaft 190. The differential 184 is an open differential. In an alternative embodiment it is instead a limited-slip differential.

The torque converter 170, electric motor 108, and differential 184 have a common housing 126. The housing 126 forms a torque converter partition 178 between the differential 184 and the torque converter 170, and a radial rolling bearing 180 that rotationally supports the output shaft 176 with respect to the torque converter partition 178. As described above in relation to FIG. 8, the stator 122 of the electric motor 108 is fixed to the housing 126 and the housing 126 also forms a motor partition 128.

Figure 12:
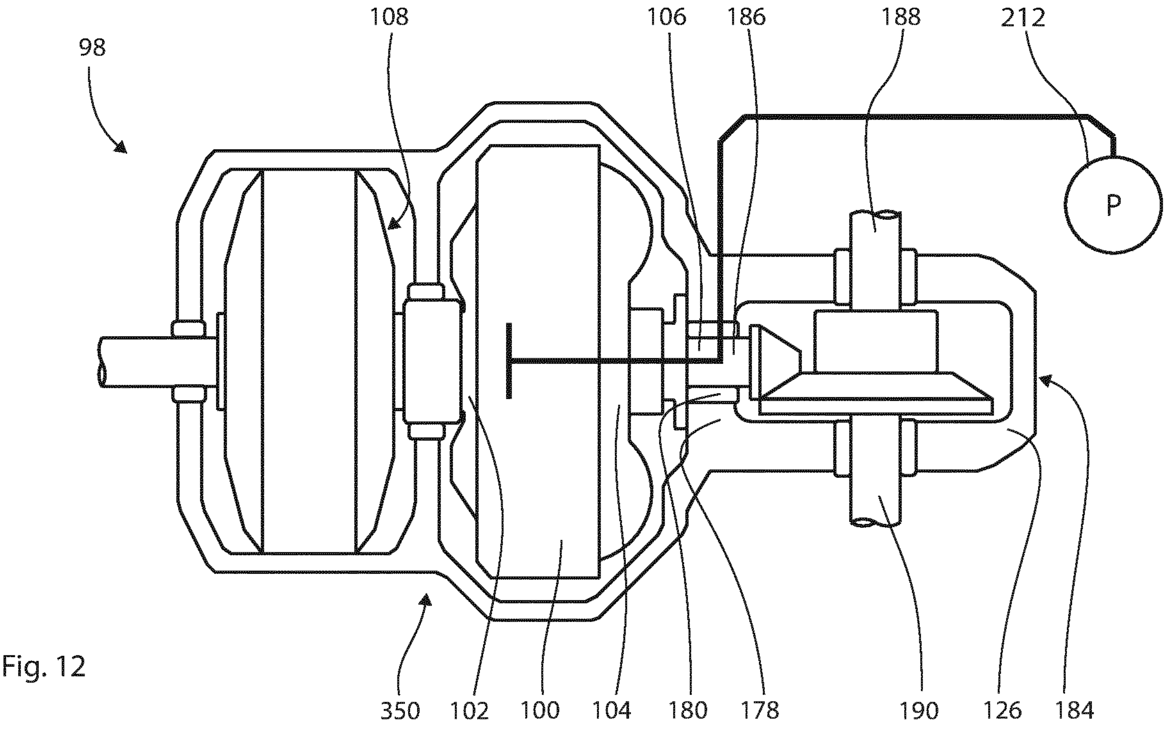
FIG. 12 is a cross sectional view of an embodiment of an electric powertrain with a differential and a dual-output torque converter.

FIG. 12 is a cross sectional view of an embodiment of an electric powertrain 98 with torque converter 100 and an electric motor 108 as described in relation to FIG. 4. The electric powertrain 98 further has differential 184 having a gear input shaft 186, a first gear output shaft 188, and a second gear output shaft 190. The gear input shaft 186 of the differential 184 is connected to the output shaft 106 that exits the torque converter 100 at its front end 104. The electric motor 108 is connected to the rear end 102 of the torque converter 100. This means that the torque converter 100 is positioned between the electric motor 108 and the differential 184. This embodiment differs from the embodiment in FIG. 9 by the bevel gear assembly 152 being replaced by the differential 184.

The differential 184 has the same function as in the embodiment in FIG. 11. The housing 126 forms a torque converter partition 178 between the differential 184 and the torque converter 100 with a radial rolling bearing 180 that rotationally supports the output shaft 106.

Figure 13:
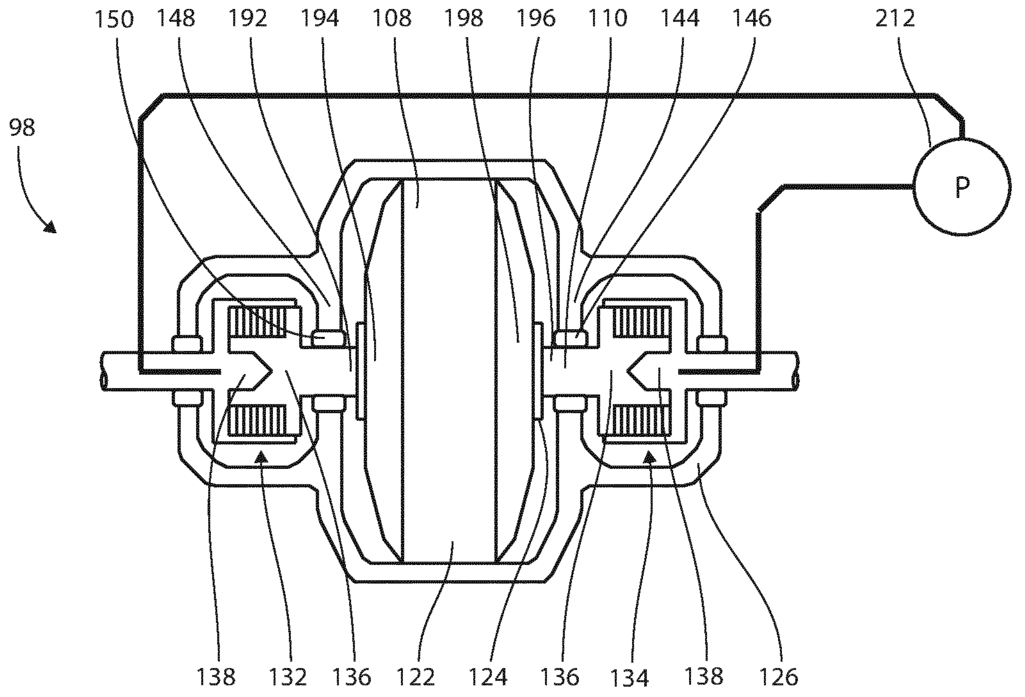
FIG. 13 is a cross sectional view of an embodiment of a linear electric powertrain with an electric motor having a first clutch at a first side and a second clutch at a second side.

FIG. 13 is a cross sectional view of an embodiment of a linear electric powertrain 98 with electric motor 108 having a motor shaft 110 with a first shaft portion 192 extending from a first side 194 of the electric motor 108 and a second shaft portion 196 extending from a second side 198 of the electric motor 108. The first clutch 132 has a clutch input part 136 and a clutch output part 138. Similarly, the second clutch 134 has a clutch input part 136 and a clutch output part 138. The clutch input part 136 of the first clutch 132 is connected to the first shaft portion 192 and the clutch input part 136 of the second clutch 134 is connected to the second shaft portion 196. This way, an output torque supplied by the motor shaft 110 is divided between the first clutch 132 and the second clutch and is received as input torque by respective clutch input part 136.

The electric motor 108 has a stator 122 and a rotor 124, and the latter is connected to the and forms part of the motor shaft 110. The powertrain 98 has a housing 126 and the stator 122 is fixed to the housing 126. The housing 126 forms a first clutch partition 144 between the electric motor 108 and the first clutch 132 and a second clutch partition 148 between the electric motor 108 and the second clutch 134. A first radial rolling bearing 146 rotationally supports the motor shaft 110 and first clutch 132 relative to the first clutch partition 144, and a second radial rolling bearing 150 rotationally supports the motor shaft 110 and second clutch 134 relative to the second clutch partition 150.

Figure 14:
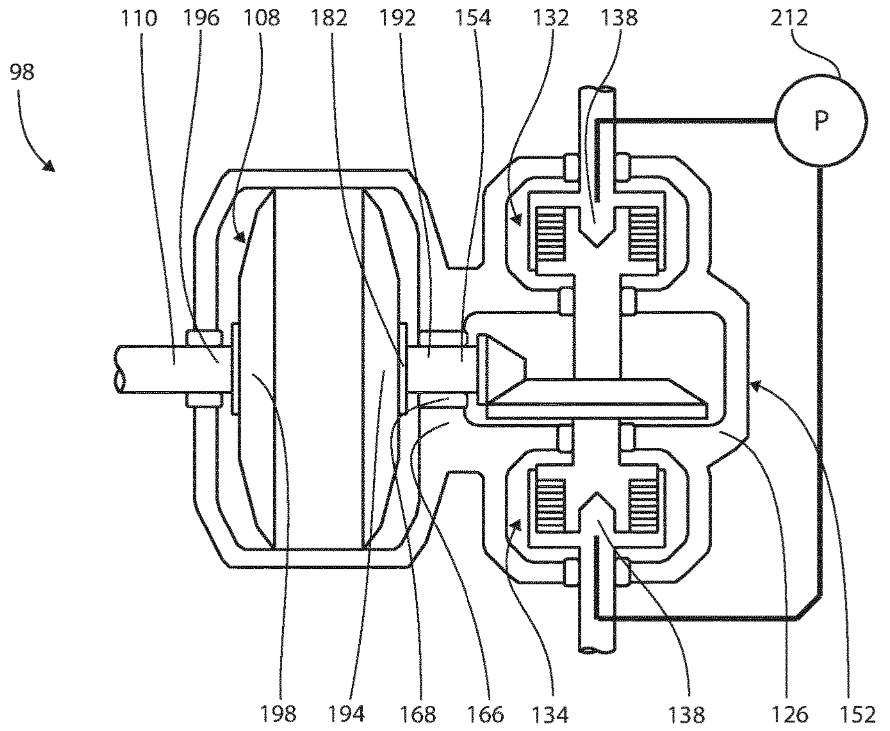
FIG. 14 is a cross sectional view of an embodiment of an electric powertrain with a dual-output electric motor and a bevel gear assembly.

FIG. 14 is a cross sectional view of an embodiment of an electric powertrain 98 with a bevel gear assembly 152 of the type described in relation to FIG. 6 and an electric motor 108. This embodiment is based on the embodiment of FIG. 7. Additionally, the motor shaft 110 has a first shaft portion 192 extending from a first side 194 of the electric motor 108 and a second shaft portion 196 extending from an opposite second side 198 of the electric motor 108. The gear input shaft 154 is connected to the first shaft portion 192. This means that torque can be received by the second shaft portion 196 that is transferred to the bevel gear assembly 152. Alternatively, the electric motor 108 can supply torque also by the second shaft portion 196 in addition to the supply to the bevel gear assembly 152.

Figure 15:
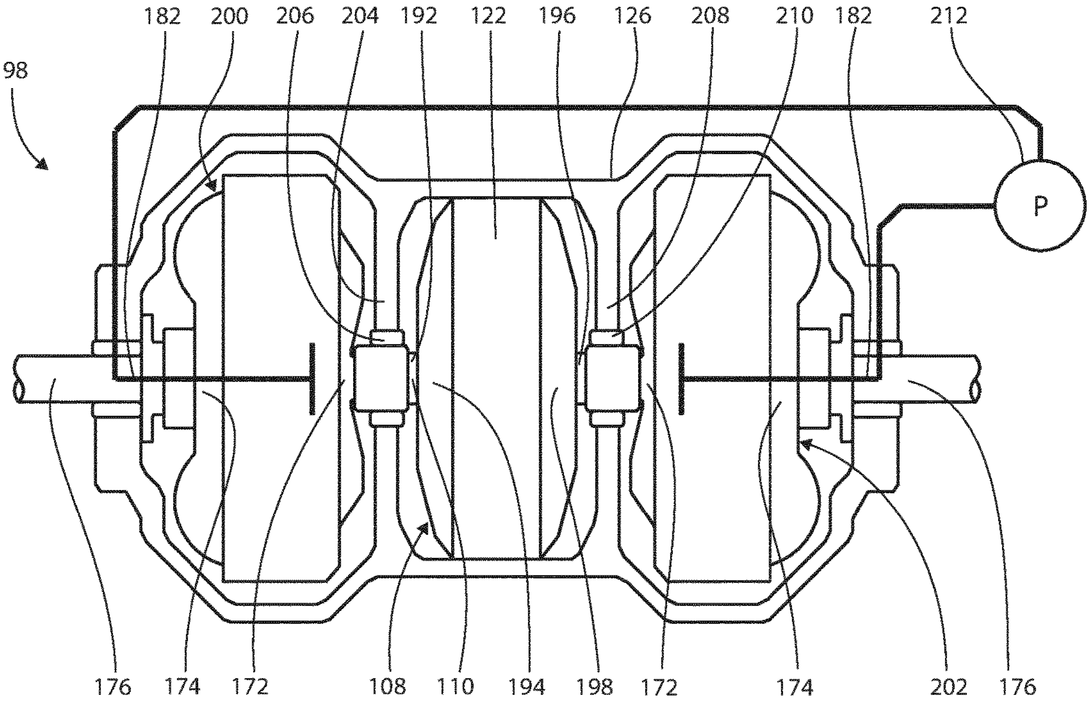
FIG. 15 is a cross sectional view of an embodiment of a linear electric powertrain with an electric motor having a first single-output torque converter at a first side and a second single-output torque converter at a second side.

FIG. 15 is a cross sectional view of an embodiment of a linear electric powertrain 98 with electric motor 108 having a motor shaft 110 with a first shaft portion 192 extending from a first side 194 of the electric motor 108 and a second shaft portion 196 extending from a second side 198 of the electric motor 108. Essentially, this corresponds to the electric motor 108 described in relation to FIG. 13. The electric powertrain 98 has a first torque converter 200 and a second torque converter 202. Each of the torque converters has a rear end 172, front end 174, and an output shaft 176 extending from the front end 174. The rear ends 172 of the first torque converter 200 and a second torque converter 202 are connected to the first shaft portion 192 and the second shaft portion 196, respectively, of the motor shaft 110. This means that the electric motor 108 is positioned between the first torque converter 200 and the second torque converter 202.

The electric motor 108 has a solid motor shaft 110 and there is no output shaft extending through the motor shaft 110, which is similar to the motor shaft 110 in the embodiments of FIG. 13. This means that an output torque delivered by the motor shaft 110 is divided between the first torque converter 200 and the second torque converter 202.

The first and second torque converters 200 and 202 are single-output torque converters and can be operated in the same manner as described in relation to FIGS. 1 to 3. For example, they have a clutch with an (a) unengaged state, an (b) engaged state, and a (c) slipping state. The clutch is a hydraulically operated internal lock-up clutch. Each of the output shafts 176 forms a shaft conduit 182 that supplies the torque converters 170 with the fluid by which they can be operated and convert torque.

The electric motor 108 has a stator 122 and a rotor (not shown). The motor shaft 110 constitutes an input shaft that is connected to the rear end 172 of each of the first and second torque converters 200 and 202.

The stator 122 of the electric motor 108 is fixed to a housing 126. The housing 126 forms a first torque converter partition 204 between the electric motor 108 and the first torque converter 200. A first radial rolling bearing 206 connects the motor shaft 110 and the first torque converter partition 204 and rotationally supports the former with respect to the latter. Similarly, the housing 126 forms a second torque converter partition 208 between the electric motor 108 and the second torque converter 202. A second radial rolling bearing 210 connects the motor shaft 110 and the second torque converter partition 208 and rotationally supports the former with respect to the latter.

In each of the above described embodiments of an electric powertrain 98 having a first clutch 132 and a second clutch 134, each of the first clutch 132 and the second clutch 134 has (a) an unengaged state in which the clutch input and the clutch output are unlocked and can spin at different speeds, (b) a slipping state in which the clutch input and the clutch output are partially locked together and can spin at different speeds, and (c) an engaged state in which the clutch input and the clutch output are locked together and spin at the same speed.

In each of the above-described embodiments of an electric powertrain 98, the electric motor 108 is a permanent-magnet motor. In alternative embodiments, the electric motor 108 is an induction motor. The powertrains 98 are fully electric and do not include any combustion engines.

Each of the above embodiments of an electric powertrain 98 has a hydraulic control system 212 connected to the single-output torque converter 10, 170, 200, and 202, the dual-output torque converter 10 and 100, and/or the clutches 132 and 134 of respective embodiment. The hydraulic control system 212 connects to a shaft conduit 70 and 182 in the output shaft 16, 106, and 176 of each torque converter 10, 100, 170, 200, and 202, this way supplying the pressurized fluid controlling the clutch 54 of the torque converter 10, 100, 170, 200, and 202 and providing the fluid coupling. The hydraulic control system 212 connects to the clutch output part 138 of each first clutch 132 and second clutch 134 and supplies the fluid by which the state of the first and second clutches 132 and 134 can be changed, for example from engaged to slipping, or from slipping to engaged. If the embodiment has both a torque converter 100 and 170 and first and second clutches 132 and 134, the same hydraulic control system 212 controls the operation of all components, see for example FIGS. 5, 8, 9, and 10.

Further embodiments of electric powertrains 98 are based on those above and further includes a first wheel axle and a second wheel axle extending in opposite directions. For example, the clutch output part 138 of the first clutch 132, the output shaft 176 of the first torque converter 200, and the first gear output shaft 188 of the differential 184 can be connected and fixed to the first wheel axle. Similarly. the clutch output part 138 of the second clutch 134, the output shaft 176 of the second torque converter 202, and the second gear output shaft 190 of the differential 184 can be connected and fixed to the second wheel axle. At the outer ends, the first wheel axle and the second wheel axle are connected and fixed to a first wheel and a second wheel, respectively. The first wheel and a second wheel can form a pair of wheels, such as a front or rear wheel pair. Examples of these embodiments are shown in FIGS. 16 to 27.

Further embodiments of electric powertrains 98 additionally have an electric power storage in the form of a battery and an inverter connected between the battery and the electric motor that controls the operation of the latter.

Figure 16:
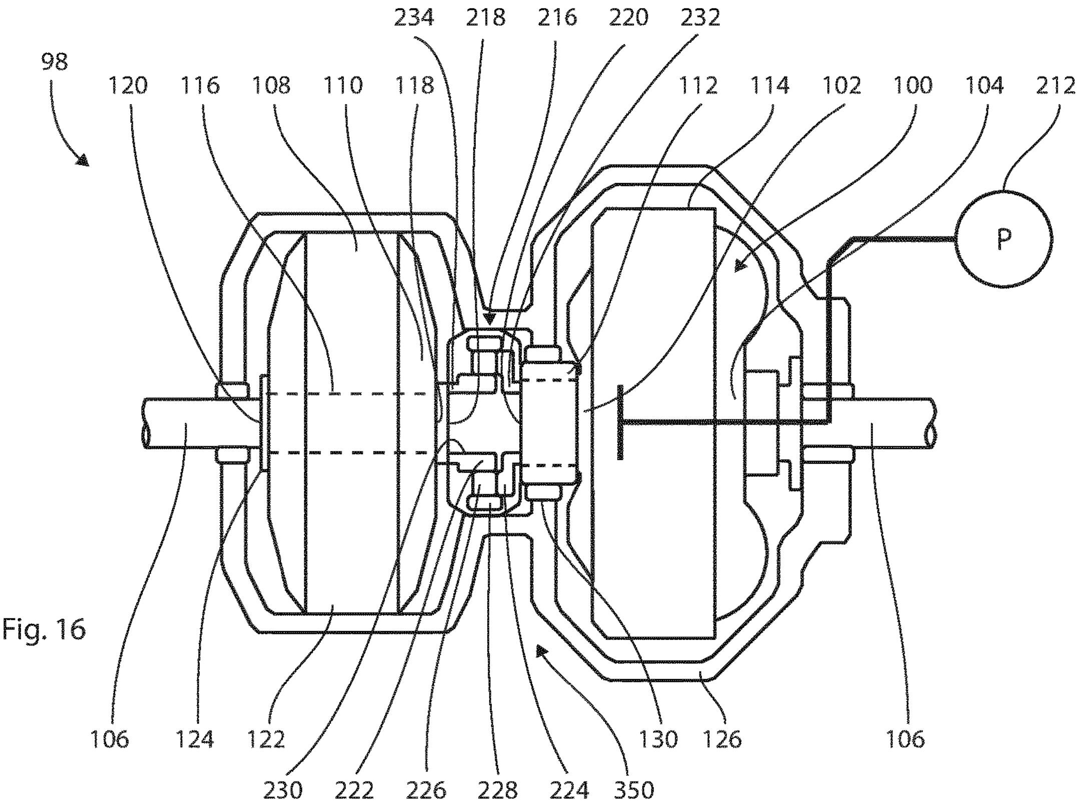
FIG. 16 is a cross sectional view of an embodiment of an electric powertrain with a dual-output torque converter having single internal reduction gear.

FIG. 16 is a cross sectional view of an embodiment of an electric powertrain 98 that is based on the embodiment of FIG. 4, but with a reduction gear set 218 positioned between the torque converter 100 and the electric motor 108.

The reduction gear set is 216 is a planetary gear set and has a reduction gear input part 218 and a reduction gear output part 220. The reduction gear input part 218 forms a sun gear 222 and the reduction gear output part 220 forms a carrier 224 for a set of planet gears 226 that mesh with the sun gear 222 and an outer ring gear 228 that is fixed to and supported by the housing 126. This way, when the reduction gear input part 218 is rotated at a first rotational speed, the reduction gear output part 220 rotate at a lower second rotational speed, and an input torque supplied to the reduction gear input part 218 is converted to a higher output torque supplied by the reduction gear output part 220.

Instead of the motor shaft 110 being connected to the rear end 102 of the torque converter 100, as in FIG. 4, the reduction gear input part 218 is connected to the motor shaft 110 and the reduction gear output part 220 is connected to the rear end 102 of the torque converter 100, more precisely to the input shaft 112 of the torque converter 100.

The reduction gear input part 218 and the reduction gear output part 220 jointly form a reduction gear bore 230, which has a front opening 232 on the side facing the torque converter 100 and a rear opening 234 on the side facing the electric motor 108. The reduction gear bore 230 is coaxial with the motor shaft 110, the input shaft 112, and the output shaft 106. The output shaft 106 enters the reduction gear bore 230 through the front opening 232 and exits the reduction gear bore 230 through the rear opening 234.

Figure 17:
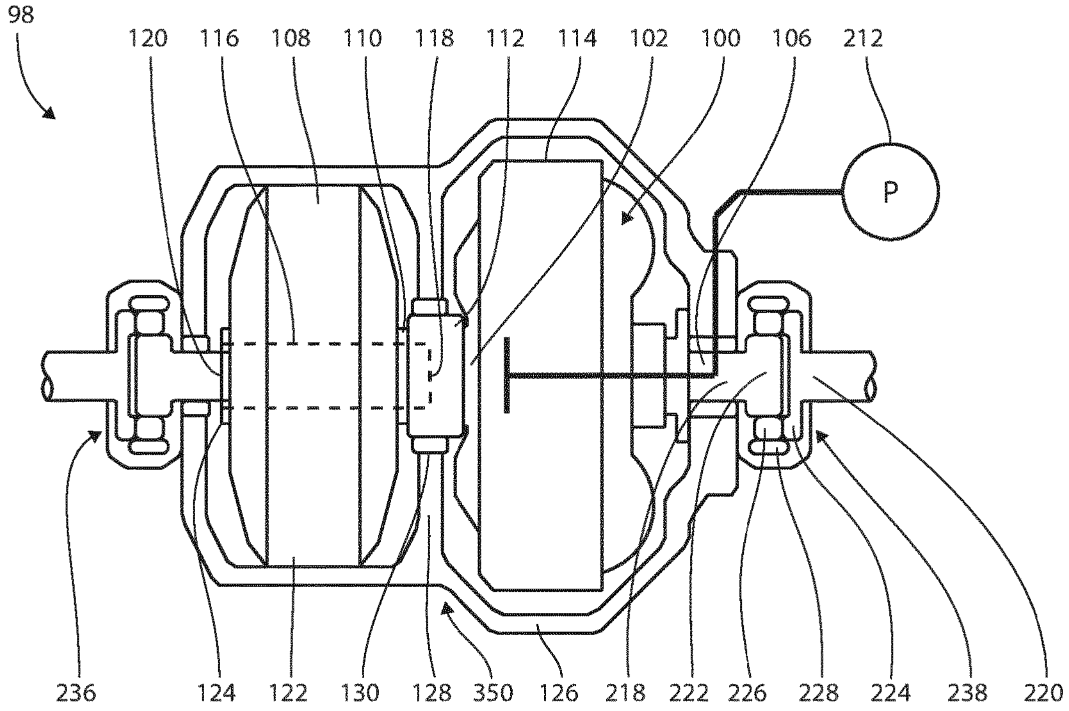
FIG. 17 is a cross sectional view of an embodiment of an electric powertrain with a dual-output torque converter having dual external reduction gears.

FIG. 17 is a cross sectional view of an embodiment of an electric powertrain 98 that is based on the embodiment of FIG. 4, but with a first reduction gear set 236 and a second reduction gear set 238 arranged at both ends of the output shaft 106.

The first and second reduction gear sets 236 and 238 are identical. Each has a reduction gear input part 218 that is connected to the output shaft 106 and a reduction gear output part 220 by which the powertrain 98 can deliver torque, for example to a wheel axle.

The reduction gear input part 218 forms a sun gear 222 and the reduction gear output part 220 forms a carrier 224 for a set of planet gears 226 that mesh with the sun gear 222 and an outer ring gear 228 that is fixed to and supported by the housing 126. This way, when the reduction gear input part 218 is rotated at a first rotational speed, the reduction gear output part 220 rotate at a lower second rotational speed, and an input torque supplied to the reduction gear input part 218 is converted to a higher output torque supplied by the reduction gear output part 220.

Figure 18:
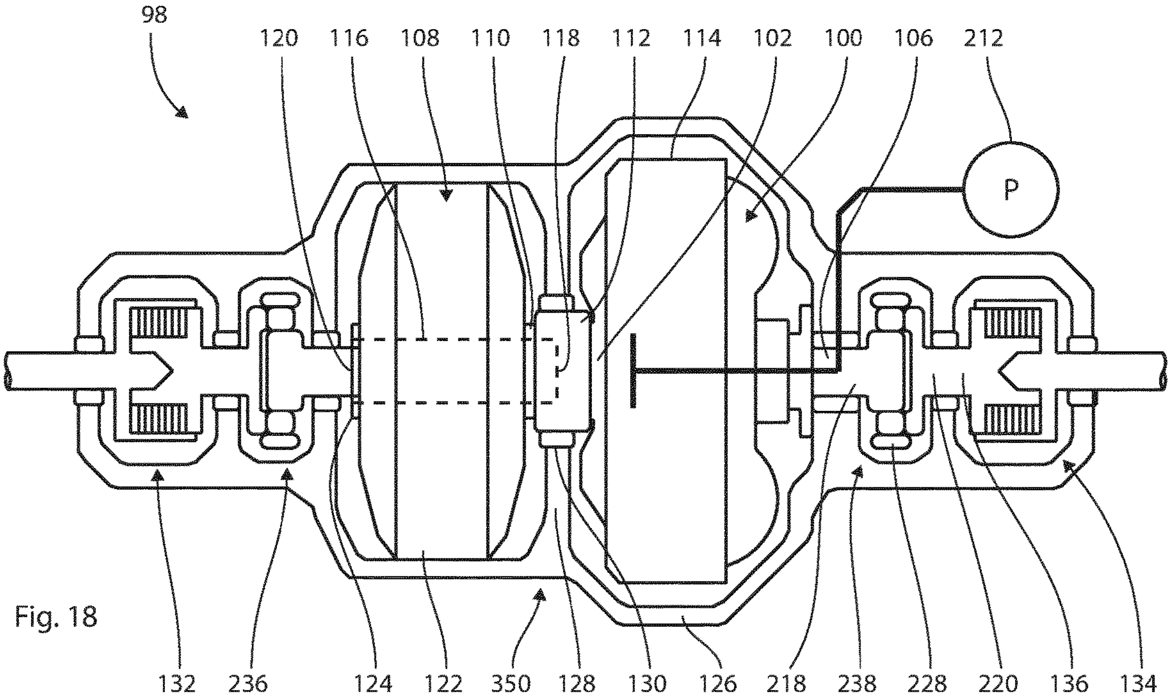
FIG. 18 is a cross sectional view of an embodiment of a linear electric powertrain with a dual-output torque converter having a first clutch at the rear end and a second clutch at the front end and fitted with dual internal reduction gears.

FIG. 18 is a cross sectional view of an embodiment of an electric powertrain 98 that is based on the embodiment of FIG. 5, but with a first reduction gear set 236 and a second reduction gear set 238 arranged between the joint electric motor 108 and torque converter 100 and the first and second clutches 132 and 134 at both ends of the output shaft 106.

The first and second reduction gear sets 236 and 238 are of the same type as described in relation to FIG. 17 with a ring gear 228 that is fixed to and supported by the housing 126. Each has a reduction gear input part 218 that is connected to the output shaft 106 and a reduction gear output part 220 connected to the clutch input part 136 of the first and second clutches 132 and 134, respectively.

Figure 19:
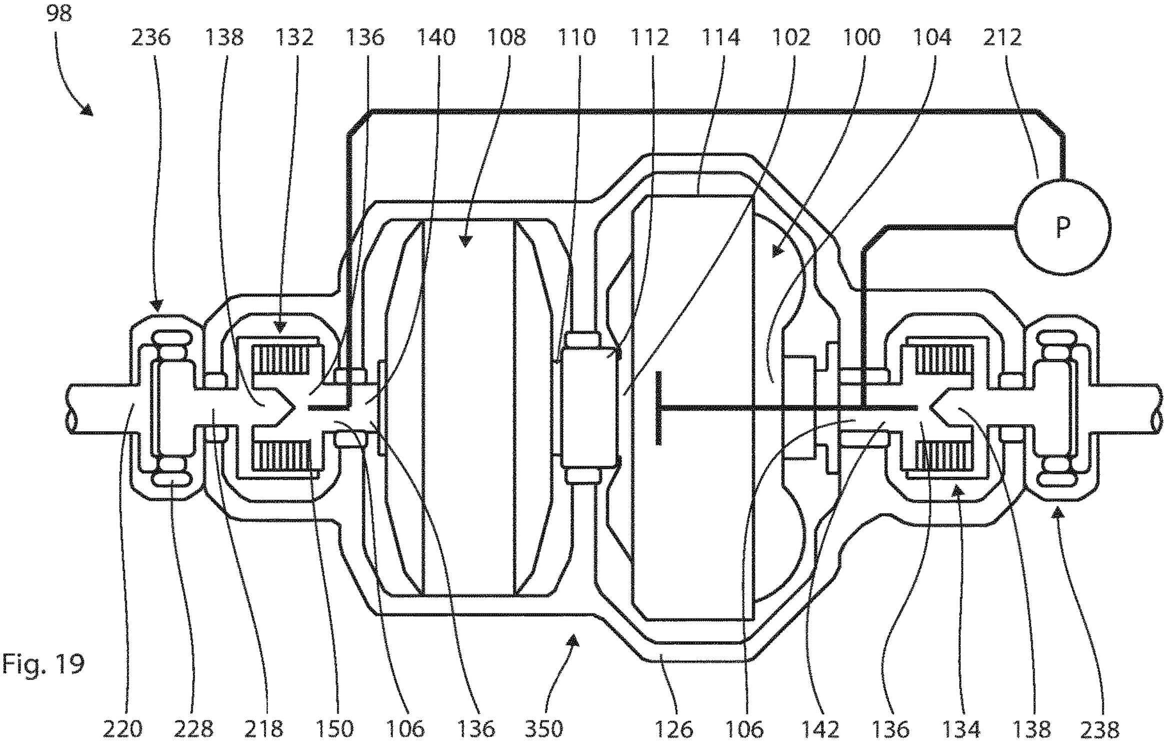
FIG. 19 is a cross sectional view of an embodiment of a linear electric powertrain with a dual-output torque converter having a first clutch at the rear end and a second clutch at the front end and fitted with dual external reduction gears.

FIG. 19 is a cross sectional view of an embodiment of an electric powertrain 98 that is based on the embodiment of FIG. 5, but with first and second reduction gear sets 236 and 238 arranged at the clutch output part 138 of the first clutch 132 and the second clutch 134, respectively.

Details on the first and second reduction gear sets 236 and 238 are given in relation to FIG. 17. The ring gear 228 is fixed to and supported by the housing 126. The first and second reduction gear sets 236 and 238 are identical. Each has a reduction gear input part 218 that is connected to the clutch output part 138 and a reduction gear output part 220 by which the powertrain 98 can deliver torque, for example to a wheel axle.

Figure 20:
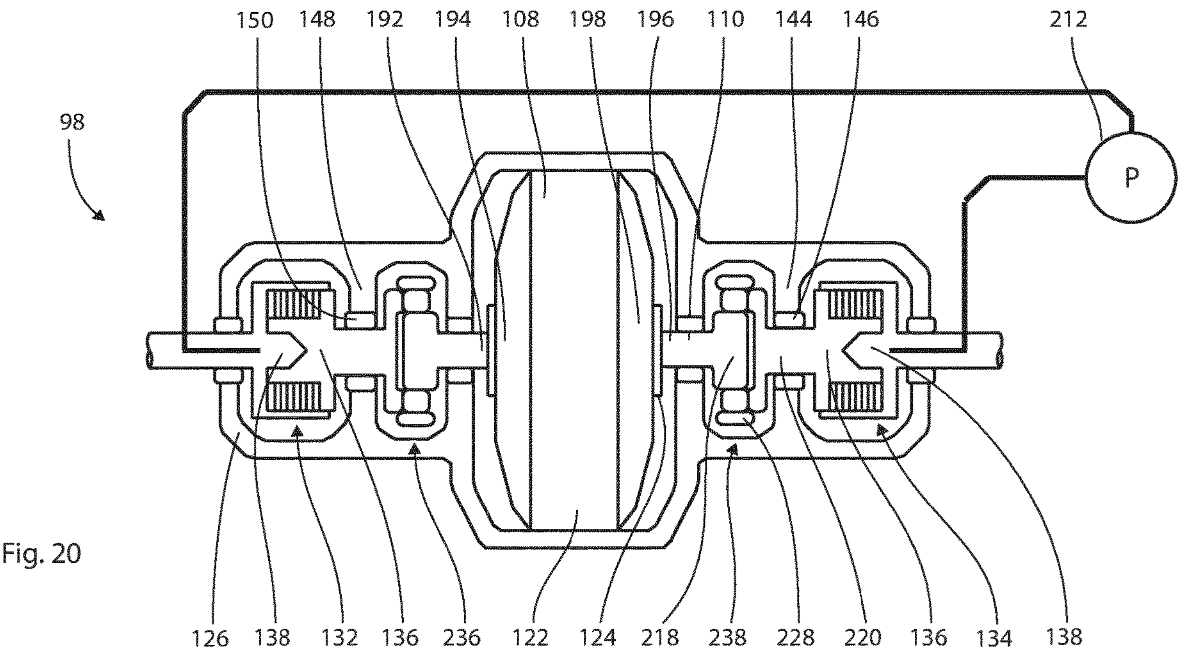
FIG. 20 is a cross sectional view of an embodiment of a linear electric powertrain with an electric motor having a first clutch at a first side and a second clutch at a second side and fitted with dual internal reduction gears.

FIG. 20 is a cross sectional view of an embodiment of an electric powertrain 98 that is based on the embodiment of FIG. 13, but with a first reduction gear set 236 and a second reduction gear set 238 arranged between the electric motor 108 and the first and second clutches 132 and 134 at both ends of the motor shaft 110.

The first and second reduction gear sets 236 and 238 are of the same type as described in relation to FIG. 17 with a ring gear 228 that is fixed to and supported by the housing 126. The reduction gear input part 218 of the first and second reduction gear sets 236 and 238 is connected to the first and second shaft portions 192 and 196 of the motor shaft 110, respectively. The reduction gear output part 220 of the first and second reduction gear sets 236 and 238 is connected to the clutch input part 136 of the first and second clutches 132 and 134, respectively.

Figure 21:
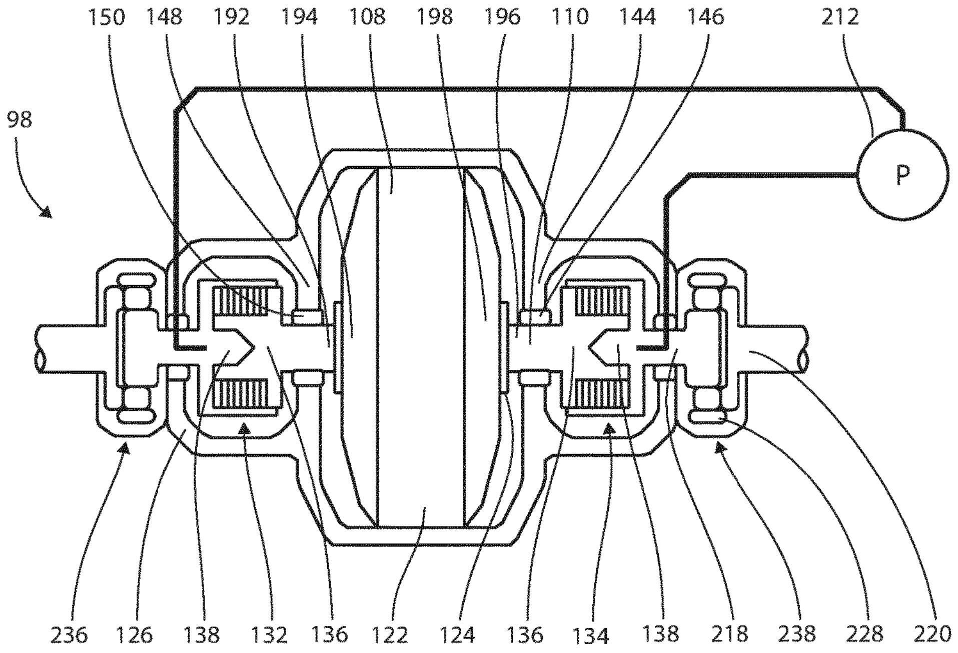
FIG. 21 is a cross sectional view of an embodiment of a linear electric powertrain with an electric motor having a first clutch at a first side and a second clutch at a second side and fitted with dual internal reduction gears.

FIG. 21 is a cross sectional view of an embodiment of an electric powertrain 98 that is based on the embodiment of FIG. 13, but with first and second reduction gear sets 236 and 238 arranged at the clutch output part 138 of the first clutch 132 and the second clutch 134, respectively.

Details on the first and second reduction gear sets 236 and 238 are given in relation to FIG. 17. The ring gear 228 is fixed to and supported by the housing 126. The first and second reduction gear sets 236 and 238 are identical. Each has a reduction gear input part 218 that is connected to the clutch output part 138 and a reduction gear output part 220 by which the powertrain 98 can deliver torque, for example to a wheel axle.

Figure 22:
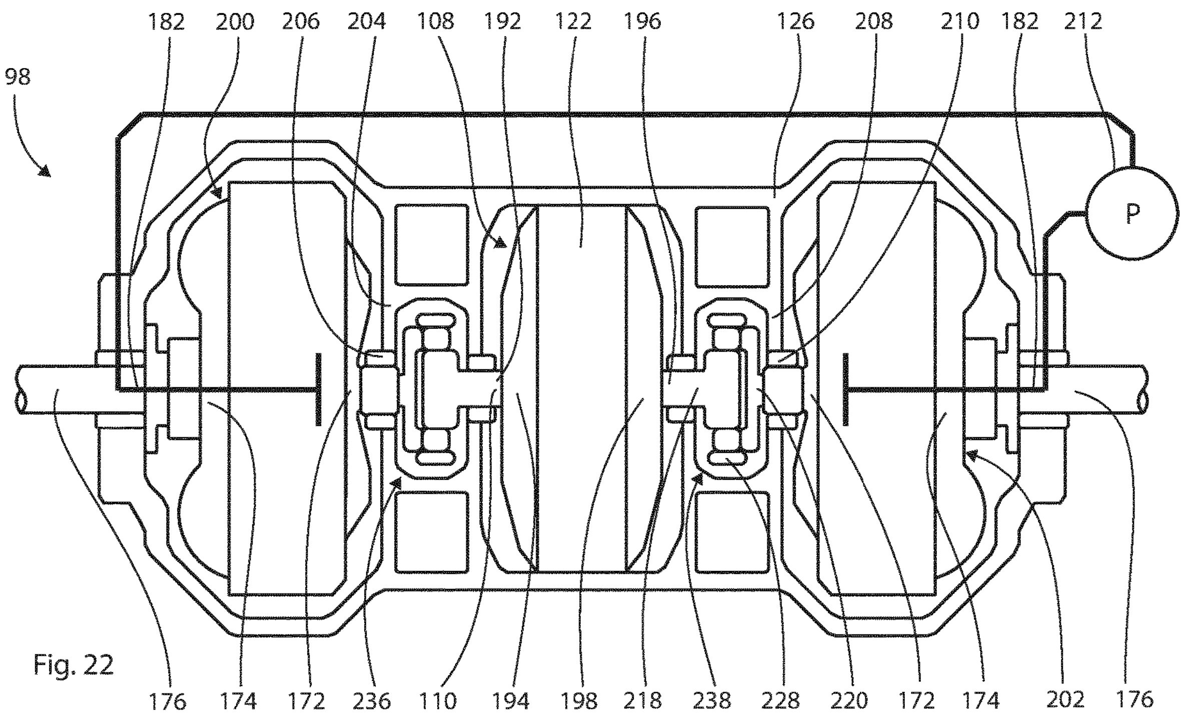
FIG. 22 is a cross sectional view of an embodiment of a linear electric powertrain with an electric motor having a first single-output torque converter at a first side and a second single-output torque converter at a second side and fitted with dual internal reduction gears.

FIG. 22 is a cross sectional view of an embodiment of an electric powertrain 98 that is based on the embodiment of FIG. 15, but with a first reduction gear set 236 and a second reduction gear set 238 arranged between the electric motor 108 and the first and second torque converters 200 and 202.

The first and second reduction gear sets 236 and 238 are of the same type as described in relation to FIG. 17 with a ring gear 228 that is fixed to and supported by the housing 126. The reduction gear input part 218 of the first and second reduction gear sets 236 and 238 is connected to the first and second shaft portions 192 and 196 of the motor shaft 110, respectively. The reduction gear output part 220 of the first and second reduction gear sets 236 and 238 is connected to the rear end 172 of the first and second torque converters 200 and 202. This means that the rear ends 172 rotate at the same speed, which is slower than the rotational speed pf the motor shaft 110.

Figure 23:
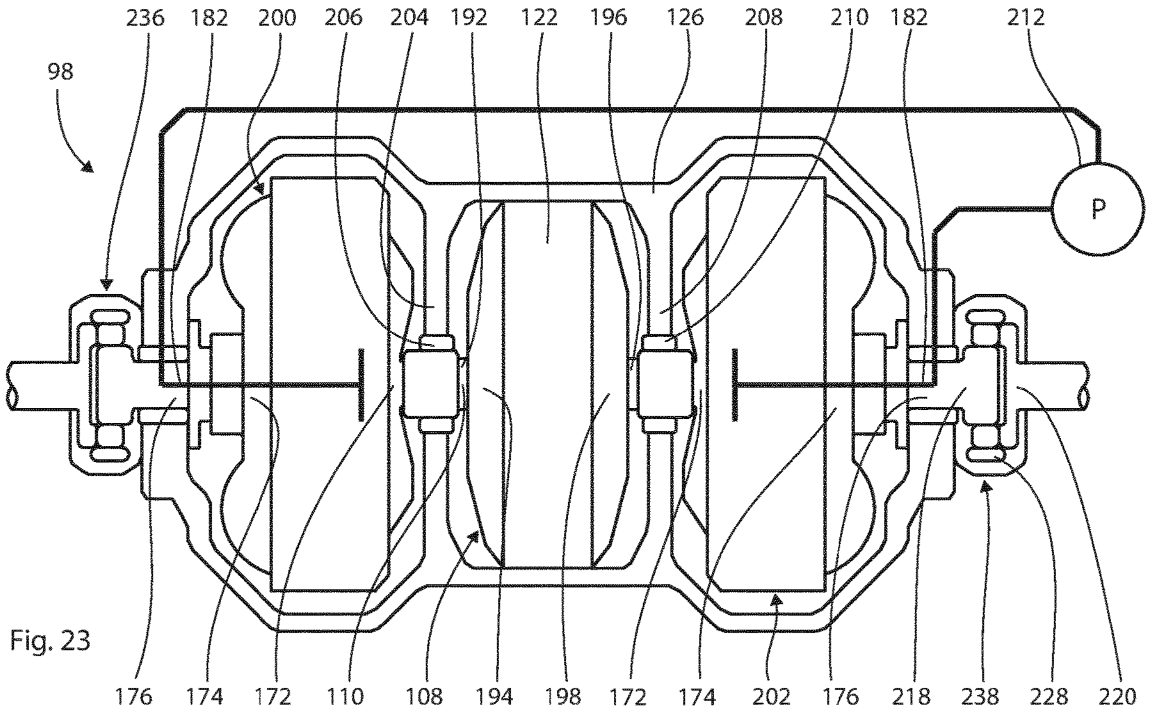
FIG. 23 is a cross sectional view of an embodiment of a linear electric powertrain with an electric motor having a first single-output torque converter at a first side and a second single-output torque converter at a second side and fitted with dual external reduction gears.

FIG. 23 is a cross sectional view of an embodiment of an electric powertrain 98 that is based on the embodiment of FIG. 13, but with first and second reduction gear sets 236 and 238 connected to the output shaft 176 of the first and second torque converters 200 and 202, respectively.

Details on the first and second reduction gear sets 236 and 238 are given in relation to FIG. 17. The ring gear 228 is fixed to and supported by the housing 126. The first and second reduction gear sets 236 and 238 are identical. Each has a reduction gear input part 218 that is connected to the output shaft 176 of the neighboring torque converter 200 and 202 and a reduction gear output part 220 by which the powertrain 98 can deliver torque, for example to a wheel axle.

Figure 24:
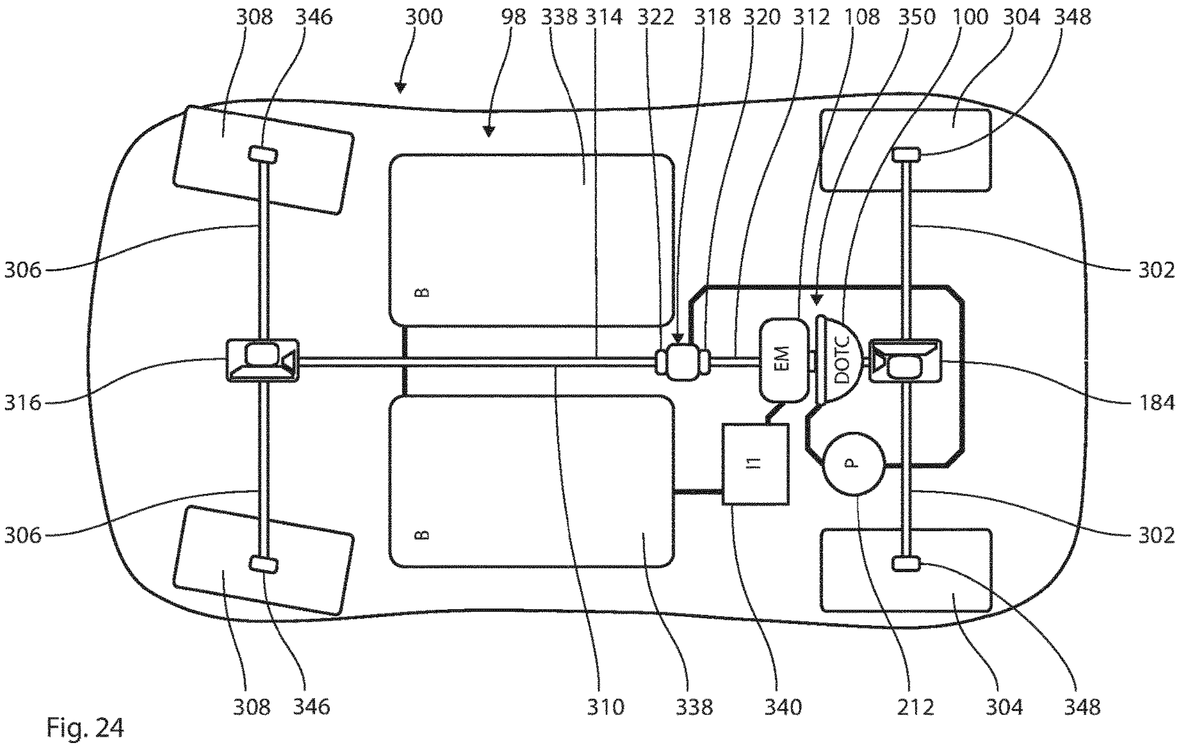
FIG. 24 is a schematic view of an embodiment of an automotive road vehicle with an electric powertrain according to the embodiment of FIG. 12.

FIG. 24 is a schematic view of an embodiment of an automotive road vehicle 300 with an electric powertrain 98 according to the embodiment of FIG. 12. Effectively, the electric motor 108 and the torque converter 100 form a drive assembly 350 as described in relation to FIG. 4. The powertrain 98 has a pair of wheel axles 302 connecting a pair of wheels 304 with the first gear output and the second gear output of the differential 184.

It further has a drive shaft 310 connected to the output shaft of the torque converter 100 and an additional differential 316 connecting the drive shaft 310 to a pair of additional wheel axles 306, which in turn connect to a pair of additional wheels 308. The powertrain 98 has additional wheel connectors 348 in the form of hubs that connects the rims of the additional wheels 308 to the additional wheel axles 306. The pair additional wheels 308 are the front wheels and the pair of wheels 304 are the rear wheels. This way, the electric motor 108 can supply torque to both the wheels 304 and the additional wheels 308, effectively providing a four-wheel drive with the electric motor 108 as the only prime mover.

The powertrain 98 has first wheel connectors 346 in the form of a hubs that fix the rims of the additional wheels 308 to the additional wheel axles 306. It further has second wheel connectors 348 in the form of a hubs that fix the rims of the wheels 304 to the wheel axles 302.

The drive shaft 310 has a first shaft portion 312 connected to the output shaft of the torque converter 100 and a second shaft portion 314 connected to the additional differential 316. It further has a center clutch 318 connecting the first shaft portion 312 and the second shaft portion 314. The center clutch 318 has a clutch input part 320 connected to the first shaft portion 312 and a clutch output part 322 connected to the second shaft portion 314.

The center clutch 318 functions in the same manner as the first and second clutches 132 and 134 described above. For example, it has (a) an unengaged state in which the clutch input part 320 and the clutch output part 322 are unlocked and can spin at different speeds, (b) a slipping state in which the clutch input part 320 part and the clutch output part 322 are partially locked together and can spin at different speeds, and (c) an engaged state in which the clutch input part 320 and the clutch output part 322 are locked together and spin at the same speed.

The hydraulic control system 212 controlling the torque converter 100 also controls the center clutch 318 by the supply of the same fluid. This way, the hydraulic control system 212 and the center clutch 318 can dynamically regulates the amount of torque that is transferred from the torque converter 100 to the pair of additional wheels 308.

Figure 25:
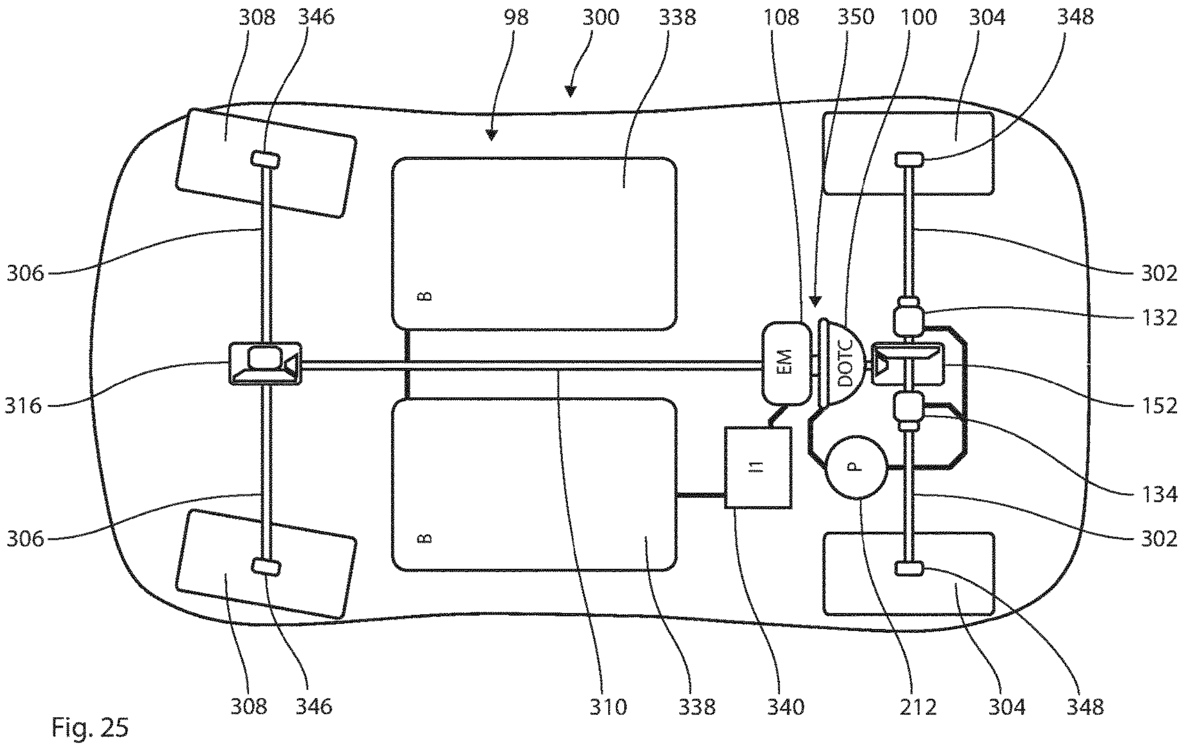
FIG. 25 is a schematic view of an embodiment of an automotive road vehicle with an electric powertrain according to the embodiment of FIG. 9.

FIG. 25 is a schematic view of an embodiment of an automotive road vehicle 300 with an electric powertrain 98 according to the embodiment of FIG. 9. Effectively, the electric motor 108 and the torque converter 100 form a drive assembly 350 as described in relation to FIG. 4. The powertrain 98 has a pair of wheel axles 302 connecting a pair of wheels 304 with the clutch output part of the first and second clutches 132 and 134 of the bevel gear assembly 152.

The powertrain 98 has first wheel connectors 346 in the form of a hubs that fix the rims of the additional wheels 308 to the additional wheel axles 306. It further has second wheel connectors 348 in the form of a hubs that fix the rims of the wheels 304 to the wheel axles 302.

The vehicle 300 further has a drive shaft 310 connected to the output shaft of the torque converter 100 and an additional differential 316 connecting the drive shaft 310 to a pair of additional wheel axles 306, which in turn connect to a pair of additional wheels 308. The pair additional wheels 308 are the front wheels and the pair of wheels 304 are the rear wheels. This way, the electric motor 108 can supply torque to both the wheels 304 and the additional wheels 308, effectively providing a four-wheel drive with the electric motor 108 as the only prime mover.

The drive shaft 310 does not have a center clutch as in the previous embodiment. Instead, the amount of torque that is distributed to the rear wheels 304 is regulated by the first and second clutched 132 and 134. The hydraulic control system 212 controlling the torque converter 100 is connected to each of the clutches 132 and 134 and controls also the operation of these components. For example, the components can be operated to provide torque vectoring with the rear wheels 304.

Figure 26:
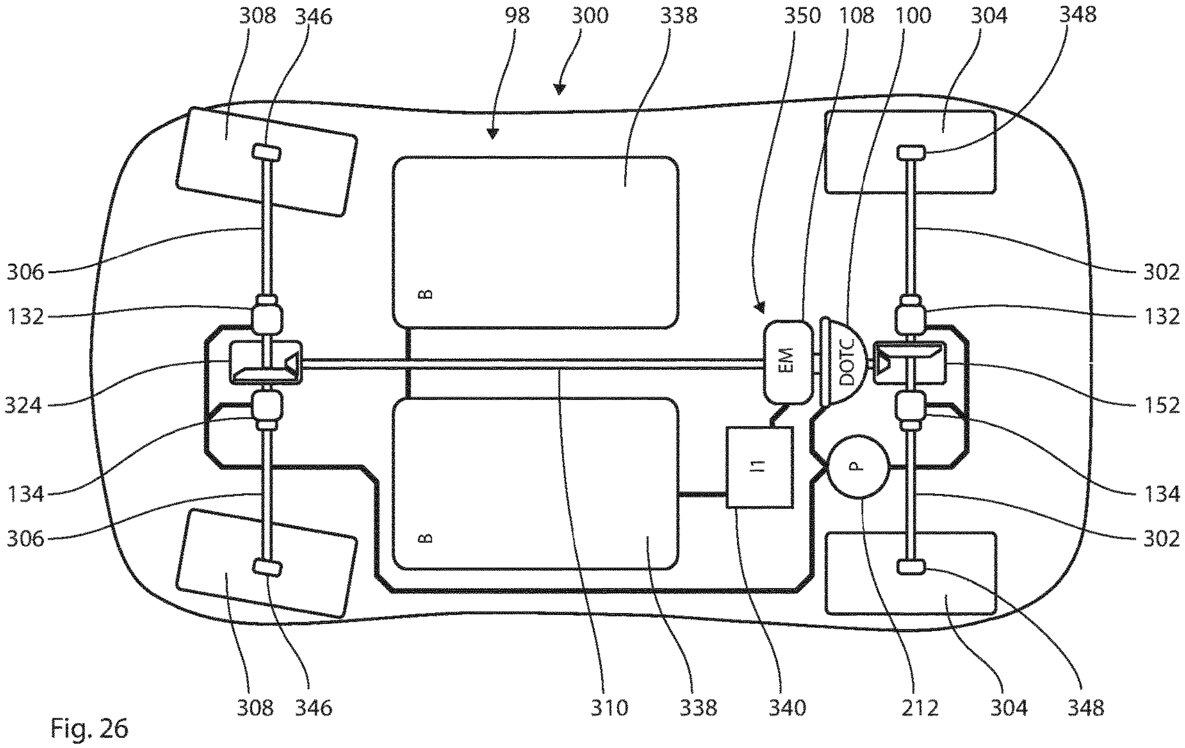
FIG. 26 is a schematic view of an embodiment of an automotive road vehicle with an electric powertrain according to the embodiment of FIG. 9 and a bevel gear assembly according to o the embodiment of FIG. 6.

FIG. 26 is a schematic view of an embodiment of an automotive road vehicle 300 with an electric powertrain 98 according to the embodiment of FIG. 9. Effectively, the electric motor 108 and the torque converter 100 form a drive assembly 350 as described in relation to FIG. 4. This embodiment differs from the previous embodiment only in that additional differential 316 has been replace by an additional bevel gear assembly 324 having the features of the embodiment of bevel gear assembly described in relation FIG. 6. This means that drive shaft is connected to the gear input shaft of the additional bevel gear assembly 324, that one of the additional wheel axles 306 is connected to the clutch output part of the first clutch 132 of the additional bevel gear assembly 324, and that the other additional wheel axle 306 is connected to the clutch output part of the second clutch 134 of the additional bevel gear assembly 324.

In this embodiment, the amount of torque distributed to the rear wheels 304 is regulated by the first and second clutched 132 and 134 of the bevel gear assembly 152, and the amount of torque distributed to the front wheels 308 is regulated by the first and second clutched 132 and 134 of the additional bevel gear assembly 324. Additionally, the first and second clutched 132 and 134 of each bevel gear assembly 152 and 324 determines the distribution to the wheels 304 and 308 in respective wheel pair.

The hydraulic control system 212 controlling the torque converter 100 is also connected to all four clutches 132 and 134 and controls the operation of these components. For example, they can be operated to provide torque vectoring with both the front wheels 308 and the rear wheels 304.

Figure 27:
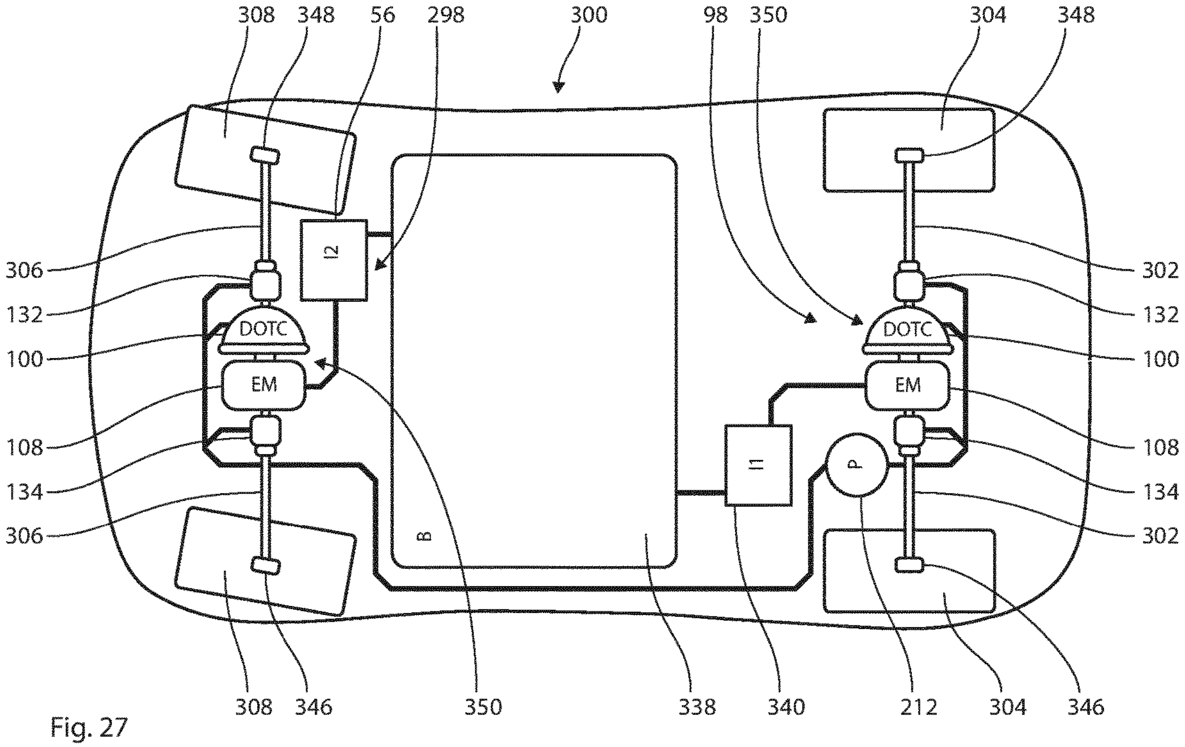
FIG. 27 is a schematic view of an embodiment of an automotive road vehicle with dual electric powertrains according to the embodiment of FIG. 5.

FIG. 27 is a schematic view of an embodiment of an automotive road vehicle 300 with an electric powertrain 98 and an additional electric powertrain 298 according to the embodiment of FIG. 5. Effectively, the electric motor 108 and the torque converter 100 of each of the powertrains 98 and 298 form a drive assembly 350 as described in relation to FIG. 4. The powertrain 98 has a pair of wheel axles 302 connecting a pair of wheels 304 with the clutch output part of the first and second clutches 132 and 134 of powertrain 98. Similarly, it has a pair of additional wheel axles 306 connecting a pair of additional wheels 308 with the clutch output part of the first and second clutches 132 and 134 of the additional electric powertrain 298.

The powertrain 98 has a first wheel connector 346 in the form of a hub that fixes the rim of one of the wheels 304 to one of the wheel axle 302 and a second wheel connector 348 in the form of a hub that fixes the rim of the other wheel 304 to the other wheel axle 302. Similarly, the powertrain 98 has a first wheel connector 346 that fixes the rim of one of the additional wheels 308 to one of the additional wheel axle 306 and a second wheel connector 348 that fixes the rim of the other additional wheel 308 to the other wheel axle 306.

The hydraulic control system 212 is connected to the first clutch 132, second clutch 134, and torque converter 100 of the powertrain 98 and the additional power train 298. This way, the amount of torque supplied by each wheel 304 and 308 can be individually controlled by the clutches 132 and 134 and the hydraulic control system 212 to give four-wheel drive with torque vectoring on all wheels.

In alternative embodiments, the automotive road vehicle 300 has an electric powertrain 98 and an additional electric powertrain 298 according to the embodiment of FIG. 18 or 19.

Figure 28:
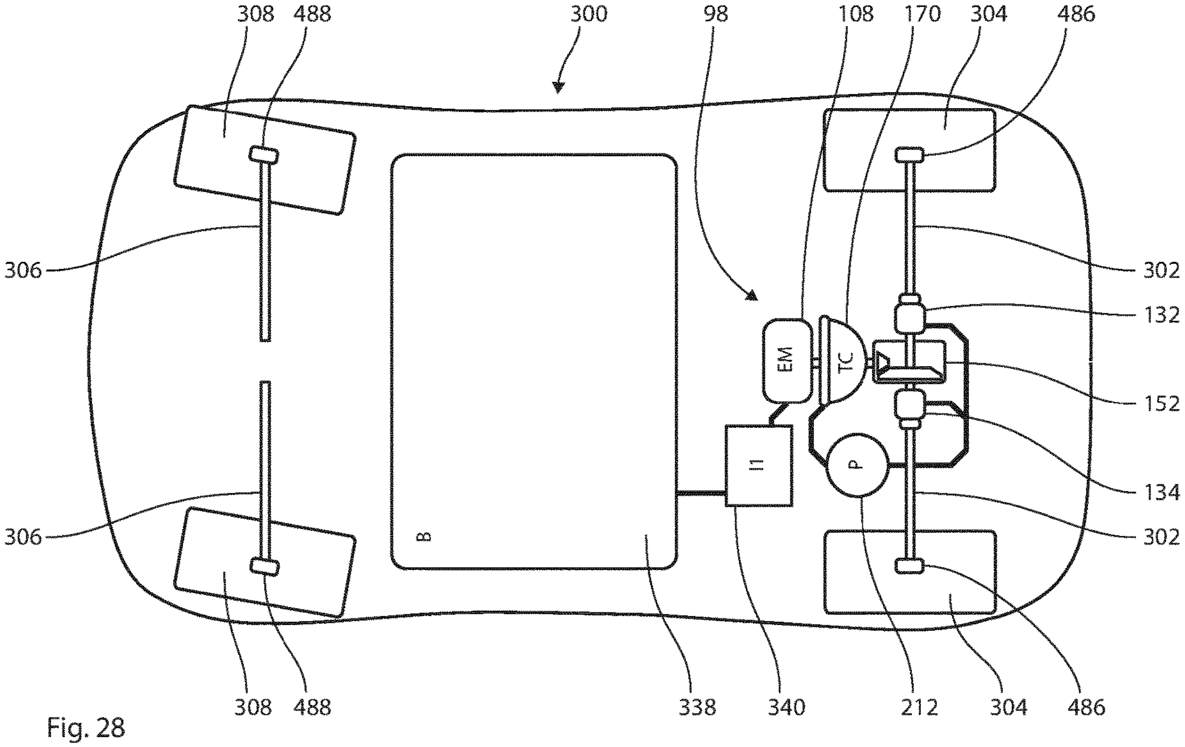
FIG. 28 is a schematic view of an embodiment of an automotive road vehicle with an electric powertrain according to the embodiment of FIG. 8 connected to the rear wheels.

FIG. 28 is a schematic view of an embodiment of an automotive road vehicle 300 with an electric powertrain 98 according to the embodiment of FIG. 8. The powertrain 98 has a pair of wheel axles 302 connecting a pair of wheels 304 with the clutch output part of the first and second clutches 132 and 134 of the powertrain 98. The wheels 304 are fixed to the wheel axles 302 by wheel connectors 486 in the form of hubs. In this embodiment the pair of wheels 304 are the rear wheels of the vehicle 300. The additional wheels 308 are supported by the additional wheel axles 306 and providing steering of the vehicle 300. The additional wheels 308 are fixed to the additional wheel axles 306 by additional wheel connectors 488 in the form of hubs. The hydraulic control system 212 is connected to and controls the operation of the torque converter 170 and the first and second clutches 132 and 134 of the powertrain 98.

Figure 29:
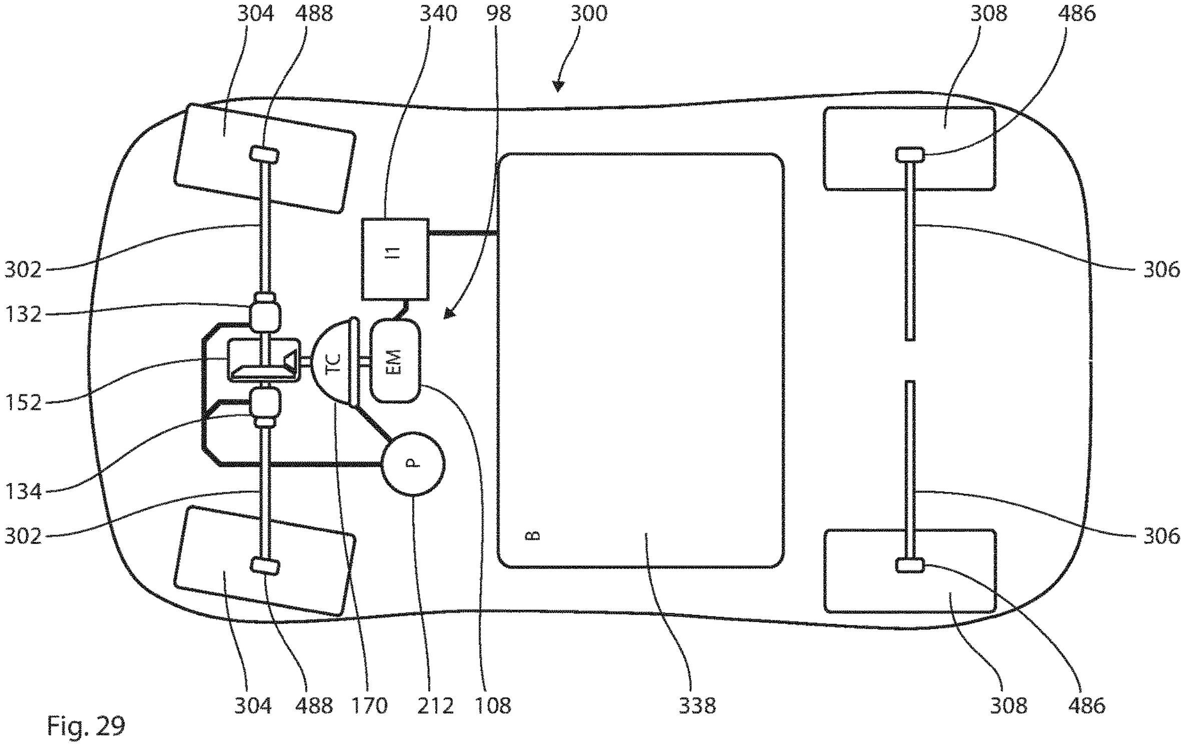
FIG. 29 is a schematic view of an embodiment of an automotive road vehicle with an electric powertrain according to the embodiment of FIG. 8 connected to the front wheels.

FIG. 29 is a schematic view of an embodiment of an automotive road vehicle 300 with an electric powertrain 98 according to the embodiment of FIG. 8. The powertrain 98 has a pair of wheel axles 302 connecting a pair of wheels 304 with the clutch output part of the first and second clutches 132 and 134 of the powertrain 98. This embodiment differs from the embodiment of FIG. 28 by the pair of wheels 304 being the front wheels providing steering of the vehicle 300, and the additional wheels 308 supported by the additional wheel axles 306 are the rear wheels of the vehicle 300. The hydraulic control system 212 is connected to and controls the operation of the torque converter 170 and the first and second clutches 132 and 134 of the powertrain 98.

Figure 30:
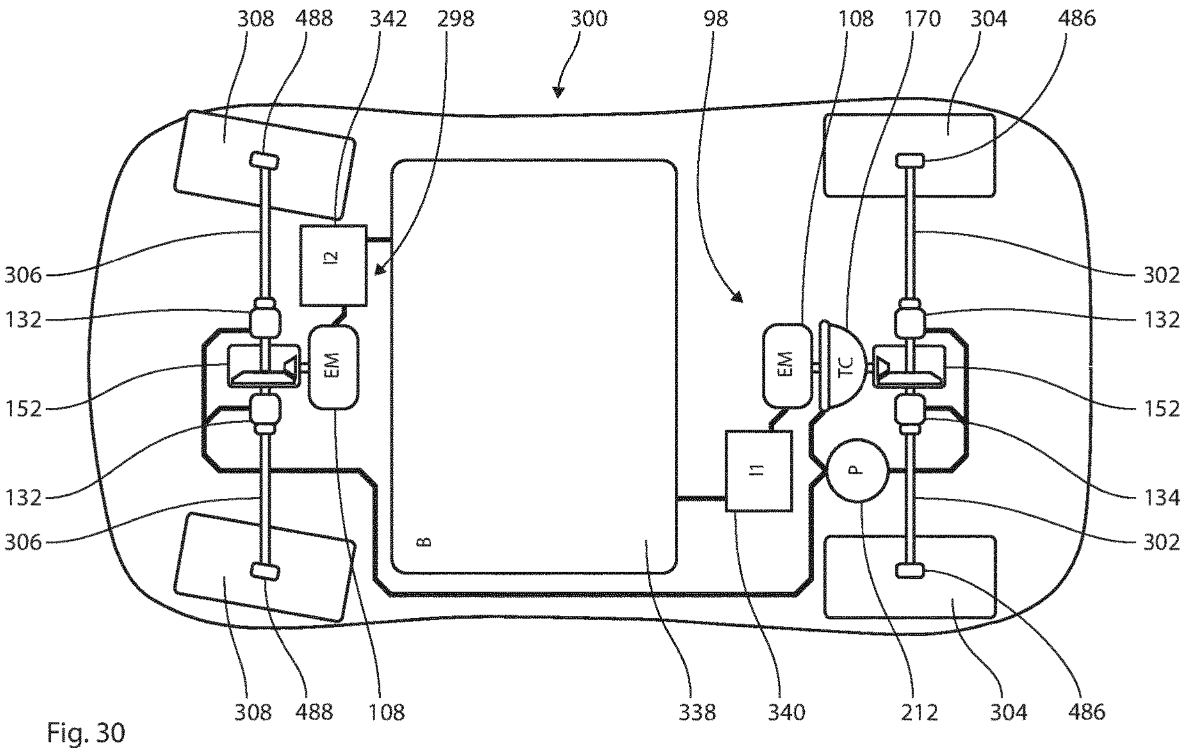
FIG. 30 is a schematic view of an embodiment of an automotive road vehicle with electric powertrains according to the embodiment of FIG. 8 connected to the rear wheels and the front wheels.

FIG. 30 is a schematic view of an embodiment of an automotive road vehicle 300 with an electric powertrain 98 according to the embodiment of FIG. 8. The powertrain 98 has a pair of wheel axles 302 connecting a pair of wheels 304 with the clutch output part of the first and second clutches 132 and 134 of the powertrain 98. The wheels 304 are fixed to the wheel axles 302 by wheel connectors 486 in the form of hubs. The pair of wheels 304 are the rear wheels of the vehicle 300. Additionally, the vehicle 300 has an additional electric powertrain 298 according to the embodiment of FIG. 8. A pair of additional wheel axles 306 connects a pair of additional wheels 308 with the clutch output part of the first and second clutches 132 and 134 of the additional powertrain 298. The additional wheels 308 are fixed to the additional wheel axles 306 by additional wheel connectors 488 in the form of hubs. The pair of additional wheels 304 are the front wheels providing steering of the vehicle 300. The same hydraulic control system 212 is connected to and controls the operation of the torque converters 170 and first and second clutches 132 and 134 of both the powertrain 98 and the additional powertrain 298. This means that the same fluid is used in these components.

Figure 31:
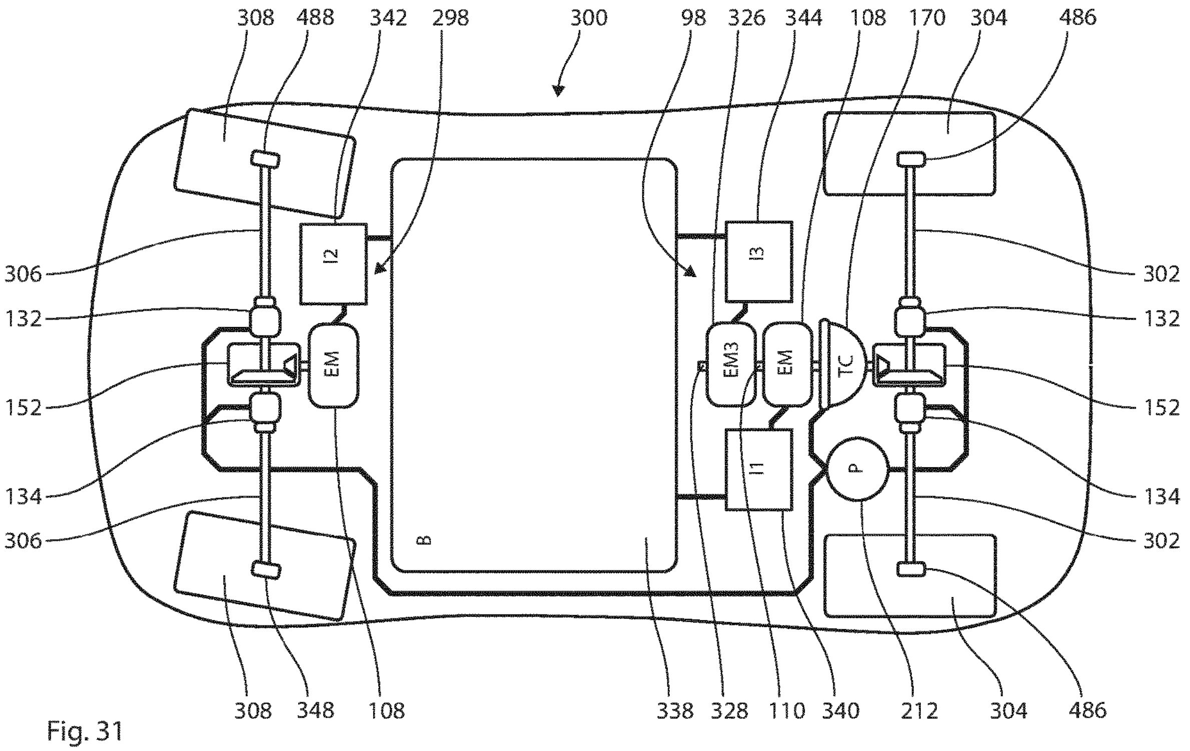
FIG. 31 is a schematic view of an embodiment of an automotive road vehicle with an electric powertrain according to the embodiment of FIG. 8 and a tertiary electric motor connected to the rear wheels and an electric powertrain according to the embodiment of FIG. 8 connected to the front wheels.

FIG. 31 is a schematic view of an embodiment of an automotive road vehicle 300 with an electric powertrain 98 and an additional electric powertrain 298 as in the previous embodiment of FIG. 30. In addition, the powertrain 98 has a tertiary electric motor 326 with a motor shaft 328 that is connected to the motor shaft 110 of the electric motor 108. This means that the tertiary electric motor 326 is operationally connected to the bevel gear assembly 152. The electric motor 108 of the powertrain 98 and the additional powertrain 298 are permanent-magnet motors and the tertiary electric motor 326 of the powertrain 98 is an induction motor.

Figure 32:
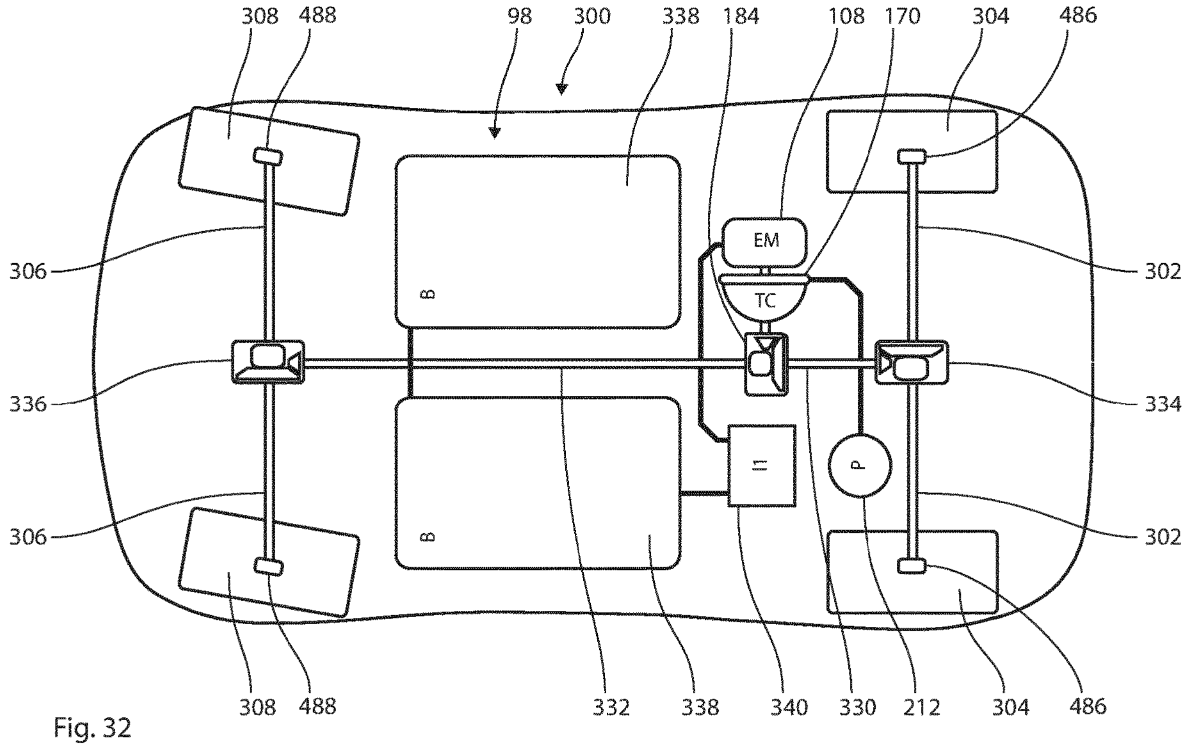
FIG. 32 is a schematic view of an embodiment of an automotive road vehicle with an electric powertrain according to the embodiment of FIG. 11 connected to the rear wheels and the front wheels.

FIG. 32 is a schematic view of an embodiment of an automotive road vehicle 300 with an electric powertrain according to the embodiment of FIG. 11. A first drive shaft 330 is connected to the first gear output of the differential 184 and a second drive shaft 332 is connected to the second gear output of the differential 184. A first differential 334 connects the first drive shaft 330 to a pair of wheel axles 302, which in turn connect to a pair of wheels 304. The wheels 304 are fixed to the wheel axles 302 by wheel connectors 486 in the form of hubs. Similarly, a second differential 336 connects the second drive shaft 332 to a pair of additional wheel axles 306, which in turn connect to a pair of additional wheels 308. The additional wheels 308 are fixed to the additional wheel axles 306 by additional wheel connectors 488 in the form of hubs. This means that the output torque supplied by the torque converter 170 is divided between the first differential 334 and the second differential 336, and in extension between the pair of wheels 304 and the pair of additional wheels 308, thus providing a four-wheel drive with a single electric motor 108 as the only prime mover. The pair of wheels 304 are the rear wheels of the vehicle 300, while the pair of additional wheels 308 are the front wheels providing steering. The hydraulic control system 212 is connected to and controls the operation of the torque converters 170.

Figure 33:
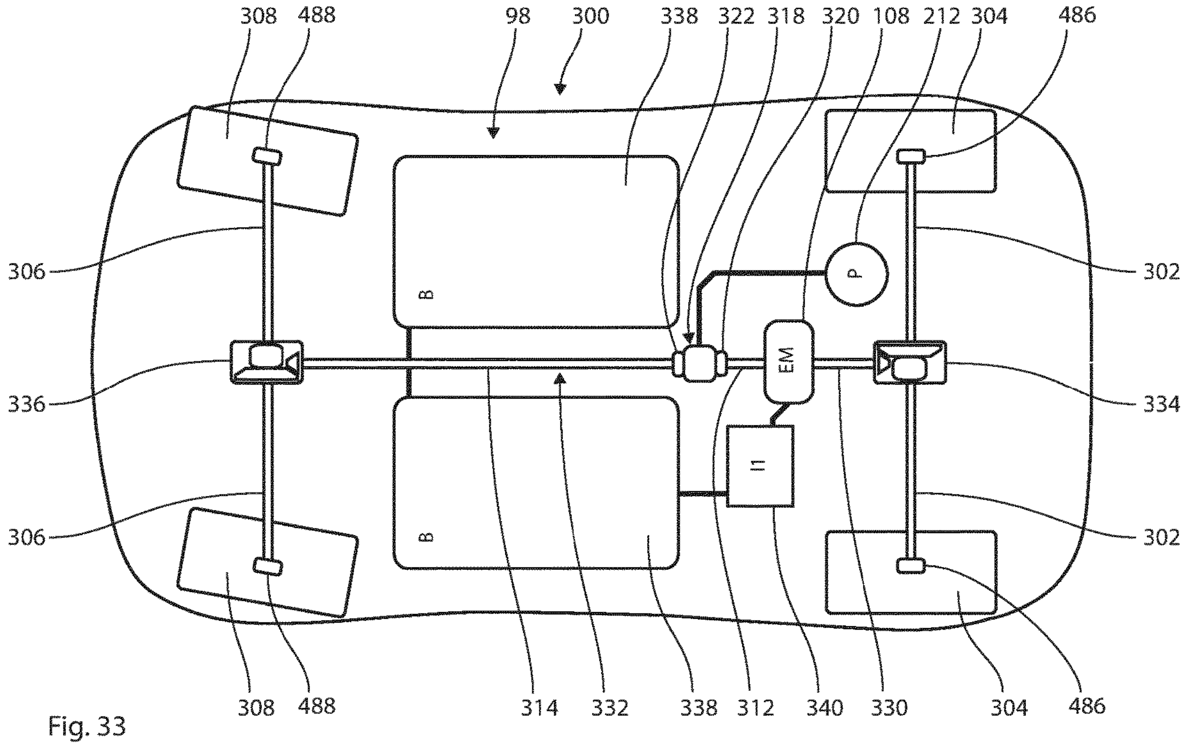
FIG. 33 is a schematic view of an embodiment of an automotive road vehicle with an electric motor having a solid motors shaft connected on one side to a first drive shaft and on the other side to a second drive shaft.

FIG. 33 is a schematic view of an embodiment of an automotive road vehicle 300 with an electric powertrain having an electric motor 108 with a solid motors shaft connected on one side to a first drive shaft 330 and on the other side to a second drive shaft 332. A first differential 334 connects the first drive shaft 330 to a pair of wheel axles 302, which in turn connect to a pair of wheels 304. The wheels 304 are fixed to the wheel axles 302 by wheel connectors 486 in the form of hubs. Similarly, a second differential 336 connects the second drive shaft 332 to a pair of wheel additional axles 306, which in turn connect to a pair of additional wheels 308. The additional wheels 308 are fixed to the additional wheel axles 306 by additional wheel connectors 488 in the form of hubs. This means that the output torque supplied by the electric motor 108 is divided between the first differential 334 and the second differential 336, and in extension between the pair of wheels 304 and the pair of additional wheels 308, thus providing a four-wheel drive with a single electric motor 108 as the only prime mover. The pair of wheels 304 are the rear wheels of the vehicle 300, while the pair of additional wheels 308 are the front wheels providing steering.

The second drive shaft 332 has a first shaft portion 312 and a second shaft portion 314. The first shaft portion 312 is connected to the motor shaft 110 of the electric motor 108 and to the clutch input part 320 of a center clutch 318. The second shaft portion 314 is connected to the second differential 336 and the clutch output part 322 of the center clutch 318. A hydraulic control system 212 is connected to and controls the operation of the center clutch 318. The center cutch 318 has the same function as the center clutch 318 of the embodiment in FIG. 24.

Figure 34:
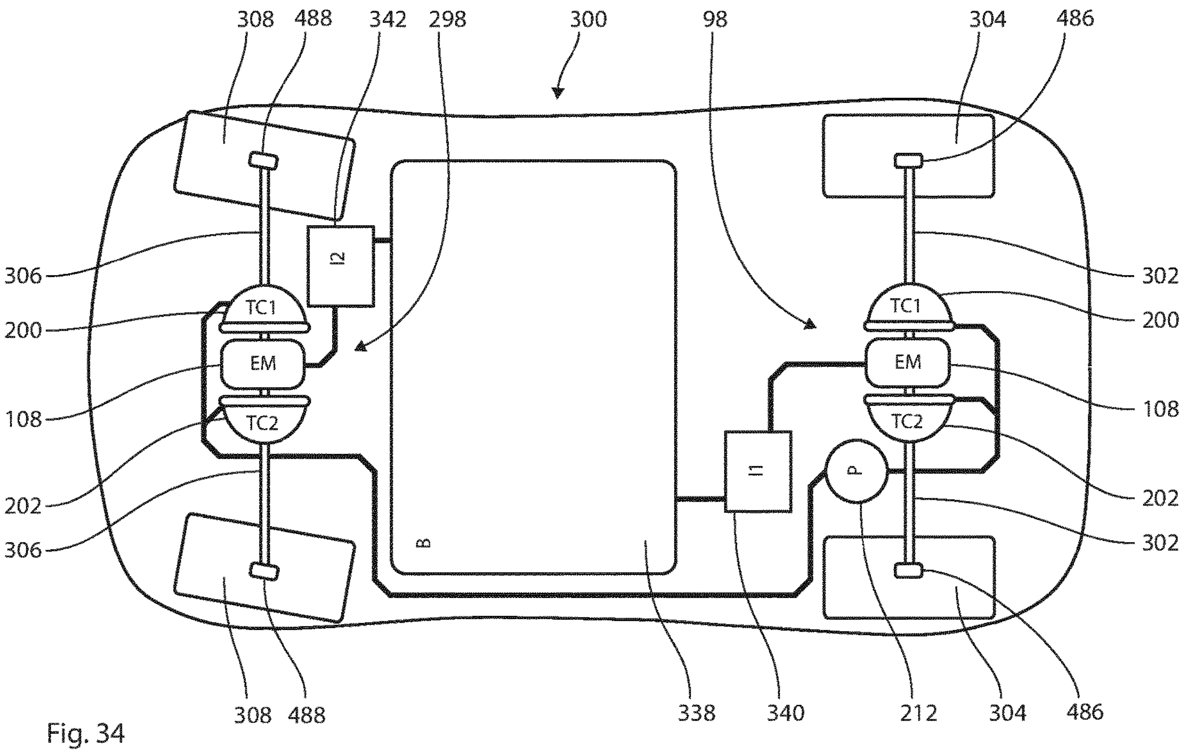
FIG. 34 is a schematic view of an embodiment of an automotive road vehicle with dual electric powertrains according to the embodiment of FIG. 15.

FIG. 34 is a schematic view of an embodiment of an automotive road vehicle 300 with an electric powertrain 98 and an additional electric powertrain 298, both according to the embodiment of FIG. 15. The powertrain 98 has a pair of wheel axles 302 connecting a pair of wheels 304 with the output shafts of the first torque converter 200 and the second torque converter 202 of the powertrain 98. The wheels 304 are fixed to the wheel axles 302 by wheel connectors 486 in the form of hubs. Similarly, it has a pair of additional wheel axles 306 connecting a pair of additional wheels 308 with the output shafts of the first torque converter 200 and the second torque converter 202 of the additional powertrain 298. The additional wheels 308 are fixed to the additional wheel axles 306 by additional wheel connectors 488 in the form of hubs.

The hydraulic control system 212 is connected to the first and second torque converters 200 and 202 of the powertrain 98 and the additional power train 298. This way, the amount of torque supplied by each wheel 304 and 308 can be individually controlled by the first and second torque converters 200 and 202 and the hydraulic control system 212, and the vehicle can be selectively operated with front-wheel drive, rear-wheel drive, and four-wheel drive with active torque vectoring in each of the modes.

In alternative embodiments, the automotive road vehicle 300 has an electric powertrain 98 and an additional electric powertrain 298 according to the embodiment of FIG. 22 or 23.

Figure 35:
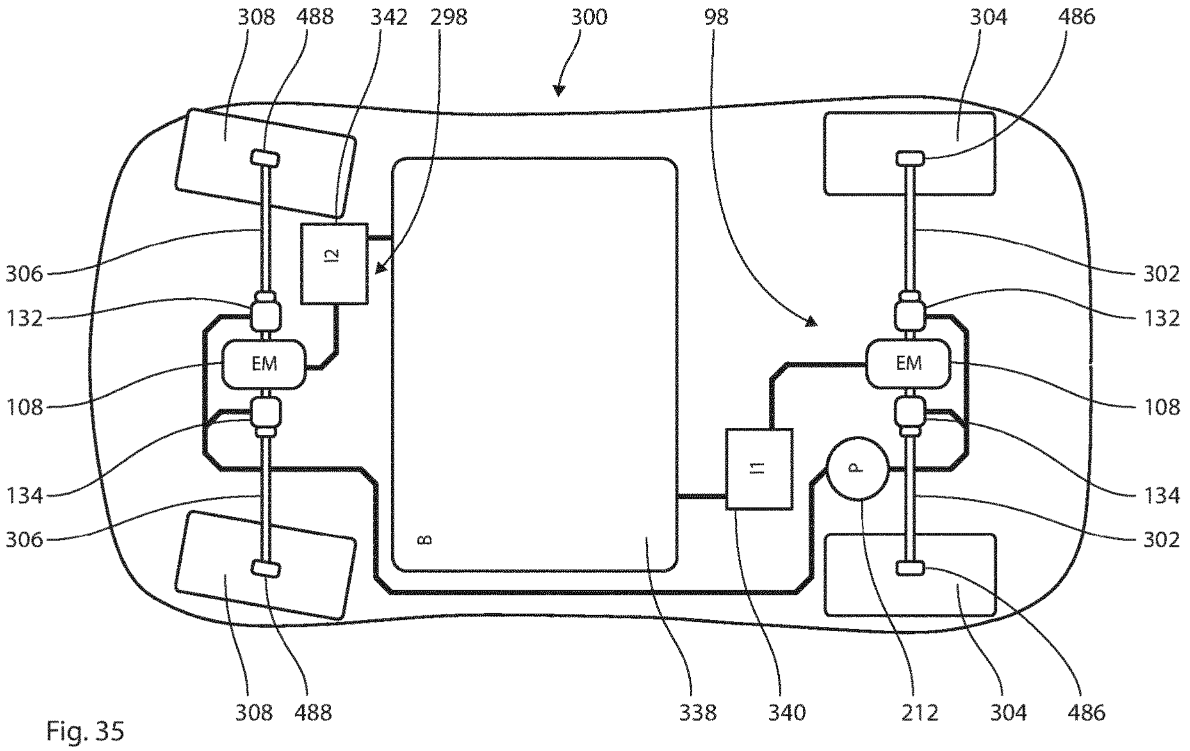
FIG. 35 is a schematic view of an embodiment of an automotive road vehicle with dual electric powertrains according to the embodiment of FIG. 13.

FIG. 35 is a schematic view of an embodiment of an automotive road vehicle 300 with an electric powertrain 98 and an additional electric powertrain 298, both according to the embodiment of FIG. 13. The powertrain 98 has a pair of wheel axles 302 connecting a pair of wheels 304 with the clutch output part of the first and second clutches 132 and 134 of the powertrain 98. The wheels 304 are fixed to the wheel axles 302 by wheel connectors 486 in the form of hubs. Similarly, it has a pair of additional wheel axles 306 connecting a pair of additional wheels 308 with the clutch output part of the first and second clutches 132 and 134 of the additional electric powertrain 298. The additional wheels 308 are fixed to the additional wheel axles 306 by additional wheel connectors 488 in the form of hubs.

The hydraulic control system 212 is connected to the first clutch 132 and the second clutch 134 of the powertrain 98 and the additional power train 298. This way, the amount of torque supplied by each wheel 304 and 308 can be individually controlled by the clutches 132 and 134 and the hydraulic control system 212 to give a four-wheel drive with torque vectoring on all wheels.

In alternative embodiments, the automotive road vehicle 300 has an electric powertrain 98 and an additional electric powertrain 298 according to the embodiment of FIG. 20 or 21.

Figure 36:
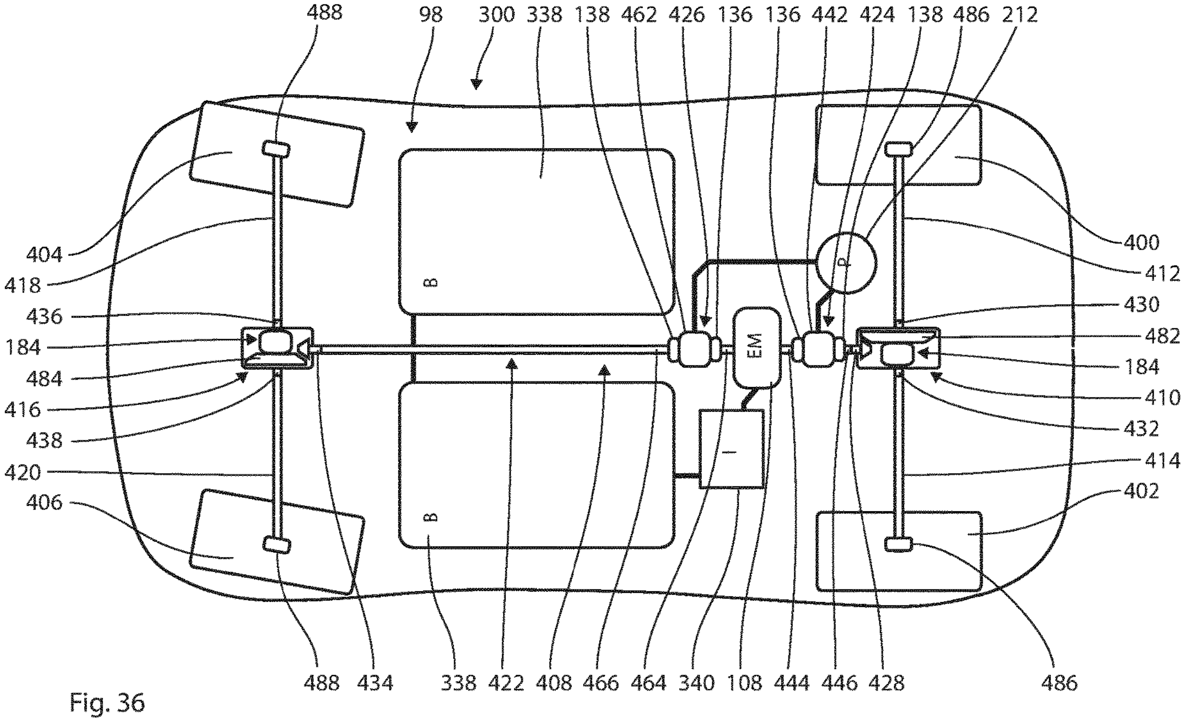
FIG. 36 is a schematic view of an embodiment of an automotive road vehicle with an electric powertrain having final drives with different gear ratios, a single electric motor on the drive shaft, and two center clutches on the drive shaft.

FIG. 36 is a schematic view of an embodiment of an automotive road vehicle 300 having an electric powertrain 98 with a drivetrain 408 and an electric motor 108 having a stator (not shown) and a rotor (not shown).

The drivetrain 408 has a final drive 410 with an input shaft 428, a first output shaft 430, and a second output shaft 432 that are connected by a differential 184. The differential has a bevel gear 482 that convert torque received by the input shaft 428 to a torque supplied by the first output shaft 430, and a second output shaft 432 at a first gear ratio. A first wheel axle 412 is connected to the first output shaft 430 and a second wheel axle 414 is connected to the second output shaft 432. A first wheel 400 is fixed to the first wheel axle 412 by a wheel connector 486 in the form of a hub, and a second wheel 402 is connected to the second wheel axle 414 by a wheel connector 486 in the form of a hub. This first pair of wheels are the rear wheels of the road vehicle 300.

The drivetrain 408 further has an additional final drive 416 with an additional input shaft 434, a first additional output shaft 436, and a second additional output shaft 438 that are connected by a differential 184. The differential has a bevel gear 484 that convert torque received by the additional input shaft 434 to a torque supplied by the first additional output shaft 436, and a second additional output shaft 438 at a second gear ratio that is smaller than the first gear ratio. A first additional wheel axle 418 is connected to the first additional output shaft 436 and a second additional wheel axle 420 is connected to the second additional output shaft 438. A first additional wheel 404 is fixed to the first additional wheel axle 418 by an additional wheel connector 488 in the form of a hub, and a second additional wheel 406 is fixed to the second additional wheel axle 420 by an additional wheel connector 488 in the form of a hub. This second pair of wheels are the front steering wheels of the road vehicle 300.

The drivetrain 408 further has a center clutch 442 having a clutch input part 136 and a clutch output part 138, and an additional center clutch 462 having a clutch input part 136 and a clutch output part 138. Each clutch has an (a) unengaged state in which there is no torque transfer between the clutch input part 136 and a clutch output part 138, an (b) engaged state with full torque transfer between the clutch input part 136 and the clutch output part 138, and a (c) slipping state in which there is a reduced torque transfer between the clutch input part 136 and the clutch output part 138. In the (a) unengaged state the clutch input part 136 and the clutch output part 138 can rotate freely relative to one another without any kinetic friction there between. In the (b) engaged state the clutch input part 136 and the clutch output part 138 are locked together. In the (c) slipping state the clutch input part 136 and the clutch output part 138 can rotate relative to one another with kinetic friction there between.

A drive shaft 422 is connected to the input shaft 428 of the final drive and 410 and to the additional input shaft 434 of the additional final drive 416. The drive shaft 422 has a first shaft portion 444, a second shaft portion 446, a first additional shaft portion 464, and a second additional shaft portion 466 arranged as shown in FIG. 36. The second shaft portion 446 and the second additional shaft portion 466 are connected to the input shaft 428 and to the additional input shaft 434, respectively.

The first shaft portion 444 is connected to the rotor (not shown) of the electric motor 108 and to the clutch input part 136 of the center clutch 442. Similarly, the first additional shaft portion 466 is connected to the rotor (not shown) of the electric motor 108 and to the clutch input part 136 of the additional center clutch 462. The second shaft portion 446 is connected to the clutch output part 138 of the center clutch 442 and to the input shaft 428 of the final drive 410. The second additional shaft portion 466 is connected to the clutch output part 138 of the additional center clutch 462 and to the additional input shaft 434 of the additional final drive 416. This means that the electric motor 108 supplies torque to the drivetrain 408 between the final drive 410 and the additional final drive 416, or more precisely between the center clutch 442 and the additional center clutch 462.

Thus, when the center clutch 442 is in the (b) engaged state and the additional center clutch 462 is in the (a) unengaged state, the road vehicle 300 has a rear-wheel drive with the first gear ratio between the electric motor 108 and the first and second wheel 400 and 402. When the center clutch 442 is in the (a) unengaged state and the additional center clutch 462 is in the (b) engaged state, the road vehicle 300 has a front-wheel drive with the second gear ratio between the electric motor 108 and the first and second additional wheel 404 and 406. When one of the center clutches 442 and 462 is in the (b) engaged state and the other is in the (c) slipping state, or when both center clutches 442 and 462 are in the slipping state, the road vehicle 300 has a four-wheel drive.

The powertrain 98 has a hydraulic control system 212 is connected to the center clutch 442 and the additional center clutch 462. The hydraulic control system individually controls the operation of the center clutches 442 and 462 and determines the state of respective clutch 442 and 462.

Components of the drivetrain 408 that are described as connected to one another are rotationally fixed and synchronous. Additionally, all shafts and axles are rigid. This means that there are no clutches, gears, or gear shifting mechanisms between the components. The center clutch 442 can be regarded as a clutch arrangement, and the additional center clutch 462 can be regarded as an additional clutch arrangement.

Figure 37:
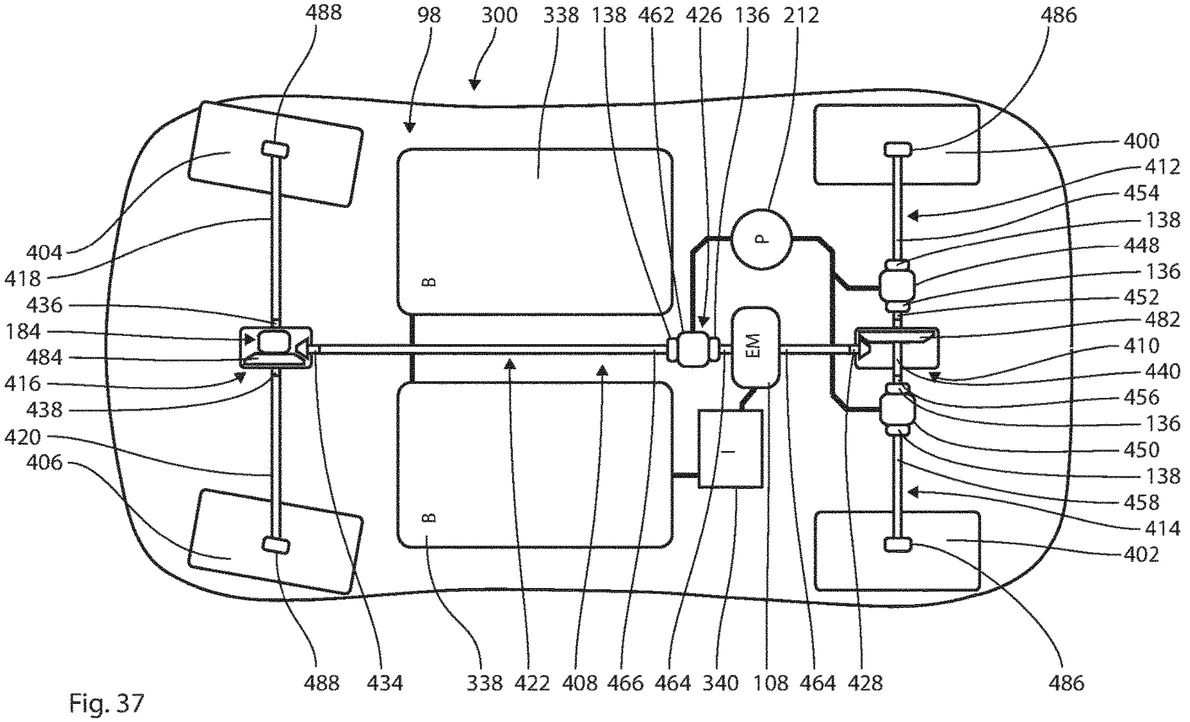
FIG. 37 is a schematic view of an embodiment of an automotive road vehicle with an electric powertrain having final drives with different gear ratios, a single electric motor on the drive shaft, a center clutch, and first and second clutches on the rear wheel axles.

FIG. 37 is a schematic view of an embodiment of an automotive road vehicle 300 having an electric powertrain 98 with a drivetrain 408 and an electric motor 108 having a stator (not shown) and a rotor (not shown). This embodiment differs from the embodiment of FIG. 36 in that it has no center clutch 442 and that the drive shaft 422 has no first shaft portion 444 and no second shaft portion 446. Instead, the drive train 408 has a first clutch 448 and a second clutch 450, and the first additional shaft portion 464 is connected to the input shaft 428 of the final drive 410. Additionally, the final drive 410 has no differential and the first output shaft 430 and the second output shaft 430 jointly forms a single rigid output shaft 440.

Each of the first clutch 448 and a second clutch 450 has a clutch input part 136 and a clutch output part 138 and can be operated in the same manner as the earlier center clutch 442.

The first wheel axle 412 has a first axle portion 452 and a second axle portion 454. The first axle portion 452 is connected to the first output shaft 430 of the final drive 410 and to the clutch input part 136 of the first clutch 448. The second axle portion 452 is connected to the clutch output part 138 of the first clutch 448 and to the first wheel 400.

Similarly, the second wheel axle 414 has a first axle portion 456 and a second axle portion 458. The first axle portion 456 is connected to the second output shaft 432 of the final drive 410 and to the clutch input part 136 of the second clutch 450. The second axle portion 458 is connected to the clutch output part 138 of the second clutch 450 and to the second wheel 400.

Torque is supplied by the electric motor 108 to the drivetrain 408 between the final drive 410 and the additional final drive 416, or more precisely between the final drive 410 and the additional center clutch 462.

Thus, when the first and second clutches 448 and 450 are in the (b) engaged state and the additional center clutch 462 is in the (a) unengaged state, the road vehicle 300 has a rear-wheel drive with the first gear ratio between the electric motor 108 and the first and second wheels 400 and 402. When the first and second clutches 448 and 450 are in the (a) unengaged state and the additional center clutch 462 is in the (b) engaged state, the road vehicle 300 has a front-wheel drive with the second gear ratio between the electric motor 108 and the first and second additional wheels 404 and 406. Four-wheel drive is available with the first and second clutches 448 and 450 in the (b) engaged state and the additional center clutch 462 is in the (c) slipping state, and vice versa. It is also available with all clutches 448, 450, and 462 in the (c) slipping state.

The hydraulic control system 212 is connected to the first and second clutches 448 and 450 and the additional center clutch 462. The hydraulic control system individually controls the operation of the clutches 448, 450, and 462.

Components of the drivetrain 408 that are described as connected to one another are rotationally fixed and synchronous. Additionally, all shafts and axles are rigid. This means that there are no clutches, gears, or gear shifting mechanisms between the components. The first and second clutches 448 and 450 can be regarded as a clutch arrangement, and the additional center clutch 462 can be regarded as an additional clutch arrangement.

Figure 38:
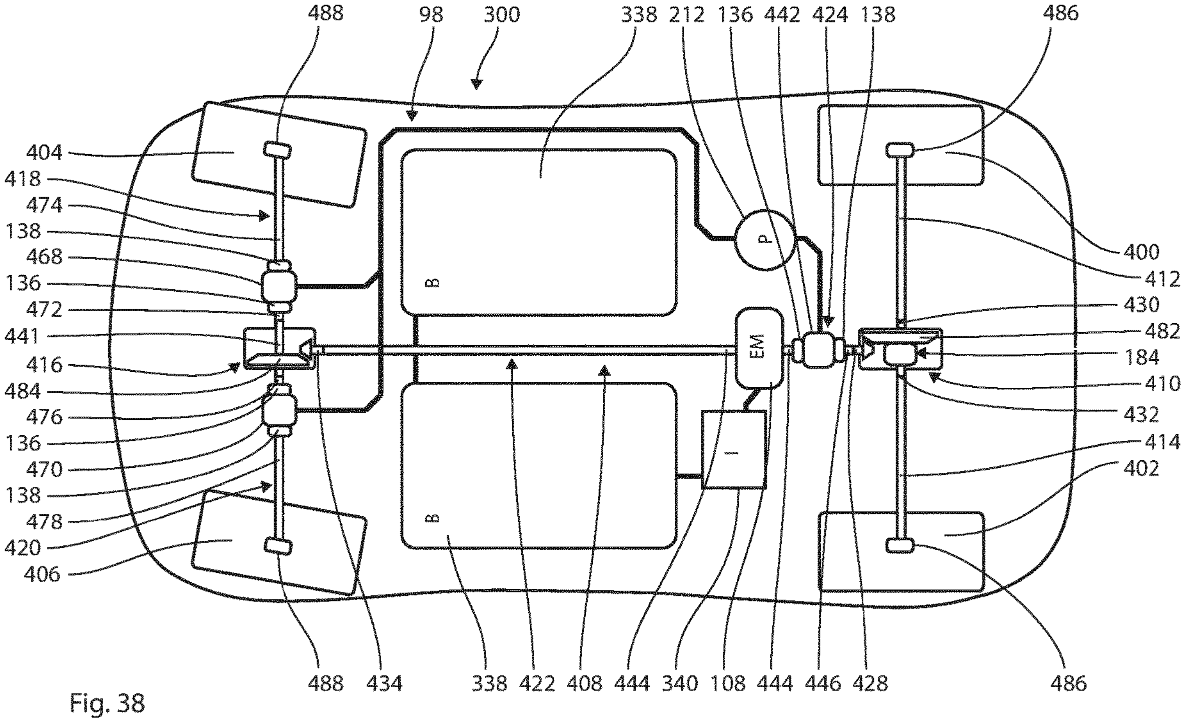
FIG. 38 is a schematic view of an embodiment of an automotive road vehicle with an electric powertrain having final drives with different gear ratios, a single electric motor on the drive shaft, a center clutch, and first and second clutches on the front wheel axles.

FIG. 38 is a schematic view of an embodiment of an automotive road vehicle 300 having an electric powertrain 98 with a drivetrain 408 and an electric motor 108 having a stator (not shown) and a rotor (not shown). This embodiment differs from the embodiment of FIG. 36 in that it has no additional center clutch 462 and that the drive shaft 422 has no first additional shaft portion 464 and no second additional shaft portion 466. Instead, the drive train 408 has a first additional clutch 468 and a second additional clutch 470, and the first shaft portion 444 is connected to the additional input shaft 434 of the additional final drive 416. Additionally, the additional final drive 416 has no differential and the first additional output shaft 436 and the second additional output shaft 438 jointly forms a single rigid additional output shaft 441.

Each of the first additional clutch 468 and a second additional clutch 470 has a clutch input part 136 and a clutch output part 138 and can be operated in the same manner as the earlier additional center clutch 462.

The first additional wheel axle 418 has a first axle portion 472 and a second additional axle portion 474. The first axle portion 472 is connected to the first additional output shaft 436 of the additional final drive 416 and to the clutch input part 136 of the first additional clutch 468. The second additional axle portion 472 is connected to the clutch output part 138 of the first additional clutch 468 and to the first additional wheel 404.

Similarly, the second additional wheel axle 420 has a first additional axle portion 476 and a second additional axle portion 478. The first additional axle portion 476 is connected to the second additional output shaft 438 of the additional final drive 416 and to the clutch input part 136 of the second additional clutch 470. The second axle additional portion 478 is connected to the clutch output part 138 of the second additional clutch 470 and to the second additional wheel 406.

Torque is supplied by the electric motor 108 to the drivetrain 408 between the final drive 410 and the additional final drive 416, or more precisely between the additional final drive 416 and the center clutch 442.

Thus, when the first and second additional clutches 468 and 470 are in the (b) engaged state and the center clutch 442 is in the (a) unengaged state, the road vehicle 300 has a front-wheel drive with the second gear ratio between the electric motor 108 and the first and second additional wheels 404 and 406. When the first and second additional clutches 468 and 470 are in the (a) unengaged state and the center clutch 442 is in the (b) engaged state, the road vehicle 300 has a rear-wheel drive with the first gear ratio between the electric motor 108 and the first and second wheels 400 and 402. Four-wheel drive is available with the first and second additional clutches 468 and 470 in the (b) engaged state and the center clutch 442 is in the (c) slipping state, and vice versa. It is also available with all clutches 442, 468, and 470 in the (c) slipping state.

The hydraulic control system 212 is connected to the first and second additional clutches 468 and 470 and the center clutch 442. The hydraulic control system individually controls the operation of the clutches 442, 468, and 470.

Components of the drivetrain 408 that are described as connected to one another are rotationally fixed and synchronous. Additionally, all shafts and axles are rigid. This means that there are no clutches, gears, or gear shifting mechanisms between the components. The center clutch 442 can be regarded as a clutch arrangement, and the first and second additional clutches 468 and 470 can be regarded as an additional clutch arrangement.

Figure 39:
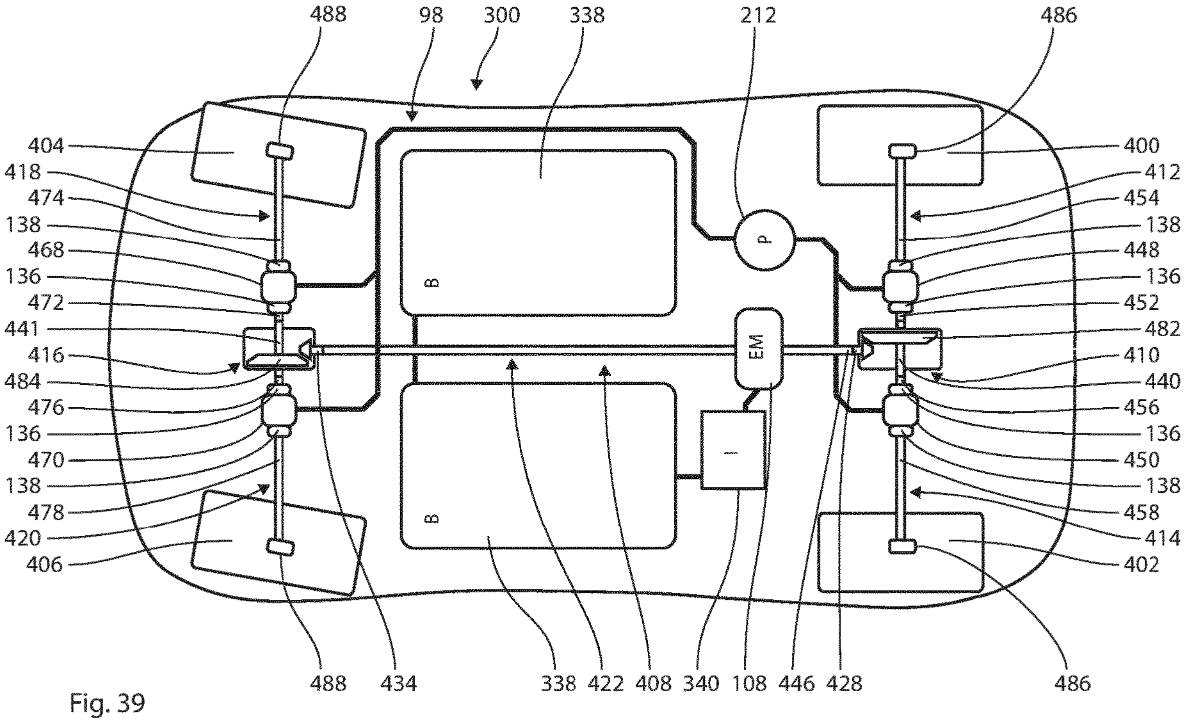
FIG. 39 is a schematic view of an embodiment of an automotive road vehicle with an electric powertrain having final drives with different gear ratios, a single electric motor on the drive shaft, first and second clutches on the rear drive axles, and first and second clutches on the front wheel axles.

FIG. 39 is a schematic view of an embodiment of an automotive road vehicle 300 having an electric powertrain 98 with a drivetrain 408 and an electric motor 108 having a stator (not shown) and a rotor (not shown). This embodiment differs from the embodiment of FIG. 37 in that it has no additional center clutch 462 and that the drive shaft 422 has no first additional shaft portion 464 and no second additional shaft portion 466. This means that the drive shaft 422 has no shaft portions 444, 446, 464, and 466. Instead, the drive train 408 has a first additional clutch 468 and a second additional clutch 470, and the drive shaft 422 is rigid and is connected to the input shaft 428 and to the additional input shaft 434 of the final drive 410 and the additional final drive 416, respectively. Additionally, the additional final drive 416 has no differential and the first additional output shaft 436 and the second additional output shaft 438 jointly forms a single rigid additional output shaft 441.

Each of the first additional clutch 468 and a second additional clutch 470 has a clutch input part 136 and a clutch output part 138 and can be operated in the same manner as the earlier additional center clutch 462.

Similar to the embodiment of FIG. 38, the first additional wheel axle 418 has a first axle portion 472 and a second additional axle portion 474. The first axle portion 472 is connected to the first additional output shaft 436 of the additional final drive 416 and to the clutch input part 136 of the first additional clutch 468. The second additional axle portion 472 is connected to the clutch output part 138 of the first additional clutch 468 and to the first additional wheel 404.

The second additional wheel axle 420 has a first additional axle portion 476 and a second additional axle portion 478. The first additional axle portion 476 is connected to the second additional output shaft 438 of the additional final drive 416 and to the clutch input part 136 of the second additional clutch 470. The second additional axle portion 478 is connected to the clutch output part 138 of the second additional clutch 470 and to the second additional wheel 406.

Torque is supplied by the electric motor 108 to the drivetrain 408 between the final drive 410 and the additional final drive 416.

Thus, when the first and second clutches 448 and 450 are in the (b) engaged state and the first and second additional clutches 468 and 470 are in the (a) unengaged state, the road vehicle 300 has a rear-wheel drive with the first gear ratio between the electric motor 108 and the first and second wheels 400 and 402. When the first and second clutches 448 and 450 are in the (a) unengaged state and the first and second additional clutches 468 and 470 are in the (b) engaged state, the road vehicle 300 has a front-wheel drive with the second gear ratio between the electric motor 108 and the first and second additional wheels 404 and 406. Four-wheel drive is available with the first and second clutches 448 and 450 in the (b) engaged state and the first and second additional clutches 468 and 470 in the (c) slipping state, and vice versa. It is also available with all clutches 448, 450, 468, and 470 in the (c) slipping state.

The hydraulic control system 212 is connected to the first and second clutches 448 and 450 and the first and second additional clutches 468 and 470. The hydraulic control system individually controls the operation of the clutches 448, 450, 468, and 470.

Components of the drivetrain 408 that are described as connected to one another are rotationally fixed and synchronous. Additionally, all shafts and axles are rigid. This means that there are no clutches, gears, or gear shifting mechanisms between the components. For example, the drive shaft 422 as a whole is rigid and not interrupted by any functional components, such as a reduction gear or clutch, between the final drive 410 and the additional final drive 416. The first and second clutches 448 and 450 can be regarded as a clutch arrangement, and the first and second additional clutches 468 and 470 can be regarded as an additional clutch arrangement.

Figure 40:
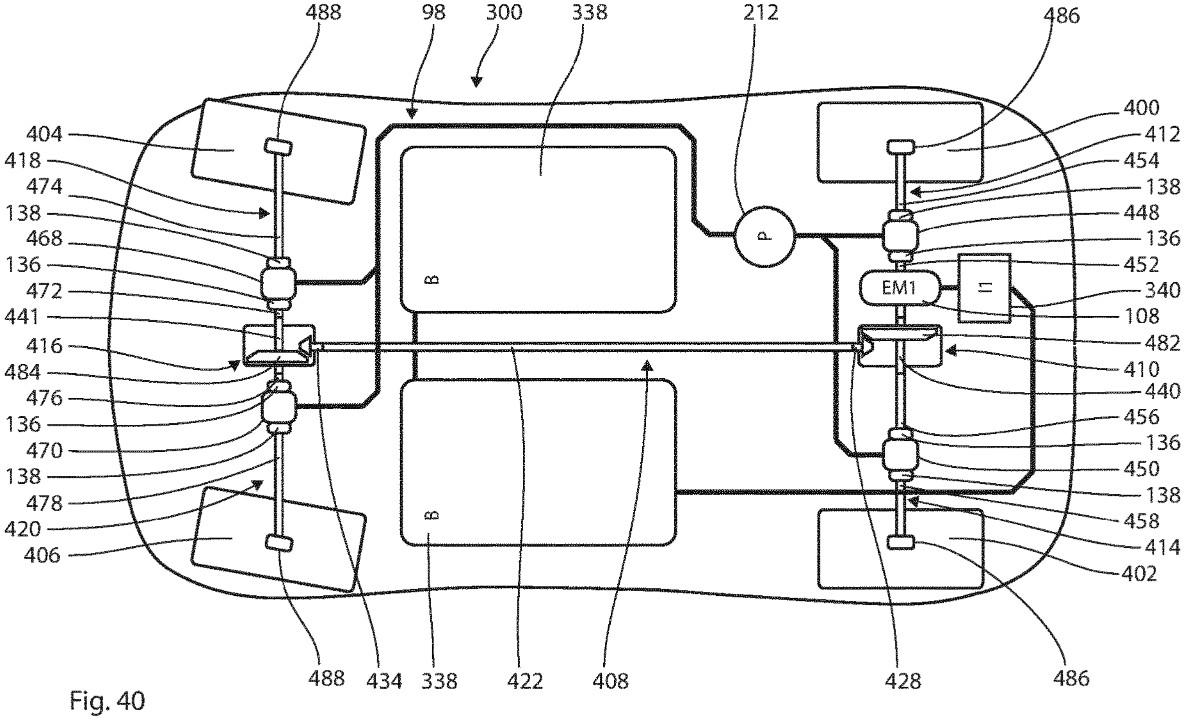
FIG. 40 is a schematic view of an embodiment of an automotive road vehicle with an electric powertrain having final drives with different gear ratios, an electric motor on one of the rear wheel axles, first and second clutches on the rear drive axles, and first and second clutches on the front wheel axles.

FIG. 40 is a schematic view of an embodiment of an automotive road vehicle 300 having an electric powertrain 98 with a drivetrain 408 and an electric motor 108 having a stator (not shown) and a rotor (not shown). This embodiment differs from the embodiment of FIG. 39 in that the rotor (not shown) of the electric motor 108 is connected to the first axle portion 452 of first wheel axle 412. This means that the electric motor 108 supplies torque to the drivetrain 408 between the final drive 410 and the first wheel 400, or more precisely between the final drive 410 and the first clutch 448. The final drive 410 has no differential and a single rigid output shaft 440. This means that the rotor (not shown) of the electric motor and the clutch input part 136 of the second clutch 450 are rotationally fixed and synchronous.

The operation of the clutches 448, 450, 468, and 470 is the same as described in relation to the embodiment of FIG. 38.

Figure 41:
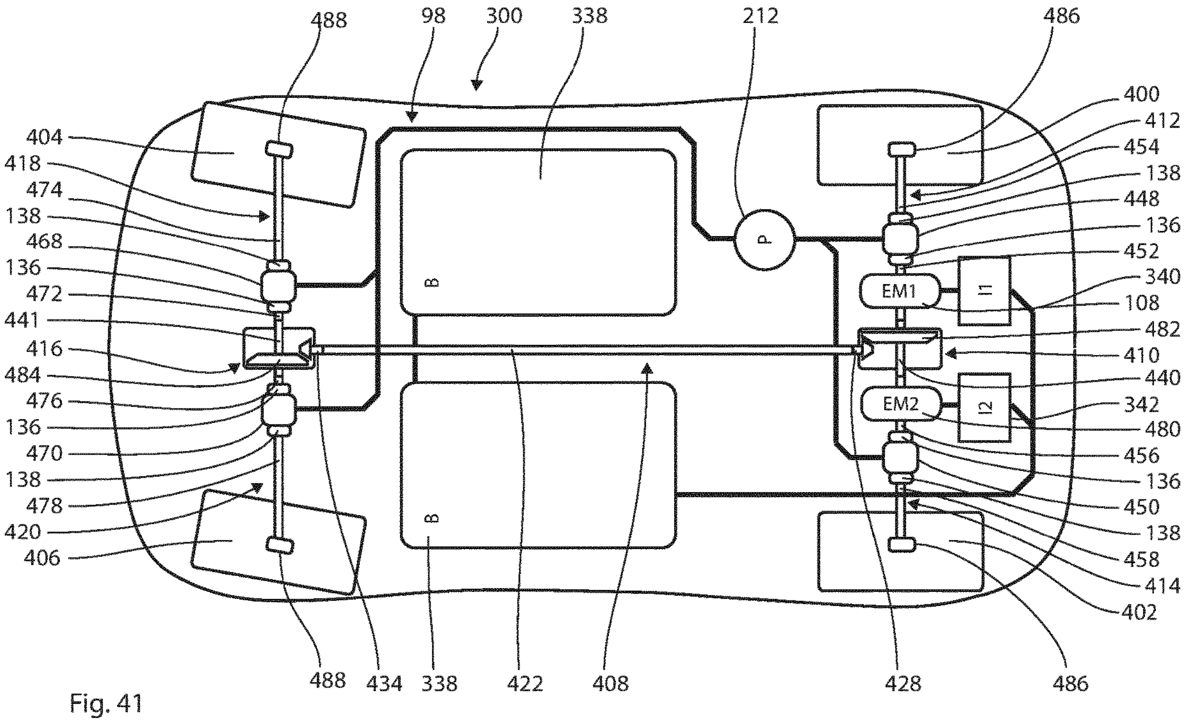
FIG. 41 is a schematic view of an embodiment of an automotive road vehicle with an electric powertrain having final drives with different gear ratios, an electric motor on the first rear wheel axles, an additional electric motor on the second rear wheel axle, first and second clutches on the rear drive axles, and first and second clutches on the front wheel axles.

FIG. 41 is a schematic view of an embodiment of an automotive road vehicle 300 having an electric powertrain 98 with a drivetrain 408 and an electric motor 108 having a stator (not shown) and a rotor (not shown). This embodiment differs from the embodiment of FIG. 39 in that the powertrain 98 has an additional electric motor 480 connected to the first axle portion 456 of second wheel axle 414. This means that the additional electric motor 480 supplies torque to the drivetrain 408 between the final drive 410 and the second wheel 402, or more precisely between the final drive 410 and the second clutch 448. The final drive 410 has no differential and a single rigid output shaft 440. This means that the rotor (not shown) of the electric motor and the clutch input part 136 of the second clutch 450 are rotationally fixed and synchronous, and that torque supplied by the additional electric motor 480 is simply added to the torque supplied by the electric motor 108.

The operation of the clutches 448, 450, 468, and 470 is the same as described in relation to the embodiment of FIG. 38.

Figure 42:
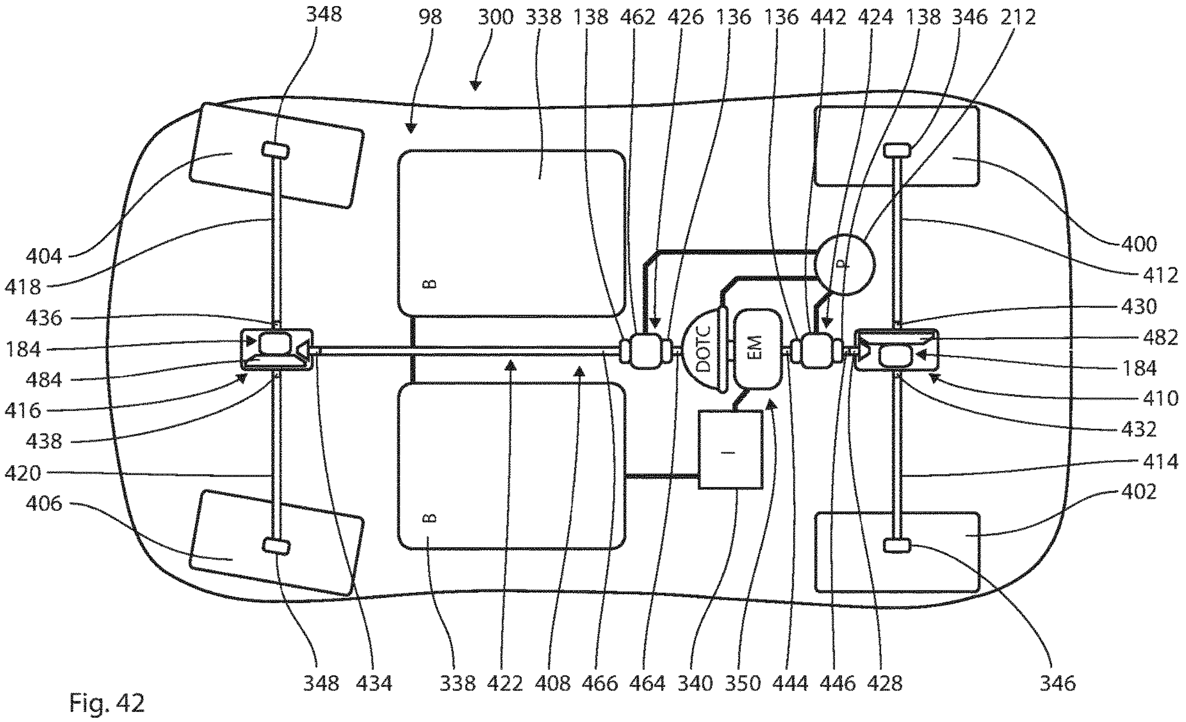
FIG. 42 is a schematic view of an embodiment of an automotive road vehicle with an electric powertrain having final drives with different gear ratios, a drive assembly on the drive shaft, and two center clutches on the drive shaft.

FIG. 42 is a schematic view of an embodiment of an automotive road vehicle 300 having an electric powertrain 98 with a drivetrain 408 and an electric motor 108 having a stator (not shown) and a rotor (not shown). This embodiment differs from the embodiment of FIG. 36 in that the electric motor 108 has been replaced by a drive assembly 350 as described in relation to FIG. 4. The output shaft 108 of the torque converter 100 forms part of the drive shaft 422. The first shaft portion 444 is connected to the output shaft 108 on the first side 356 of the drive assembly 350, and the first additional shaft portion 464 is connected to the output shaft 108 on the second side 358. This way, the drivetrain 408 is configured to distribute torque from the drive assembly 408 to the pair of wheel connectors 346 and the pair of additional wheel connectors 348. The hydraulic control system 212 is connected to the torque converter 100 of the drive assembly and controls its function.

Figure 43:
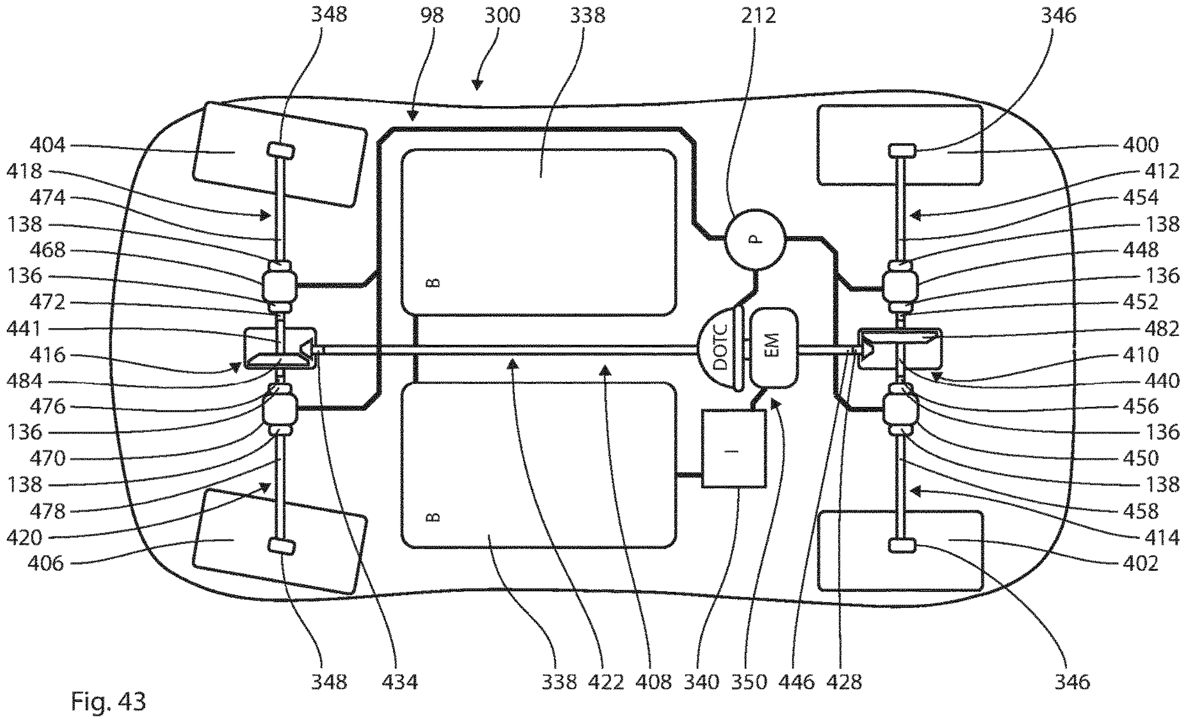
FIG. 43 is a schematic view of an embodiment of an automotive road vehicle with an electric powertrain having final drives with different gear ratios, a drive assembly on the drive shaft, first and second clutches on the rear drive axles, and first and second clutches on the front wheel axles.

FIG. 43 is a schematic view of an embodiment of an automotive road vehicle 300 having an electric powertrain 98 with a drivetrain 408 and an electric motor 108 having a stator (not shown) and a rotor (not shown). This embodiment differs from the embodiment of FIG. 39 in that the electric motor 108 has been replaced by a drive assembly 350 as described in relation to FIG. 4. The output shaft 108 of the torque converter 100 forms part of the drive shaft 422. The first side 356 of the drive assembly 350 faces the final drive 410 and the second side 358 of the drive assembly faces the additional final drive 416. This way, the drivetrain 408 is configured to distribute torque from the drive assembly 408 to the pair of wheel connectors 346 and the pair of additional wheel connectors 348. The hydraulic control system 212 is connected to the torque converter 100 of the drive assembly and controls its function.

In each of the above embodiments of an automotive road vehicle 300, the powertrain 98 has an energy storage 338 in the form of a battery. The energy storage is coupled to an inverter 340 forming part of the powertrain 98. The inverter 340 in turn is coupled to the electric motor 108 of the powertrain 98. If the vehicle 300 has an additional powertrain 298, the latter has an additional inverter 342 that is coupled to the energy storage 338 and the electric motor 108 of the additional powertrain 298. Similarly, if the powertrain 98 has an additional motor 480 it also has an additional inverter 342 that is coupled to the energy storage 338 and the additional electric motor 480. If the powertrain 98 has a tertiary electric motor 326 it also has a tertiary inverter 344 coupled to the energy storage 338 and the tertiary electric motor 326. This means that the same electric power storage 338 supplies electric power to all electric motors 108 and 326 in the electric vehicle 300. The different inverters 340, 342, and 344 controls the operation of the electric motors 108 and 326 they are connected to and can be operated independently from one another. This way, if the automotive road vehicle 300 has a powertrain 98 and an additional powertrain 298, it can selectively be operated in front-wheel drive, rear-wheel drive, or four-wheel drive.

ITEM LIST

10 torque converter
12 rear end or first end of torque converter
14 front end or second end of torque converter
16 output shaft
18 cover
20 rear cover portion
22 front cover portion
24 rear shaft aperture
26 impeller
28 turbine
30 stator
32 rear shaft portion or first shaft portion of output shaft
34 central shaft portion
36 front shaft portion or second shaft portion of output shaft
38 front shaft aperture
40 stator support
42 freewheel
44 input shaft
46 input shaft bore
48 rear opening of input shaft bore
50 front opening of input shaft bore
52 torque input hub
54 clutch (of torque converter)
56 stator support bore
58 rear opening of stator support bore
60 front opening of stator support bore
62 rear radial rolling bearing
64 damper
66 piston
68 friction disc
70 shaft conduit
72 rotational axis
98 electric powertrain
100 torque converter (dual output)
102 rear end or first end of torque converter
104 front end or second end of torque converter
106 output shaft
108 electric motor
110 motor shaft
112 input shaft of the torque converter
114 cover of torque converter
116 motor shaft bore
118 front opening of motor shaft bore
120 rear opening of motor shaft bore
122 stator
124 rotor
126 housing
128 motor partition of housing
130 radial rolling bearing
132 first clutch
134 second clutch
136 clutch input part
138 clutch output part
140 rear shaft portion or first shaft portion of output shaft of torque converter
142 front shaft portion or second shaft portion of output shaft of torque converter
144 first clutch partition
146 first radial rolling bearing
148 second clutch partition
150 second radial rolling bearing
152 bevel gear assembly
154 gear input shaft
156 gear output shaft
158 bevel gear
160 first end of gear output shaft
162 second end of gear output shaft
164 bevel gear partition
166 radial rolling bearing
168 motor partition
170 torque converter (single output)
172 rear end
174 front end
176 output shaft
178 torque converter partition
180 radial rolling bearing
182 shaft conduit
184 differential
186 gear input shaft
188 first gear output shaft
190 second gear output
192 first shaft portion of motor shaft
194 first side of motor
196 second shaft portion of motor shaft
198 second side of motor
200 first torque converter
202 second torque converter
204 first torque converter partition
206 first radial rolling bearing
208 second torque converter partition
210 second radial rolling bearing
212 hydraulic control system
214 pressure conduits
216 reduction gear set
218 reduction gear input part
220 reduction gear output part
222 sun gear
224 carrier
226 planet gears
228 ring gear.
230 reduction gear bore
232 front opening
234 rear opening
236 first reduction gear set
238 second reduction gear set
298 additional electric powertrain
300 automotive road vehicle
302 wheel axle
304 wheel 306 additional wheel axle
308 additional wheel
310 drive shaft
312 first shaft portion of drive shaft
314 second shaft portion of drive shaft
316 additional differential
318 center clutch
320 clutch input part
322 clutch output part
324 additional bevel gear assembly
326 tertiary electric motor
328 motor shaft
330 first drive shaft
332 second drive shaft
334 first differential
336 second differential
338 energy storage
340 inverter
342 additional inverter
344 tertiary inverter
346 first wheel connector
348 second wheel connector
350 drive assembly
356 first side of drive assembly
358 second side of drive assembly 360 first aperture
362 second aperture
400 first wheel
402 second wheel
404 first additional wheel
406 second additional wheel
408 drivetrain
410 final drive
412 first wheel axle
414 second wheel axle
416 additional final drive
418 first additional wheel axle
420 second additional wheel axle
422 drive shaft
424 clutch arrangement
426 additional clutch arrangement
428 input shaft of final drive
430 first output shaft of final drive
432 second output shaft of final drive
434 additional input shaft of additional final drive
436 first additional output shaft of additional final drive
438 second additional output shaft of additional final drive
440 single output shaft
441 single additional output shaft
442 center clutch
444 first shaft portion of drive shaft
446 second shaft portion of drive shaft
448 first clutch
450 second clutch
452 first axle portion of first wheel axle
454 second axle portion of first wheel axle
456 first axle portion of second wheel axle
458 second axle portion of second wheel axle
462 additional center clutch
464 first additional shaft portion
466 second additional shaft portion
468 first additional clutch
470 second additional clutch
472 first axle portion of first additional wheel axle
474 second axle portion of first additional wheel axle
476 first axle portion of second additional wheel axle
478 second axle portion of second additional wheel axle
480 additional electric motor
482 bevel gear of final drive
484 bevel gear of additional final drive
486 wheel connector
488 additional wheel connector

The invention claimed is:

1. An electric powertrain for an automotive road vehicle, the powertrain comprising:

a drive assembly comprising an electric motor and a torque converter, wherein the torque converter comprises an output shaft and is configured to receive torque from the electric motor and to deliver torque via the output shaft, wherein the drive assembly has a first side and an opposite second side, wherein the electric motor and the torque converter are centered on the output shaft, and wherein the output shaft extends through the drive assembly and is accessible for delivering torque on both the first side and the second side of the drive assembly.

2. The electric powertrain according to claim 1, wherein the output shaft has a first shaft portion and a coaxial second shaft portion, wherein the first shaft portion is accessible from the first side of the drive assembly and the second shaft portion is accessible from the second side of the drive assembly, wherein the powertrain further comprises a first wheel connector configured for connecting to a first wheel and a second wheel connector configured for connecting to a second wheel, wherein the first wheel connector is operationally connected to the first shaft portion, and the second wheel connector is operationally connected to the second shaft portion.

3. The electric powertrain according to claim 1, wherein the torque converter has a first end and a second end, wherein the output shaft extends from the first end and the second end, wherein the torque converter is configured to receive an input torque at the first end and to deliver an output torque via the output shaft, and wherein the torque converter comprises an impeller and a turbine, the impeller being located closer to the second end than is the turbine, and the turbine being located closer to the first end than is the impeller, the turbine being fixed to the output shaft.

4. The electric powertrain according to claim 1, wherein the powertrain further comprises a first clutch having a first clutch input and a first clutch output, and a second clutch having a second clutch input and a second clutch output, wherein the first clutch input and the second clutch input are coupled to the output shaft, and wherein the first clutch and the second clutch are positioned on opposite sides of the drive assembly in the powertrain.

5. The electric powertrain according to claim 1, wherein the powertrain further comprises a bevel gear assembly comprising a gear input shaft, a gear output shaft that is transverse to the gear input shaft and has a first end and a second end, and a bevel gear operationally connecting the gear input shaft and the gear output shaft, wherein the first end and the second end of the gear output shaft are on opposite sides of the bevel gear, and wherein the gear input shaft is connected to the output shaft of the torque converter.

6. The electric powertrain according to claim 1, wherein the powertrain further comprises a differential having a gear input shaft, a first gear output shaft, and a second gear output shaft, wherein the gear input shaft of the differential is connected to the output shaft of the torque converter.

7. The electric powertrain according to claim 1, wherein the drive assembly further comprises a reduction gear set having a reduction gear input and a reduction gear output, wherein the reduction gear set is configured to reduce a first rotational speed of the reduction gear input to a lower second rotational speed of the reduction gear output, wherein the reduction gear input is coupled to the electric motor, and wherein the reduction gear output is coupled to the torque converter.

8. The electric powertrain according to claim 1, wherein the powertrain further comprises a first reduction gear set and a second reduction gear set, wherein the first reduction gear set includes a first reduction gear input and first reduction gear output and the second reduction gear set includes a second reduction gear input and a second reduction gear output, wherein the first reduction gear set is configured to reduce a first rotational speed of the first reduction gear input to a lower second rotational speed of the first reduction gear output and the second reduction gear set is configured to reduce a first rotational speed of the second reduction gear input to a lower second rotational speed of the second reduction gear output, wherein the first reduction gear set is positioned on the first side of the drive assembly in the powertrain, and wherein the second reduction gear set is positioned on the second side of the drive assembly in the powertrain.

9. The electric powertrain according to claim 1, wherein the powertrain further comprises a drivetrain coupled to the output of the shaft of the torque converter, wherein the drivetrain comprises first and second pairs of wheel connectors and is configured to distribute torque from the output shaft to the first and second pairs of wheel connectors, wherein the drivetrain further comprises:

- a first final drive configured to convert torque at a first gear ratio;
- a first wheel axle coupling the final drive and a first one of the first pair of wheel connectors;
- a second wheel axle coupling the final drive and a second one of the first pair of wheel connectors;
- a second final drive configured to convert torque at a second gear ratio that is different from the first gear ratio;
- a first additional wheel axle coupling the second final drive and a first one of the second pair of wheel connectors;
- a second additional wheel axle coupling the final drive and a second one of the second pair of wheel connectors;
- a drive shaft connecting the first final drive and the second final drive;
- a first clutch arrangement operable in a first state connecting the first pair of wheel connectors to a torque supply from the output shaft of the torque converter and in a second state disconnecting the first pair of wheel connectors from the torque supply; and
- a second clutch arrangement operable in an engaged state connecting the second pair of wheel connectors to the torque supply and in an unengaged state disconnecting the second pair of wheel connectors from the torque supply.

10. The electric powertrain according to claim 9, wherein:

- the first clutch arrangement is configured to operate in a slipping state in which the first pair of wheel connectors are slipping relative to the output shaft of the torque converter; and
- the second clutch arrangement is configured to operate in a slipping state in which the second pair of wheel connectors are slipping relative to the output shaft of the torque converter.

11. The electric powertrain according to claim 9, wherein the first clutch arrangement comprises a center clutch positioned in the drivetrain between the first final drive and the second final drive, wherein the center clutch is configured to operatively move the first and second clutch arrangements between their respective engaged and unengaged states.

12. The electric powertrain according to claim 9, wherein the first clutch arrangement comprises a first clutch positioned in the drivetrain between the final drive and one of the first pair of wheel connectors, and a second clutch positioned in the drivetrain between the first final drive and the second pair of wheel connectors, wherein the first clutch and the second clutch are configured to operatively move the first and second clutch arrangements, respectively, between their respective engaged and unengaged states.

13. The electric powertrain according to claim 9, wherein the drive assembly is positioned in the drivetrain between the first final drive and the second final drive.

14. The electric powertrain according to claim 9, wherein the drive assembly is positioned in the drivetrain between the first final drive and one of the first pair of wheel connectors.

15. An automotive road vehicle including a powertrain, wherein the powertrain comprises:

- a drive assembly comprising an electric motor and a torque converter, wherein the torque converter comprises an output shaft and is configured to receive torque from the electric motor and to deliver torque via the output shaft, wherein the drive assembly has a first side and an opposite second side, wherein the electric motor and the torque converter are centered on the output shaft, and wherein the output shaft extends through the drive assembly and is accessible for delivering torque on both the first side and the second side of the drive assembly.

16. The automotive road vehicle according to claim 15, wherein the output shaft has a first shaft portion and a coaxial second shaft portion, wherein the first shaft portion is accessible from the first side of the drive assembly and the second shaft portion is accessible from the second side of the drive assembly, wherein the powertrain further comprises a first wheel connector configured for connecting to a first wheel and a second wheel connector configured for connecting to a second wheel, wherein the first wheel connector is operationally connected to the first shaft portion, and the second wheel connector is operationally connected to the second shaft portion.

17. The automotive road vehicle according to claim 15, wherein the torque converter has a first end and a second end, wherein the output shaft extends from the first end and the second end, wherein the torque converter is configured to receive an input torque at the first end and to deliver an output torque via the output shaft, and wherein the torque converter comprises an impeller and a turbine, the impeller being located closer to the second end than is the turbine, and the turbine being located closer to the first end than is the impeller, the turbine being fixed to the output shaft.

18. The automotive road vehicle according to claim 15, wherein the powertrain further comprises a first clutch having a first clutch input and a first clutch output, and a second clutch having a second clutch input and a second clutch output, wherein the first clutch input and the second clutch input are coupled to the output shaft, and wherein the first clutch and the second clutch are positioned on opposite sides of the drive assembly in the powertrain.

19. The automotive road vehicle according to claim 15, wherein the powertrain further comprises a bevel gear assembly comprising a gear input shaft, a gear output shaft that is transverse to the gear input shaft and has a first end and a second end, and a bevel gear operationally connecting the gear input shaft and the gear output shaft, wherein the first end and the second end of the gear output shaft are on opposite sides of the bevel gear, and wherein the gear input shaft is connected to the output shaft of the torque converter.

20. The automotive road vehicle according to claim 15, wherein the powertrain further comprises a differential having a gear input shaft, a first gear output shaft, and a second gear output shaft, wherein the gear input shaft of the differential is connected to the output shaft of the torque converter.

21. The automotive road vehicle according to claim 15, wherein the drive assembly further comprises a reduction gear set having a reduction gear input and a reduction gear output, wherein the reduction gear set is configured to reduce a first rotational speed of the reduction gear input to a lower second rotational speed of the reduction gear output, wherein the reduction gear input is coupled to the electric motor, and wherein the reduction gear output is coupled to the torque converter.

22. The automotive road vehicle according to claim 15, wherein the powertrain further comprises a first reduction gear set having a first reduction gear input and a first reduction gear output, and a second reduction gear set having a second reduction gear input and a second reduction gear output, wherein the first reduction gear set is configured to reduce a first rotational speed of the first reduction gear input to a lower second rotational speed of the first reduction gear output and the second reduction gear set is configured to reduce a first rotational speed of the second reduction gear input to a lower second rotational speed of the second reduction gear output, wherein the first reduction gear set is positioned on the first side of the drive assembly in the powertrain, and wherein the second reduction gear set is positioned on the second side of the drive assembly in the powertrain.

23. The automotive road vehicle according to claim 15, wherein the powertrain further comprises a drivetrain coupled to the output of the shaft of the torque converter, wherein the drivetrain comprises first and second pairs of wheel connectors and is configured to distribute torque from the output shaft to the first and second pairs of wheel connectors, wherein the drivetrain further comprises:

a first final drive configured to convert torque at a first gear ratio;

a first wheel axle coupling the final drive and a first one of the first pair of wheel connectors;

a second wheel axle coupling the final drive and a second one of the first pair of wheel connectors;

a second final drive configured to convert torque at a second gear ratio that is different from the first gear ratio;

a first additional wheel axle coupling the second final drive and a first one of the second pair of wheel connectors;

a second additional wheel axle coupling the final drive and a second one of the second pair of wheel connectors;

a drive shaft connecting the first final drive and the second final drive;

a first clutch arrangement operable in an engaged state connecting the first pair of wheel connectors to a torque supply from the from the output shaft of the torque converter, and in an unengaged state disconnecting the first pair of wheel connectors from the torque supply; and a second clutch arrangement operable in an engaged state connecting the second pair of wheel connectors to the torque supply from the output shaft of the torque converter, and in an unengaged state disconnecting the second pair of wheel connectors from the torque supply.

24. The automotive road vehicle according to claim 23, wherein:

the first clutch arrangement is configured to operate in a slipping state in which the first pair of wheels connectors are slipping relative to the output shaft of the torque converter; and the second clutch arrangement is configured to operate in a slipping state in which the second pair of wheel connectors are slipping relative to the output shaft of the torque converter.

25. The automotive road vehicle according to claim 23, wherein the first clutch arrangement comprises a center clutch positioned in the drivetrain between the first final drive and the second final drive, wherein the center clutch is configured to operatively move the first and second clutch arrangements between their respective engaged and unengaged states.

26. The automotive road vehicle according to claim 23, wherein the first clutch arrangement comprises a first clutch positioned in the drivetrain between the final drive and one of the first air of wheel connectors, and a second clutch positioned in the drivetrain between the first final drive and the second pair of wheel connectors, wherein the first clutch and the second clutch are configured to operatively move the first and second clutch arrangements, respectively, between their respective engaged and unengaged states.

27. The automotive road vehicle according to claim 23, wherein the drive assembly is positioned in the drivetrain between the first final drive and the second final drive.

28. The automotive road vehicle according to claim 23, wherein the drive assembly is positioned in the drivetrain between the first final drive and one of the first pair of wheel connectors.

* * * * *